US012505742B2

(12) United States Patent
Longardner et al.

(10) Patent No.: US 12,505,742 B2
(45) Date of Patent: Dec. 23, 2025

(54) LIGHTING FIXTURE DATA HUBS AND SYSTEMS AND METHODS TO USE THE SAME

(71) Applicant: ECO Parking Technologies, LLC, Indianapolis, IN (US)

(72) Inventors: William Longardner, Indianapolis, IN (US); Jeffrey Pinyot, Fishers, IN (US); Andrew Teed, Indianapolis, IN (US)

(73) Assignee: ECO PARKING TECHNOLOGIES, LLC, Indianapolis, IN (US)

( * ) Notice: Subject to any disclaimer, the term of this patent is extended or adjusted under 35 U.S.C. 154(b) by 39 days.

(21) Appl. No.: 18/624,878

(22) Filed: Apr. 2, 2024

(65) Prior Publication Data

US 2025/0069505 A1 Feb. 27, 2025

Related U.S. Application Data

(63) Continuation of application No. 17/584,295, filed on Jan. 25, 2022, now Pat. No. 11,972,684, which is a (Continued)

(51) Int. Cl.

*G08G 1/04* (2006.01)
*A01M 1/20* (2006.01)
*G08G 1/14* (2006.01)

(52) U.S. Cl.

CPC ........... *G08G 1/141* (2013.01); *A01M 1/2044* (2013.01); *G08G 1/04* (2013.01); *G08G 1/146* (2013.01); *G08G 1/148* (2013.01)

(58) Field of Classification Search

CPC ...... G08G 1/142; G08G 1/0175; G08G 1/144; G08G 1/146; G08G 1/148; G06K 9/3258; G07C 1/30

(Continued)

(56) References Cited

U.S. PATENT DOCUMENTS 5,414,624 A 5/1995 Anthonyson
5,688,357 A 11/1997 Hanawa (Continued)

FOREIGN PATENT DOCUMENTS

EP 2940670 11/2015
KR 100930477 B1 12/2009

(Continued)

OTHER PUBLICATIONS

International Searching Authority, International Search Report and Written Opinion for Corresponding PCT Application No. PCT/US2016/040143, Dated Sep. 19, 2016.

(Continued)

*Primary Examiner* — Qutbuddin Ghulamali
(74) *Attorney, Agent, or Firm* — Quarles & Brady, LLP

(57) ABSTRACT

Lighting fixture data hubs and systems and methods for use. An example of a data hub may include an annunciator configured to generate a first indication and a second indication, one or more sensors configured to detect between one or more vehicles and one or more pedestrians and potential convergence thereof within a zone in a vicinity of the data hub and to emit one or more signals corresponding to said detection, and a gateway in communication with an onboard processor and the annunciator, the on-board processor configured to wirelessly receive and analyze the one or more signals, communicate said one or more signals to the gateway so that the gateway can generate the first indication or the second indication in response to the one or more signals. Data hubs may also include a sensor unit housing and/or a light source.

18 Claims, 48 Drawing Sheets

Related U.S. Application Data continuation-in-part of application No. 17/002,642, filed on Aug. 25, 2020, now Pat. No. 11,233,665, which is a continuation-in-part of application No. 16/240,674, filed on Jan. 4, 2019, now Pat. No. 10,755,569, which is a continuation-in-part of application No. 15/740,649, filed as application No. PCT/US2016/040143 on Jun. 29, 2016, now Pat. No. 10,937,316.

(60) Provisional application No. 62/613,662, filed on Jan. 4, 2018, provisional application No. 62/301,320, filed on Feb. 29, 2016, provisional application No. 62/186,101, filed on Jun. 29, 2015.

(58) Field of Classification Search
USPC .......................................................... 340/932.2
See application file for complete search history.

(56) References Cited

U.S. PATENT DOCUMENTS

| | | | | |
|---|---|---|---|---|
| 6,147,624 | A | 11/2000 | Clapper | |
| 6,292,110 | B1 | 9/2001 | Budnovitch | |
| 6,340,935 | B1 * | 1/2002 | Hall | G08G 1/142 340/905 |
| 6,577,248 | B1 | 6/2003 | Hjelmvik | |
| 6,642,854 | B2 | 11/2003 | McMaster | |
| 7,135,991 | B2 | 11/2006 | Slemmer et al. | |
| 7,391,339 | B2 | 6/2008 | Howard et al. | |
| 7,783,530 | B2 | 8/2010 | Slemmer et al. | |
| 7,855,661 | B2 | 12/2010 | Ponert | |
| 8,232,745 | B2 | 7/2012 | Chemel et al. | |
| 8,335,711 | B2 | 12/2012 | Burdick | |
| 8,540,398 | B2 | 9/2013 | Harris | |
| 8,723,689 | B2 | 5/2014 | Mimeault | |
| 8,947,260 | B2 | 2/2015 | Fukushima | |
| 9,111,449 | B2 | 8/2015 | Cecchet | |
| 9,378,640 | B2 | 6/2016 | Mimeault et al. | |
| 9,460,613 | B1 * | 10/2016 | Whiting | G06V 10/764 |
| 9,466,213 | B2 | 10/2016 | Fayfield et al. | |
| 9,852,629 | B2 | 12/2017 | Englen et al. | |
| 11,004,337 | B2 | 5/2021 | Subramanya | |
| 2004/0145491 | A1 | 7/2004 | Nascimento | |
| 2005/0103116 | A1 | 5/2005 | Kopp | |
| 2007/0050240 | A1 | 3/2007 | Belani et al. | |
| 2007/0210935 | A1 | 9/2007 | Yost et al. | |
| 2008/0001551 | A1 * | 1/2008 | Abbondanzio | A61L 9/03 315/291 |
| 2010/0017249 | A1 | 1/2010 | Fincham | |
| 2011/0203638 | A1 | 8/2011 | O'Neill | |
| 2011/0227531 | A1 | 9/2011 | Rajakaruna | |
| 2012/0044350 | A1 | 2/2012 | Verfuerth | |
| 2012/0155712 | A1 | 6/2012 | Paul et al. | |
| 2013/0061257 | A1 | 3/2013 | Takaya | |
| 2013/0329434 | A1 | 12/2013 | Packard et al. | |
| 2014/0112101 | A1 * | 4/2014 | Rodrich | G01S 15/86 367/93 |
| 2014/0167912 | A1 | 6/2014 | Snyder et al. | |
| 2014/0294634 | A1 | 10/2014 | Crowsley | |
| 2014/0322086 | A1 | 10/2014 | Chak | |
| 2014/0375206 | A1 | 12/2014 | Holland | |
| 2015/0016158 | A1 | 1/2015 | Paik | |
| 2015/0028750 | A1 | 1/2015 | Chen | |
| 2015/0178640 | A1 | 6/2015 | Balakrishnan et al. | |
| 2015/0293504 | A1 | 10/2015 | Blum et al. | |
| 2015/0296599 | A1 | 10/2015 | Recker et al. | |
| 2016/0253748 | A1 | 9/2016 | Levy et al. | |
| 2018/0054490 | A1 * | 2/2018 | Wadhwa | G08G 1/0129 |
| 2019/0362457 | A1 | 11/2019 | Mozarkar | |
| 2020/0086853 | A1 * | 3/2020 | Kumar | G06Q 50/188 |

FOREIGN PATENT DOCUMENTS

| | | | |
|---|---|---|---|
| KR | 101456967 | B1 | 11/2014 |
| WO | 2000047794 | A1 | 8/2000 |
| WO | 2003000520 | A1 | 1/2003 |
| WO | 2015033256 | A1 | 3/2015 |
| WO | 2015059691 | A1 | 4/2015 |

OTHER PUBLICATIONS

Delibaltov, Diana et al., "Parking Lot Occupancy Determination From Lamp-Post Camera Images," 2013 16th International IEEE Conference on Intelligent Transportation Systems (ITSC), Conference Date Oct. 6-9, 2013, Publisher IEEE, Kurhaus, the Hague, the Netherlands.

Lee, Sangwon, et al., "Intelligent Parking Lot Application Using Wireless Sensor Networks," International Symposium on Collaborative Technologies and Systems (CTS), 2008, Conference Dates May 19-23, 2008, Publisher IEEE, pp. 48-57.

O'Malley, Lynda, "Smart Lighting: The Gateway to the Connected Home and Iot Markets," https://marsdd.com/news-and-insights/smart-lighting-the-gateway-to-the-connected-home-and-iot-markets/, Dated Sep. 29, 2015.

Repas, Robert, "Wireless Sensor Network Aids Travelers in Parking Their Cars and Trucks," http://.machinedesign.com/technologies/wireless-sensor-network-aids-travelers-parking-their-cars-and-trucks, Dated Sep. 8, 2009.

* cited by examiner

| CURRENT LED OUTPUT POWER | AMBIENT LIGHT VALUE | MOTION TIMER ACTIVE | SET OUTPUT POWER |
|---|---|---|---|
| DEFAULT SETTINGS:<br>OFF=0<br>LOW=25%<br>HIGH=100% | DEFAULT SETTINGS:<br>HIGH=45 FC<br>NEUTRAL=35 FC | DEFAULT SETTINGS:<br>YES=WITHIN 5 MINUTES OF MOTION | DEFAULT SETTINGS:<br>OFF=0<br>LOW=25%<br>HIGH=100% |
| OFF | >=HIGH | YES | OFF |
| OFF | >=HIGH | NO | OFF |
| LOW | >=HIGH | YES | OFF |
| LOW | >=HIGH | NO | OFF |
| HIGH | >=HIGH | YES | OFF |
| HIGH | >=HIGH | NO | OFF |
| OFF | >=NEUTRAL<HIGH | YES | OFF |
| OFF | >=NEUTRAL<HIGH | NO | OFF |
| LOW | >=NEUTRAL<HIGH | YES | LOW |
| LOW | >=NEUTRAL<HIGH | NO | LOW |
| HIGH | >=NEUTRAL<HIGH | YES | HIGH |
| HIGH | >=NEUTRAL<HIGH | NO | LOW |
| OFF | >=NEUTRAL | YES | HIGH |
| OFF | >=NEUTRAL | NO | LOW |
| LOW | >=NEUTRAL | YES | HIGH |
| LOW | >=NEUTRAL | NO | LOW |
| HIGH | >=NEUTRAL | YES | HIGH |
| HIGH | >=NEUTRAL | NO | LOW |

FIG. 24B

FIG. 39
SPACES AVAILABLE
RESIDENT 292
STUDENT 586
EMPLOYEE 506
ACCESSIBLE 22
ELECTRIC VEHICLE 56

LIGHTING FIXTURE DATA HUBS AND SYSTEMS AND METHODS TO USE THE SAME

PRIORITY & CROSS-REFERENCE TO RELATED APPLICATIONS

The present application is related to, claims the priority benefit of, and is a continuation patent application of U.S. patent application Ser. No. 17/584,295, filed Jan. 25, 2022, which is related to, claims the priority benefit of, and is a U.S. continuation-in-part patent application of, U.S. patent application Ser. No. 17/002,642, filed Aug. 25, 2020 and issued as U.S. Pat. No. 11,233,665 on Jan. 25, 2022, which is related to, and claims the priority benefit of, and is a U.S. continuation-in-part patent application of, U.S. patent application Ser. No. 16/240,674, filed Jan. 4, 2019 and issued as U.S. Pat. No. 10,755,569 on Aug. 25, 2020, which a) is related to, and claims the priority benefit of, U.S. Provisional Patent Application Ser. No. 62/613,662, filed Jan. 4, 2018, and b) is related to, claims the priority benefit of, and is a U.S. continuation-in-part patent application of, U.S. Non-provisional patent application Ser. No. 15/740,649, filed Dec. 28, 2017, which is related to, claims the priority benefit of, and is a U.S. national stage application of, PCT Patent Application Serial No. PCT/US2016/040143, filed Jun. 29, 2016 and published as WO 2017/004235 A1 on Jan. 5, 2017, which is related to, and claims the priority benefit of, U.S. Provisional Patent Application Ser. No. 62/186,101, filed on Jun. 29, 2015, and U.S. Provisional Application Ser. No. 62/301,320, filed on Feb. 29, 2016. The contents of each of the foregoing patent applications are hereby incorporated by reference in their entirety into this disclosure.

TECHNICAL FIELD

The present disclosure generally relates to area lighting fixtures and, more specifically, to lighting fixtures enabling data communication with a network.

BACKGROUND

Parking guidance, way-finding, occupancy status, auto-pay and other client-based systems, often referred to as parking commerce systems (PCS), are becoming more desirous among parking facility owners and operators to support their efforts to maximize their financial investment. Generally, a PCS provides drivers of vehicles guidance on where available (i.e., open) parking spaces are located within a parking facility by aisle or floor using visual cues or message boards, and may include other information. Commonly such systems involve various types of vehicle sensing and monitoring and are often installed as standalone units in a parking facility. Because the PCS needs to transmit and/or receive data and information obtained from field located sensors, power is needed to accomplish these tasks. The necessarily extensive wired infrastructure of such systems can be very cumbersome to retrofit in existing parking facilities. The infrastructure required to bring power to each sensor and indicator typically includes separate wiring, rigid conduit, cable trays, J-boxes, hangers, etc. This infrastructure can push the cost in excess of $500.00 per space and often is the deciding factor in whether a system is economically justifiable and a worthy investment. Often a PCS using past methodologies may not easily scale to small and medium sized parking facilities and consequently is not deployed in such applications. Accordingly, a need exists for a solution to lower the cost of the implementing parking commerce systems.

BRIEF DESCRIPTION

The present disclosure includes disclosure of a data hub comprising an annunciator configured to generate a first indication and a second indication; a sensor configured to detect a zone comprising a single or plurality of parking spaces, pedestrians or other activity areas in a vicinity of the data hub and to determine whether or not one or more vehicles and/or one or more pedestrians, and/or other activities are present within the zone, the sensor further configured to emit one or more signals corresponding to said detection; an on-board processor in communication with the annunciator and the sensor, the processor configured to receive the one or more signals from the sensor and operable to direct the annunciator to generate the first indication or the second indication in response to the signal; and a sensor unit housing having at least portions of the annunciator, the sensor, and the on-board processor located therein, the sensor unit configured to attach to a device, housing, or freestanding such that power supplied to the device is also used to supply power to the data hub. In various embodiments, the first indication is emitted light of a first color, and wherein the second indication is emitted light of a second color. In various embodiments, the first indication is emitted red light, and wherein the second indication is emitted green light. In various embodiments, when at least one of the one or more signals corresponds to the detection of a vehicle, pedestrian and/or other activity in each zone of the singular or plurality of parking spaces, drive lane, or other activity area, the processor is operable to direct the annunciator to generate the first indication. In various embodiments, when at least one of the one or more signals corresponds to the detection of a vehicle, pedestrian, or other activity in a defined zone of the single or plurality of parking spaces, drive lane or other activity area the processor is operable to direct the annunciator to generate the first indication of emitted red light (or light of a first color). In various embodiments, when at least one of the one or more signals corresponds to the detection of a lack of a vehicle in at least one parking space of the plurality of parking spaces, the processor is operable to direct the annunciator to generate the second indication. In various embodiments, when at least one of the one or more signals corresponds to the detection of a lack of a vehicle in at least one parking space of the plurality of parking spaces, the processor is operable to direct the annunciator to generate the second indication of emitted green light (or light of a second color).

In various embodiments, an exemplary data hub further comprises a data controller in communication with the processor and configured to receive the at least one signal from the sensor, the data controller further configured to interrogate the at least one signal and to communicate the interrogated at least one signal to the processor. In various embodiments, the processor further comprises a data controller configured to interrogate the at least one signal. In various embodiments, an exemplary data hub further comprises a light source in communication with the processor and configured to illuminate at least a portion of the zone. In various embodiments, an exemplary data hub further comprises a power controller configured to couple to a power line that supplies high voltage, lower voltage or power over ethernet (POE) power to the device, configured to provide electrical power to the annunciator, the sensor, and the processor, and further configured to change a voltage and or frequency of power. In various embodiments, an exemplary data hub further comprises a power controller configured to provide electrical power to the annunciator, the sensor, the processor, and the data controller. In various embodiments, an exemplary data hub further comprises a power controller configured to provide electrical power to the annunciator, the sensor, the processor, and the light source. In various embodiments, an exemplary data hub further comprises a communication module in communication with the processor, wherein the communication module is configured to communicate with a network. In various embodiments, an exemplary data hub further comprises a power controller configured to provide electrical power to the annunciator, the sensor, the processor, and the communication module.

In various embodiments, an exemplary data hub comprises an annunciator configured to generate a first indication and a second indication; a sensor configured to detect a zone comprising a single or plurality of parking spaces, pedestrians or other activity areas in a vicinity of the data hub and to determine whether or not one or more vehicles and/or one or more pedestrians, and/or other activities are present within the zone, the sensor further configured to emit one or more signals corresponding to said detection; a gateway in communication with the on-board processor and annunciator, the on-board processor configured for EDGE computing and processing to receive and analyze the one or more signals from the sensor, communicate such sensor signal to the gateway, and operable allow the gateway to direct the annunciator to generate the first indication or the second indication in response to the signal; and a sensor unit housing having at least portions of the annunciator, the sensor, and the on-board processor located therein, the sensor unit configured to attach to a device, housing, or freestanding such that power supplied to the device is also used to supply power to the data hub. In various embodiments, the first indication is emitted light of a first color, and wherein the second indication is emitted light of a second color. In various embodiments, the first indication is emitted red light, and wherein the second indication is emitted green light. In various embodiments, when at least one of the one or more signals corresponds to the detection of a vehicle, pedestrian and/or other activity in each zone of the singular or plurality of parking spaces, drive lane, or other activity area, the edge processed status of that zone is relayed to the gateway which in turn directs the annunciator to generate the first indication. In various embodiments, when at least one of the one or more signals corresponds to the detection of a vehicle, pedestrian, or other activity in a defined zone of the single or plurality of parking spaces, drive lane or other activity area the gateway receives the zone status and is operable to direct the annunciator to generate the first indication of emitted red light (or light of a first color). In various embodiments, when at least one of the one or more signals corresponds to the detection of a lack of a vehicle, pedestrian or other movement in at least one parking space of the plurality of parking spaces or detected zone, the gateway is operable to direct the annunciator to generate the second indication. In various embodiments, when at least one of the one or more signals corresponds to the detection of a lack of a vehicle, pedestrian or other activity in at least one parking space of the plurality of parking spaces, the gateway is operable to direct the annunciator to generate the second indication of emitted green light (or light of a second color). In various embodiments, an exemplary data hub further comprises a power controller configured to couple to a power line that supplies high voltage, lower voltage or power over ethernet (POE) power to the device, configured to provide electrical power to the annunciator, the sensor, and the processor, and further configured to change a voltage and/or frequency of power. In various embodiments, an exemplary data hub further comprises a power controller configured to provide electrical power to the annunciator, the sensor, the processor, and the data controller. In various embodiments, an exemplary data hub further comprises a power controller configured to provide electrical power to the annunciator, the sensor, the processor, and the light source. In various embodiments, an exemplary data hub further comprises a communication module in communication with the processor, wherein the communication module is configured to communicate with a network. In various embodiments, an exemplary data hub further comprises a power controller configured to provide electrical power to the annunciator, the sensor, the processor, and the communication module.

In various embodiments, the sensor is operable to communicate the signal to the on-board EDGE processor, which in-turn communicates with the gateway wirelessly via Bluetooth, Wi-Fi, radio, and/or consumer infrared protocols. In various embodiments, the communication module is operable to communicate with the network wirelessly via Bluetooth, Wi-Fi, radio, and/or consumer infrared protocols. In various embodiments, the communication module is operable to communicate with the network via TCP/IP protocol. In various embodiments, the sensor unit housing comprises a boss extending therefrom and having a passage defined therethrough, the boss configured to fit within an aperture defined within the device so to attach the data hub to the device. In various embodiments, the boss is threaded, and wherein the data hub is attached to the device by threading a nut over the boss within the device. In various embodiments, the power supplied to the device is supplied by a high voltage or low voltage power line, and whereby at least part of the power line extends into the passage of the boss and into the sensor unit housing.

In various embodiments, an exemplary data hub further comprises a power controller configured to provide power to the annunciator, the sensor, and the processor, the power controller configured to couple to the high voltage or low voltage power line. In various embodiments, an exemplary data hub further comprises a power controller configured to provide power to the annunciator, the sensor, the processor, and to a light of the light source, the power controller configured to couple to the power line. In various embodiments, an exemplary data hub further comprises a housing lid configured to couple to the sensor unit housing. The housing lid can be configured to fully enclose the data hub and allow its free-standing installation, independent of a light or fixture. In various embodiments, an exemplary data hub further comprises a housing lid configured to couple to the sensor unit housing, the housing lid comprising a boss extending therefrom and having a passage defined therethrough, the boss configured to fit within an aperture defined within the device so to attach the data hub to the device. In various embodiments, the boss is threaded, and wherein the data hub is attached to the device by threading a nut over the boss within the device. In various embodiments, the power supplied to the device is supplied by a high voltage or low voltage power line, and whereby at least part of the power line extends into the passage of the boss and into the sensor unit housing. In various embodiments, an exemplary data hub further comprises a power controller configured to provide power to the annunciator, the sensor, and the processor, the power controller configured to couple to the high voltage or low voltage power line. In various embodiments, an exemplary data hub further comprises a power controller configured to provide power to the annunciator, the sensor, the processor, and to a light of the light source, the power controller configured to couple to the high voltage or low voltage power line.

In various embodiments, the sensor unit housing is configured to attach to the device such that the annunciator, the sensor, and the processor are located outside of the device. In various embodiments, the sensor unit housing is configured to attach to the device such that the annunciator, the sensor, and the processor are located inside of the device. In various embodiments, the device comprises a device housing and a cover reversibly attached to the device housing, wherein the device housing and the cover define a volume therein, wherein the sensor unit housing is at least partially within the volume. In various embodiments, the device comprises a device housing. In various embodiments, the device comprises a fixture. In various embodiments, the device comprises a light fixture. In various embodiments, the sensor comprises a camera. In various embodiments, the sensor is selected from the group consisting of an infrared sensor, an ultrasonic sensor, a magnetic or other sensor. In various embodiments, the data controller uses learned intelligence to determine whether a space is occupied, pedestrians are in the designated zone or other activities are present and operates upon the learned intelligence to actuate the annunciator. In various embodiments, the processor uses learned intelligence to determine whether a space is occupied, pedestrians are in the designated zone or other activities are present and operates upon the learned intelligence to actuate the annunciator. In various embodiments, the annunciator comprises a light source. In various embodiments, the annunciator comprises an audio source comprising a speaker and/or microphone. In various embodiments, the annunciator further comprises an audio source comprising a speaker and/or microphone.

In various embodiments, the communication module includes a receiver and is structured to receive data from the network and to communicate the data to the data controller, and the data controller is structured change the operation of a light source and/or the annunciator in response to the data. In various embodiments, the communication module includes a receiver and is structured to receive data from the network and to communicate the data to the gateway, and the gateway is structured to direct the operation of a light source and/or the annunciator in response to the data. In various embodiments, the data includes a broadcast, and the annunciator is structured to transmit the broadcast. In various embodiments, an exemplary data hub further comprises a discharge unit coupled thereto, the discharge unit configured to discharge a scent or fragrance from a source of scent or fragrance. In various embodiments, the discharge unit is configured to discharge the scent or fragrance when sensor senses the one or more pedestrians within the zone or the environmental air conditions dictate such action. In various embodiments, the device comprises at least a cover, and wherein the sensor unit housing is configured to couple to the cover. In various embodiments, the cover has a cover aperture defined therethrough, and wherein the sensor unit housing is configured to couple to the cover by way of a boss of the sensor unit housing being positioned within the cover aperture. In various embodiments, the sensor unit housing is configured to attach to the device outside of the device. In various embodiments, the sensor unit housing is configured to attach to the device inside of the device.

In various embodiments, an exemplary data hub further comprises the device. In various embodiments, the device comprises the sensor unit housing configured to couple to the cover or lid. In various embodiments, the cover comprises a plurality of optical elements. In various embodiments, the cover includes a diffusion surface treatment. Such device can be high voltage, or low voltage power from line power, adjacent light, fixture or other power source.

In various embodiments, an exemplary data hub further comprises the device. In various embodiments, the device comprises a light fixture, and wherein the sensor unit housing is configured to couple to the light fixture. In various embodiments, the device comprises a device housing, and wherein the sensor unit housing is configured to couple to the device housing. In various embodiments, the device comprises a light fixture having a cover, and wherein the sensor unit housing is configured to couple to the cover. In various embodiments, the cover comprises a plurality of optical elements. In various embodiments, the cover includes a diffusion surface treatment.

In various embodiments, the light fixture comprises a flange, and wherein the cover couples to the light fixture at the flange. In various embodiments, an exemplary data hub further comprises a seal positioned between the sensor unit housing and the device. In various embodiments, the annunciator comprises a plurality of light emitting diodes. In various embodiments, the annunciator comprises a plurality of red-green-blue light emitting diodes. In various embodiments, the power controller is further configured to provide surge protection.

In various embodiments, an exemplary data hub further comprises an audio source configured to emit and/or receive an audio signal. In various embodiments, the audio source is configured to emit and/or receive the audio signal upon detection of the one or more pedestrians by the sensor. In various embodiments, the audio source is configured to emit and/or receive the audio signal upon detection of the one or more vehicles by the sensor. In various embodiments, the audio source is configured to emit the audio signal upon receipt of instructions from a handheld or smart device in wireless communication with the data hub, emergency call box/button or other defined emitted signal. In various embodiments, the audio source is configured to emit the audio signal upon receipt of instructions from a panic button in wired or wireless communication with the data hub. In various embodiments, an exemplary data hub is configured to communicate with one or more additional data hubs in wired or wireless communication with the data hub.

In various embodiments, an exemplary data hub forms a system, the system further comprising one or more additional data hubs. In various embodiments, an exemplary data hub forms a system, the system further comprising one or more additional data hubs, wherein the data hub and the one or more additional data hubs may be in communication with a cloud connector via direct wired connection, or wireless communication via direct link or access points. In various embodiments, an exemplary data hub forms a system, the system further comprising one or more additional data hubs, wherein the data hub and the one or more additional data hubs are in wireless communication with a cloud computing service via a local Ethernet or cellular connection. In various embodiments, the sensor is configured to obtain license plate information from a license plate of at least one of the one or more vehicles. In various embodiments, the sensor is further configured to determine which parking space of the plurality of parking spaces within the zone one of the one or more vehicles is parked. In various embodiments, the processor is configured to transmit a location of the parking space of the plurality of parking spaces within the zone one of the one or more vehicles is parked to a handheld device in wireless communication with the system. In various embodiments, an exemplary data hub forms a system, the system further comprising a second data hub located at an entrance of a parking lot or garage and a third data hub location at an exit of the parking lot or garage, wherein a second sensor of the second data hub can identify a particular vehicle upon entry of the parking lot or garage, whereby the sensor can identify a parking space within the plurality of parking spaces where the particular vehicle parks, and whereby a third sensor of the third data hub can identify the particular vehicle upon exit of the parking lot or garage. In various embodiments, an exemplary data hub is further configured to calculate the duration of stay and/or a parking fee based upon a date and time the particular vehicle entered the parking lot, garage, and/or space and a date and time the particular vehicle exited the parking lot, garage, and/or space potentially determined based upon the vehicle parking location.

In various embodiments, the sensor or remote mounted photo control is configured to detect an ambient light level, and whereby the processor is configured to receive the detected ambient light level and direct the light source to fully illuminate, partially illuminate, or illuminate at a higher level than a then-current level of illumination. In various embodiments, the sensor is configured to detect an ambient light level, and whereby the processor is configured to receive the detected ambient light level and direct the light source to discontinue illumination, partially illuminate, or illuminate at a lower level than a then-current level of illumination. In various embodiments, the sensor or remote located photocell is configured to detect an ambient light level, and whereby the processor is configured to receive the detected ambient light level and direct the light source to illuminate when the detected ambient light level is low and to discontinue illumination when the detected ambient light level is high. In various embodiments, the data hub further comprises a plug or port configured therein or extending therefrom, the plug or port configured to provide power to an electronic device from a power line that supplies the power to the device. In various embodiments, the data hub further comprises a plug or port configured therein or extending therefrom, the plug or port configured to provide the power to an electric vehicle from the power controller that receives the power from the power line.

The present disclosure includes disclosure of a system, comprising a plurality of data hubs, each data hub comprising an annunciator configured to generate a first indication and a second indication; a sensor (which, in various embodiments, may be or comprise a camera-based sensor) configured to detect a zone comprising a plurality of parking spaces in a vicinity of the data hub and to determine whether or not one or more vehicles and/or one or more pedestrians are present within the zone, the sensor further configured to emit one or more signals corresponding to said detection; a gateway in communication with an on-board processor and annunciator, the on-board processor configured for EDGE computing and processing to receive and analyze the one or more signals from the sensor, communicate said sensor status/signals to the gateway, and operable to allow the gateway to direct the annunciator to generate the first indication or the second indication in response to the signal; and a sensor unit housing having at least portions of the annunciator, the sensor, and the processor located therein, the sensor unit configured to attach to a device such that power supplied to the device is also used to supply power to the data hub.

In various embodiments, the system further comprises a cloud connector in wireless communication with the plurality of data hubs. In various embodiments, the system further comprises a cloud computing service in wired communication with the plurality of data hubs via a local Ethernet connection and/or cellular. In various embodiments, a first sensor of a first of the plurality of data hubs is configured to detect a vehicle of the plurality of vehicles at a first location, and wherein a second sensor of a second of the plurality of data hubs is configured to detect the vehicle at a second location different from the first location. In various embodiments, a first sensor of a first of the plurality of data hubs is configured to detect a vehicle of the plurality of vehicles in a parking space. In various embodiments, at least a first sensor, or series of sensors, in communication with the system is configured to detect the vehicle at an entrance to a parking lot or garage, and wherein at least a second sensor, or series thereof, in communication with the system is configured to detect the vehicle at an exit of the parking lot or garage. In various embodiments, the first sensor is a sensor of one of the plurality of data hubs, and wherein the second sensor is a sensor of another of the plurality of data hubs. In various embodiments, an exemplary system is configured to detect a vehicle at an entrance to a parking lot or garage, configured to detect the vehicle within the parking lot or garage, configured to detect a location where the vehicle is parked within the parking lot or garage, and configured to detect the vehicle at an exit of the parking lot or garage. In various embodiments, an exemplary system is further configured to calculate the total duration of stay and/or calculate a parking fee based upon a date and time the vehicle entered the parking lot or garage and a date and time the vehicle exited the parking lot or garage, based upon location in which the vehicle is parked. In various embodiments, an exemplary system is further configured to transmit the location where the vehicle is parked within the parking lot or garage to a handheld, kiosk or other device in wired or wireless communication with the system.

The present disclosure includes disclosure of a method for monitoring a parking zone, comprising the steps of (such as executing on or using a processor, as referenced herein) operating a data hub, comprising an annunciator configured to generate a first indication and a second indication; a sensor configured to detect a zone comprising a plurality of parking spaces in a vicinity of the data hub and to determine whether or not one or more vehicles and/or one or more pedestrians are present within the zone, the sensor further configured to emit one or more signals corresponding to said detection; a processor in communication with the annunciator and the sensor, the processor configured to receive the one or more signals from the sensor and operable to direct the annunciator to generate the first indication or the second indication in response to the signal; and a sensor unit housing having at least portions of the annunciator, the sensor, and the processor located therein, the sensor unit configured to attach to a device such that power supplied to the device is also used to supply power to the data hub; detecting the zone using the sensor to determine whether or not one or more vehicles and/or one or more pedestrians are present within the zone; emitting one or more signals corresponding to said detection; and generating one of the first indication and the second indication using the annunciator based upon the emitted one or more signals, wherein the generation is facilitated by the processor. In various embodiments, the step of generating is performed to generate the first indication, the first indication indicative of the one or more signals corresponding to the detection of a vehicle in each parking space of the plurality of parking spaces. In various embodiments, the step of generating is performed to generate the second indication, the first indication indicative of the one or more signals corresponding to the detection of a lack of a vehicle in at least one parking space of the plurality of parking spaces.

The present disclosure includes disclosure of a data hub, comprising an annunciator configured to generate a first indication and a second indication; one or more sensors configured to detect a zone comprising a single parking space or plurality of parking spaces, one or more pedestrians, or one or more other activity areas in a vicinity of the data hub and to determine whether or not one or more vehicles and/or the one or more pedestrians and/or one or more other activities occurring in the one or more other activity areas are present within the zone, the one or more sensors further configured to emit one or more signals corresponding to said detection; a gateway in communication with an on-board processor and the annunciator, the on-board processor configured for EDGE computing and processing to receive and analyze the one or more signals from the one or more sensors, communicate said one or more signals to the gateway, and operable to allow the gateway to direct the annunciator to generate the first indication or the second indication in response to the one or more signals; and a sensor unit housing having at least portions of the annunciator, the one or more sensors, and the on-board processor located therein, the sensor unit configured to attach to a device, housing, or freestanding element such that power supplied to the device is also used to supply power to the data hub.

The present disclosure includes disclosure of a data hub, wherein the first indication is emitted light of a first color, and wherein the second indication is emitted light of a second color.

The present disclosure includes disclosure of a data hub, wherein the first indication is emitted red light, and wherein the second indication is emitted green light.

The present disclosure includes disclosure of a data hub, wherein when at least one of the one or more signals corresponds to the detection of the one or more vehicles, pedestrians and/or other activities in the zone of the single parking space or plurality of parking spaces, drive lane, or other activity area, an edge processed status of the zone is relayed to the gateway which in turn directs the annunciator to generate the first indication.

The present disclosure includes disclosure of a data hub, wherein when at least one of the one or more signals corresponds to the detection of a vehicle, pedestrian, or other activity in a defined zone of the single or plurality of parking spaces, drive lane or other activity area the gateway receives the zone status and is operable to direct the annunciator to generate the first indication of emitted red light.

The present disclosure includes disclosure of a data hub, wherein when at least one of the one or more signals corresponds to the detection of a lack of a vehicle, pedestrian or other movement in at least one parking space of the plurality of parking spaces or detected zone, the gateway is operable to direct the annunciator to generate the second indication.

The present disclosure includes disclosure of a data hub, wherein when at least one of the one or more signals corresponds to the detection of a lack of a vehicle, pedestrian or other activity in at least one parking space of the plurality of parking spaces, the gateway is operable to direct the annunciator to generate the second indication of emitted green light.

The present disclosure includes disclosure of a data hub, wherein the data hub further comprises a power controller configured to couple to a power line that supplies high voltage, low voltage, or power over ethernet (POE) power to the device, the power controller configured to provide electrical power to the annunciator, the one or more sensors, and the processor, and further configured to change a frequency of power.

The present disclosure includes disclosure of a data hub, wherein the data hub further comprises a power controller configured to provide electrical power to the annunciator, the one or more sensors, the processor, and the data controller.

The present disclosure includes disclosure of a data hub, wherein the data hub further comprises a power controller configured to provide electrical power to the annunciator, the one or more sensors, the processor, and the light source.

The present disclosure includes disclosure of a data hub, wherein the data hub further comprises a communication module in communication with the processor, the communication module configured to communicate with a network.

The present disclosure includes disclosure of a data hub, wherein the data hub further comprises a power controller configured to provide electrical power to the annunciator, the one or more sensors, the processor, and the gateway.

The present disclosure includes disclosure of a data hub, further comprising or coupled to a light source, wherein the gateway is configured to control lighting of the light source, and wherein the light source, the annunciator, the one or more sensors, the gateway, and the processor receive electrical power from a power controller.

The present disclosure includes disclosure of a data hub, wherein the gateway uses machine-learned intelligence to determine whether the single parking space or one or more parking spaces of the plurality of parking spaces is occupied, to determine whether the one or more pedestrians are in the zone, or whether the one or more activities are present, and operates upon the learned intelligence to actuate the annunciator.

The present disclosure includes disclosure of a data hub, wherein the one or more sensors are operable to communicate the one or more signal to the on-board processor, which in-turn communicates with the gateway wirelessly via at least one of Bluetooth, a secure private Wi-Fi network, radio, and/or consumer infrared protocols.

The present disclosure includes disclosure of a data hub, wherein the processor is configured for processing with intelligent EDGE internet of things (IoT) design with Cloud Native reporting and application programming interface (API) integration via a cellular link.

The present disclosure includes disclosure of a data hub, wherein the processor is configured to process parking space data obtained by the one or more sensors to determine a number of parking spaces available in one or more parking locations and to facilitate the display of the number of parking spaces available on at least one of a sign, a dashboard, a webpage, and/or a smartphone application.

The present disclosure includes disclosure of a data hub, wherein the processor is configured to count a number of one or more vehicles, one or more pedestrians, and/or one or more objects within the zone from data obtained by the one or more sensors.

The present disclosure includes disclosure of a data hub, wherein images and/or other data from the one or more sensors received by the gateway can be stored in a video recorder and accessed away from the gateway.

The present disclosure includes disclosure of a data hub, wherein the annunciator is configured to indicate one or more colors, in a sequence, or otherwise generate an alert when the one or more sensors sense a potential convergence between two of a pedestrian, a vehicle, and another defined object The present disclosure includes disclosure of a data hub, wherein the one or more sensors are configured for license plate recognition (LPR) to obtain license plate data, and wherein the processor is configured to process the license plate data to associate the license plate data with a particular vehicle and to determine whether parking fees are due from the operator or owner of the particular vehicle.

The present disclosure includes disclosure of a data hub, further comprising an audio source configured to emit and/or receive an audio signal.

The present disclosure includes disclosure of a data hub, further comprising an audio source configured to emit and/or receive an audio signal upon receipt of instructions from a panic button in wired or wireless communication with the data hub.

The present disclosure includes disclosure of a data hub, wherein the annunciator comprises an audio source comprising a speaker and/or microphone.

The present disclosure includes disclosure of a data hub, wherein at least one of the one or more sensors is or comprises at least one of a manual fire alarm switch, an automatic carbon monoxide detector, a smoke detector, and/or a fire detector.

The present disclosure includes disclosure of a data hub, further comprising a discharge unit coupled thereto, the discharge unit configured to discharge a scent or fragrance from a source of the scent or fragrance.

The present disclosure includes disclosure of a data hub, further comprising a plug or port configured to charge an electronic device or object selected from the group consisting of an electric vehicle, a hybrid electric vehicle, and environmental sensor, or another object requiring a source of electrical power. Since an existing light fixture is the primary location for power in a parking facility, the lighting housing and associated infrastructure can be used to power other devices including vehicle battery and other chargers.

The present disclosure includes disclosure of a data hub, wherein the annunciator is configured to emit a visual or audio signal in connection with data obtained by the one or more sensors indicating that a parking space is available or becoming available.

The present disclosure includes disclosure of a data hub, comprising an annunciator configured to generate a first indication and a second indication; one or more sensors configured to detect a zone comprising a single parking space or plurality of parking spaces, one or more pedestrians, or one or more other activity areas in a vicinity of the data hub and to determine whether or not one or more vehicles and/or the one or more pedestrians and/or one or more other activities occurring in the one or more other activity areas are present within the zone, the one or more sensors further configured to emit one or more signals corresponding to said detection; and a gateway in communication with an on-board processor and the annunciator, the on-board processor configured for EDGE computing and processing to receive and analyze the one or more signals from the one or more sensors, communicate said one or more signals to the gateway, and operable to allow the gateway to direct the annunciator to generate the first indication or the second indication in response to the one or more signals; wherein the first indication is visible at the data hub and is also visible as being projected onto a ground in the zone by the annunciator.

The present disclosure includes disclosure of a data hub, further comprising a sensor unit housing having at least portions of the annunciator, the one or more sensors, and the on-board processor located therein, the sensor unit configured to attach to a device, housing, or freestanding element such that power supplied to the device is also used to supply power to the data hub.

The present disclosure includes disclosure of a data hub, wherein when at least one of the one or more signals corresponds to the detection of the one or more vehicles, pedestrians and/or other activities in the zone of the single parking space or plurality of parking spaces, drive lane, or other activity area, an edge processed status of the zone is relayed to the gateway which in turn directs the annunciator to generate the first indication.

The present disclosure includes disclosure of a data hub, wherein when at least one of the one or more signals corresponds to the detection of a lack of a vehicle, pedestrian or other movement in at least one parking space of the plurality of parking spaces or detected zone, the gateway is operable to direct the annunciator to generate the second indication.

The present disclosure includes disclosure of a data hub, wherein the data hub further comprises a power controller configured to couple to a power line that supplies high voltage, low voltage, or power over ethernet (POE) power to the device, the power controller configured to provide electrical power to the annunciator, the one or more sensors, and the processor, and further configured to change a voltage and/or frequency of power.

The present disclosure includes disclosure of a data hub, wherein the data hub further comprises a power controller configured to provide electrical power to the annunciator, the one or more sensors, and the processor.

The present disclosure includes disclosure of a data hub, further comprising or coupled to a light source, wherein the gateway is configured to control lighting of the light source, and wherein the light source, the annunciator, the one or more sensors, the gateway, and the processor receive electrical power from a power controller.

The present disclosure includes disclosure of a data hub, wherein the data hub and/or gateway uses machine-learned intelligence to determine whether the single parking space or one or more parking spaces of the plurality of parking spaces is occupied, to determine whether the one or more pedestrians are in the zone, or whether the one or more activities are present, and operates upon the learned intelligence to actuate the annunciator.

The present disclosure includes disclosure of a data hub, wherein the one or more sensors are operable to communicate the one or more signal to the on-board processor, which in-turn communicates with the gateway wirelessly via at least one of Bluetooth, a secure private Wi-Fi network, radio, and/or consumer infrared protocols.

The present disclosure includes disclosure of a data hub, wherein the processor is configured for processing with intelligent EDGE internet of things (IoT) design with Cloud Native reporting and application programming interface (API) integration via a cellular link.

The present disclosure includes disclosure of a data hub, wherein the processor is configured to process parking space data obtained by the one or more sensors to determine a number of parking spaces available in one or more parking locations and to facilitate the display of the number of parking spaces available on at least one of a wired or wireless sign, a dashboard, a webpage, and/or a smart device smartphone application.

The present disclosure includes disclosure of a data hub, wherein images and/or other data from the one or more sensors received by the gateway can be stored in a video recorder and accessed away from the gateway.

The present disclosure includes disclosure of a data hub, wherein the annunciator is configured to indicate one or more colors, in a sequence, or otherwise generate an alert when the one or more sensors sense a potential convergence between two of a pedestrian, a vehicle, and another defined object.

The present disclosure includes disclosure of a data hub, wherein the one or more sensors are configured for license plate recognition (LPR) to obtain license plate data, and wherein the processor is configured to process the license plate data to associate the license plate data with a particular vehicle and to determine whether a prescribed time limit has been exceeded, unauthorized space occupied, and/or parking fees are due from the operator or owner of the particular vehicle.

The present disclosure includes disclosure of a data hub, further comprising an audio source configured to emit and/or receive an audio signal.

The present disclosure includes disclosure of a data hub, further comprising a visual source and/or an audio source configured to emit and/or receive a signal upon receipt of instructions from a panic button, device, and/or an audible response in wired or wireless communication with the data hub.

The present disclosure includes disclosure of a data hub, wherein the annunciator comprises an audio source comprising a speaker and/or microphone.

The present disclosure includes disclosure of a data hub, wherein at least one of the one or more sensors is or comprises at least one of an Emergency Blue Light, manual fire alarm switch, an automatic carbon monoxide detector, a smoke detector, a fire detector, and/or other detectors configured to communicate an alarm status to the gateway which in turn initiates a notification to a select party or general alarm.

The present disclosure includes disclosure of a data hub, further comprising a plug or port configured to charge an electronic device or object selected from the group consisting of an electric vehicle, a hybrid electric vehicle, and environmental sensor, or another object requiring a source of electrical power.

The present disclosure includes disclosure of a data hub, wherein the annunciator is configured to emit a visual or audio signal in connection with data obtained by the one or more sensors indicating that a parking space is available or becoming available.

The present disclosure includes disclosure of a data hub, whereby data provided to the gateway from the data hub can be processed, wirelessly transmitted to signage, and indicated within the signage, whereby the wireless transmission is selected from the group consisting of Wi-Fi, radio, Bluetooth, and Zigbee.

The present disclosure includes disclosure of a data hub, wherein the first indication is emitted light of a first color, and wherein the second indication is emitted light of a second color.

The present disclosure includes disclosure of a data hub, further comprising a discharge unit configured to discharge a desired scent or fragrance from a source of the scent or fragrance in response to detection of a pedestrian of the one or more pedestrians within the zone.

The present disclosure includes disclosure of a data hub, wherein the one or more sensors are configured to obtain license plate information from a license plate of at least one vehicle of the one or more vehicles, and wherein the data hub communicates with at least one additional data hub to detect the at least one vehicle when the at least one vehicle enters a parking lot or garage, when the at least one vehicle travels through the parking lot or garage and parks in a parking space of the plurality of parking spaces, when the at least one vehicle leaves the parking space, and when the at least one vehicle exits the parking lot or garage.

The present disclosure includes disclosure of a data hub, further configured to receive and process data from a V2X-equipped vehicle.

The present disclosure includes disclosure of a data hub, wherein the annunciator is further configured to generate a second indication, a third indication and a fourth indication; wherein the first indication is emitted light of a first color, the first color indicating an occupied parking space of the plurality of parking spaces; wherein the second indication is emitted light of a second color, the second color indicating an available parking space of the plurality of parking spaces; wherein the third indication is emitted light of a third color, the third color indicating a handicapped parking space; and wherein the fourth indication is emitted corresponding to detection of the one or more pedestrians.

The present disclosure includes disclosure of a data hub, wherein the one or more sensors includes a secondary sensor configured to detect and obtain data relative to a parking space status, the secondary sensor using a sensing mechanism selected from the group consisting of inferred (IR), LIDAR, ultrasound, magnetic, active and/or passive mounted medallions, reflector, and audio.

The present disclosure includes disclosure of a data hub, wherein the one or more sensors are is configured to detect an ambient light level, and whereby the processor is configured to receive the detected ambient light level and direct the light source to fully illuminate, partially illuminate, or illuminate at a higher level than a then-current level of illumination.

The present disclosure includes disclosure of a data hub, wherein the light source is configured to emit light as a result of the sensor identifying pedestrian motion of a pedestrian of the one or more pedestrians.

The present disclosure includes disclosure of a data hub, configured for integration with a building management system so that instructions from the building management system can be used to instruct operation of the data hub.

The present disclosure includes disclosure of a data hub, comprising an annunciator configured to generate a first indication and a second indication, one or more sensors configured to detect between one or more vehicles and one or more pedestrians and potential convergence thereof within a zone in a vicinity of the data hub and to emit one or more signals corresponding to said detection, and a gateway in communication with an on-board processor and the annunciator, the on-board processor configured to wirelessly receive and analyze the one or more signals, communicate said one or more signals to the gateway so that the gateway can generate the first indication or the second indication in response to the one or more signals.

The present disclosure includes disclosure of a data hub, further comprising a sensor unit housing having at least portions of the annunciator, the one or more sensors, and the on-board processor located therein, the sensor unit configured to attach to a device, housing, or freestanding element such that power supplied to the device is also used to supply power to the data hub.

The present disclosure includes disclosure of a data hub, wherein the one or more sensors are further configured to detect one or more activities within one or more other activity areas.

The present disclosure includes disclosure of a data hub, wherein the first indication is visible at the data hub and is also visible as a projection in the zone by the annunciator.

The present disclosure includes disclosure of a data hub, wherein the one or more sensors are further configured to determine whether or not the one or more vehicles and/or the one or more pedestrians are present within the zone.

The present disclosure includes disclosure of a data hub, wherein the data hub further comprises a power controller configured to provide electrical power to the annunciator, the one or more sensors, the gateway, and the processor.

The present disclosure includes disclosure of a data hub, further comprising or coupled to a light source.

The present disclosure includes disclosure of a data hub, wherein the gateway is configured to control lighting of the light source, and wherein the light source, the annunciator, the one or more sensors, the gateway, and the processor receive electrical power from a power controller.

The present disclosure includes disclosure of a data hub, configured to control intensity of light emitted by the light source in consideration of existing light fixtures present at or near the zone.

The present disclosure includes disclosure of a data hub, further configured to communicate with one or more remote annunciators, whereby the gateway can direct the one or more remote annunciators to display the first indication or the second indication.

The present disclosure includes disclosure of a data hub, further configured to communicate with one or more remote annunciators on or within a sign, whereby the gateway can direct the one or more remote annunciators to display the first indication or the second indication from the sign.

The present disclosure includes disclosure of a data hub, further comprising one or more insect repellers configured to emit a deterrent to deter or kill insects at or near the data hub.

The present disclosure includes disclosure of a data hub, wherein at least one sensor of the one or more sensors is configured to detect a sound or range of sounds selected from the group consisting of a saw cutting metal and a blown whistle.

The present disclosure includes disclosure of a data hub, wherein at least one sensor of the one or more sensors of one or more data hubs is configured to track movement of a pedestrian within one or more zones and the duration of time the pedestrian is tracked within the one or more zones.

The present disclosure includes disclosure of a data hub, further comprising one or more offset rings configured to generate a seal between components of the data hub so to eliminate water intrusion into the data hub.

The present disclosure includes disclosure of a data hub, wherein the annunciator is further configured to generate a third indication and a fourth indication, wherein the first indication is emitted light of a first color indicating an occupied parking space, wherein the second indication is emitted light of a second color indicating an available parking space, wherein the third indication is emitted light of a third color indicating a handicapped parking space, and wherein the fourth indication is emitted light of a fourth color indicating an available parking space with a charger configured to charge an electric vehicle or hybrid electric vehicle.

BRIEF DESCRIPTION OF THE DRAWINGS

The described embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 24B shows a table of various LED output power settings in view of ambient light, motion timers, and output power settings, according to an exemplary embodiment of the present disclosure;

FIGS. 25-27A show electrical diagrams for a sensor unit according to exemplary embodiments of the present disclosure;

Figure 1:
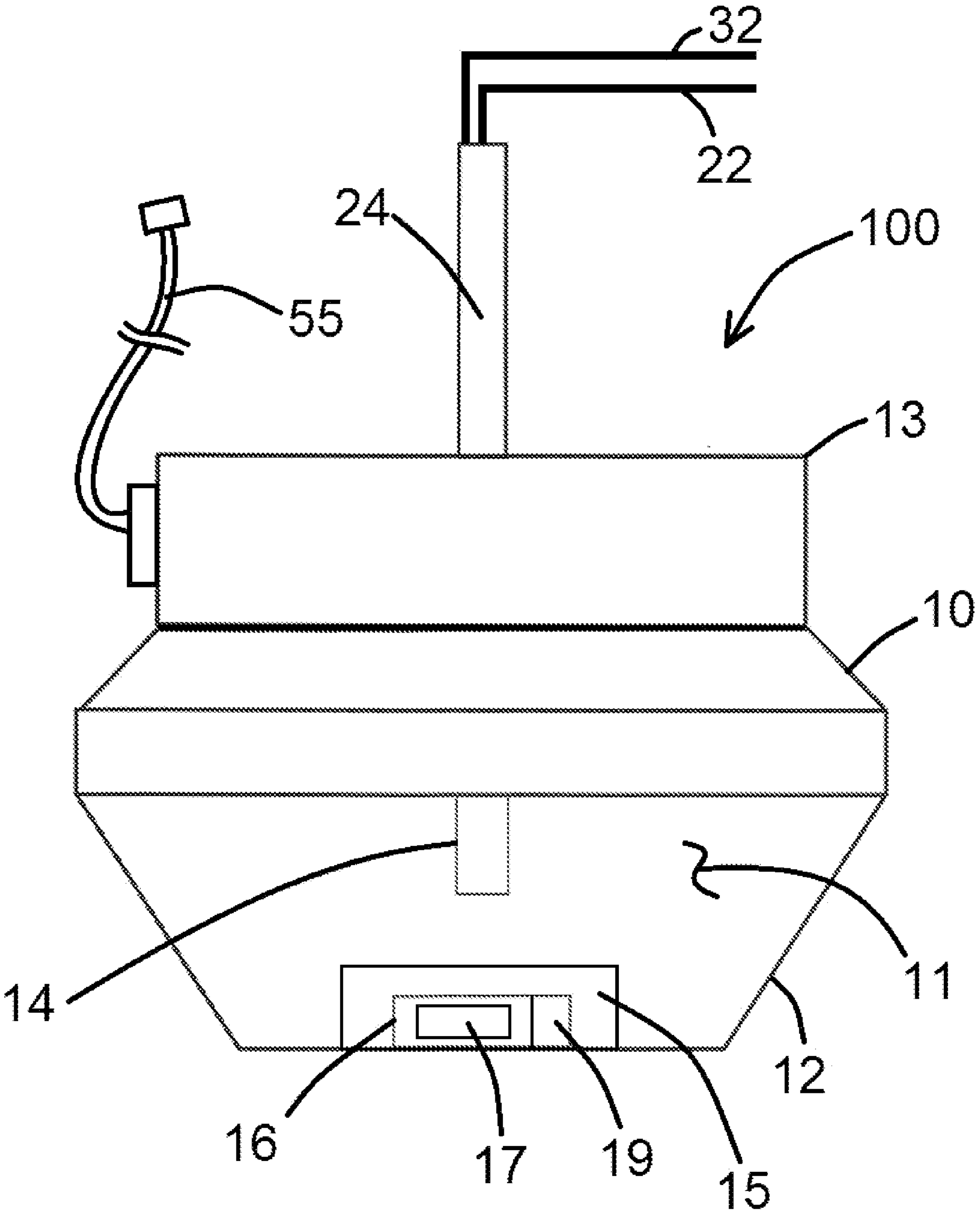
FIG. 1 shows a data hub according to exemplary embodiments of the present disclosure.

Like reference numerals indicate the same or similar parts throughout the several figures. An overview of the features, functions and configuration of the components depicted in the various figures will now be presented. It should be appreciated that not all of the features of the components of the figures are necessarily described. Some of these non-discussed features, such as various fasteners, etc., as well as discussed features are inherent from the figures. Other non-discussed features may be inherent in component geometry or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes disclosure of devices, systems and methods of a parking commerce system (PCS), including a lighting fixture data hub. The lighting fixture data hub of the present disclosure enables various aspects, features and functions of a PCS to be packaged within or attach to a lighting fixture specifically designed for such applications. Exemplary lighting fixture data hubs of the present disclosure enable efficient use of the existing infrastructure of a parking facility by eliminating redundant power and communication systems to reduce the initial cost and maintenance to implement the PCS. Exemplary lighting fixture data hubs of the present disclosure further enable consolidation and optimization of sensory and indication components, thereby further lowering the cost to implement the PCS. Further advantages of lighting fixture data hub and PCS embodiments are disclosed herein.

Many of the exemplary embodiments of the present disclosure are described with respect to parking facility applications, including the PCS. Exemplary devices, systems and methods disclosed herein may be employed in other applications, such as security and surveillance and energy management environments. Consequently, the embodiments described in the present disclosure are not limited to parking environments, parking facilities or PCS.

Figure 8A:
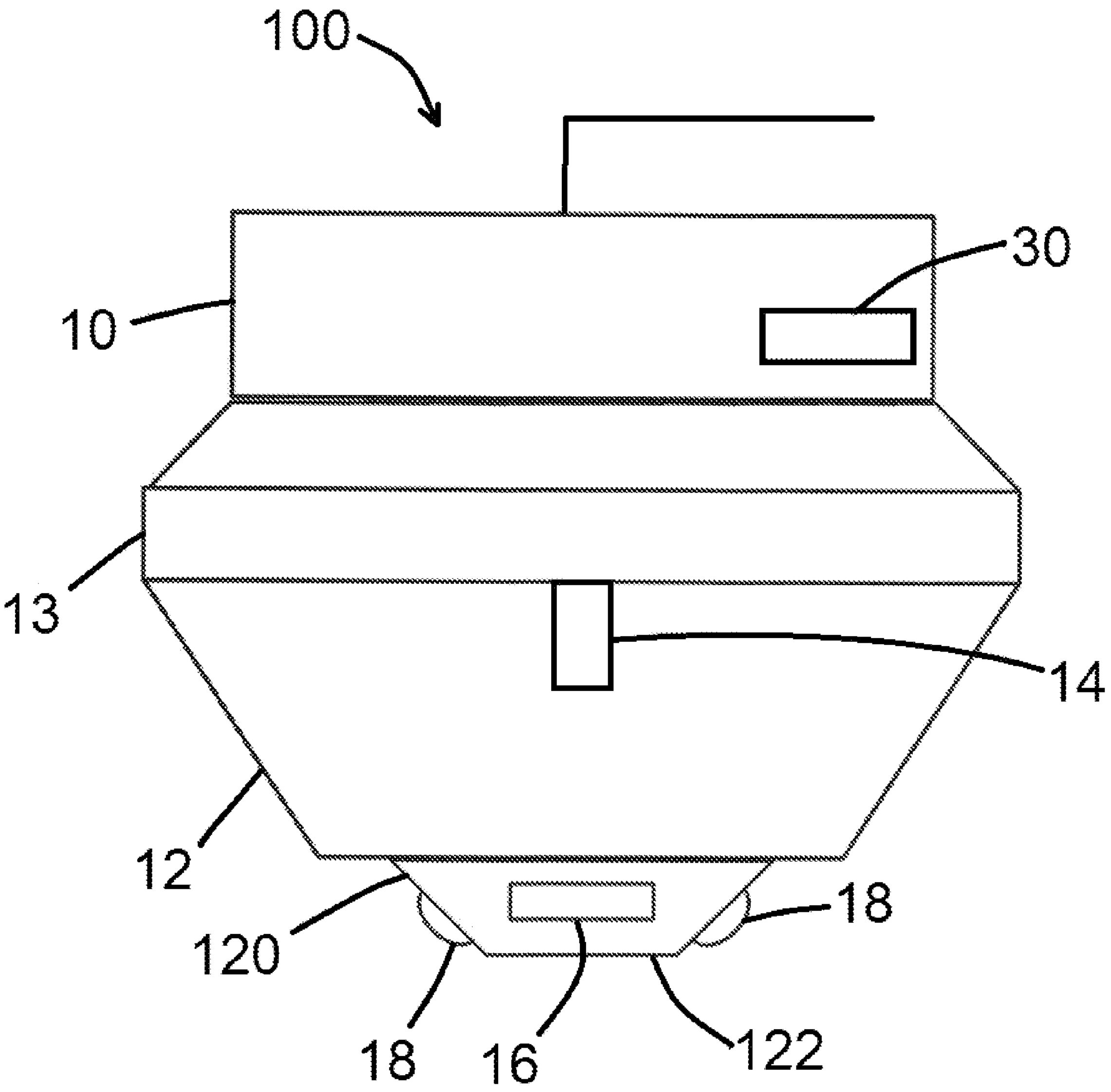
FIGS. 8A, 8B, 8C, 8D, 8E, 8F, and 8G show data hubs according to exemplary embodiments of the present disclosure.

A data hub according to at least one embodiment of the present disclosure is shown in FIG. 1. As shown in FIG. 1, a data hub 100 may include a fixture 13 defining a volume 11, the fixture 13 including a cover 12 reversibly attached to a housing 10. The cover 12 includes side walls to define a lens compartment 15 within the fixture 13. The cover 12 may be reversibly attached to the housing 10 by any suitable means, including but not limited to screws and clips. The housing 10 includes side walls to define one or more housing compartments within the fixture 13. The housing 10 may further include one or more housing apertures 21, such as shown in FIG. 8C, to enable one or more connections to the data hub 100. For example, a power line 22 may pass through the housing 10 via such an aperture to provide electrical power to the data hub 100. The data hub 100 may be employed in any desired location within or outside the parking facility.

Figure 36:
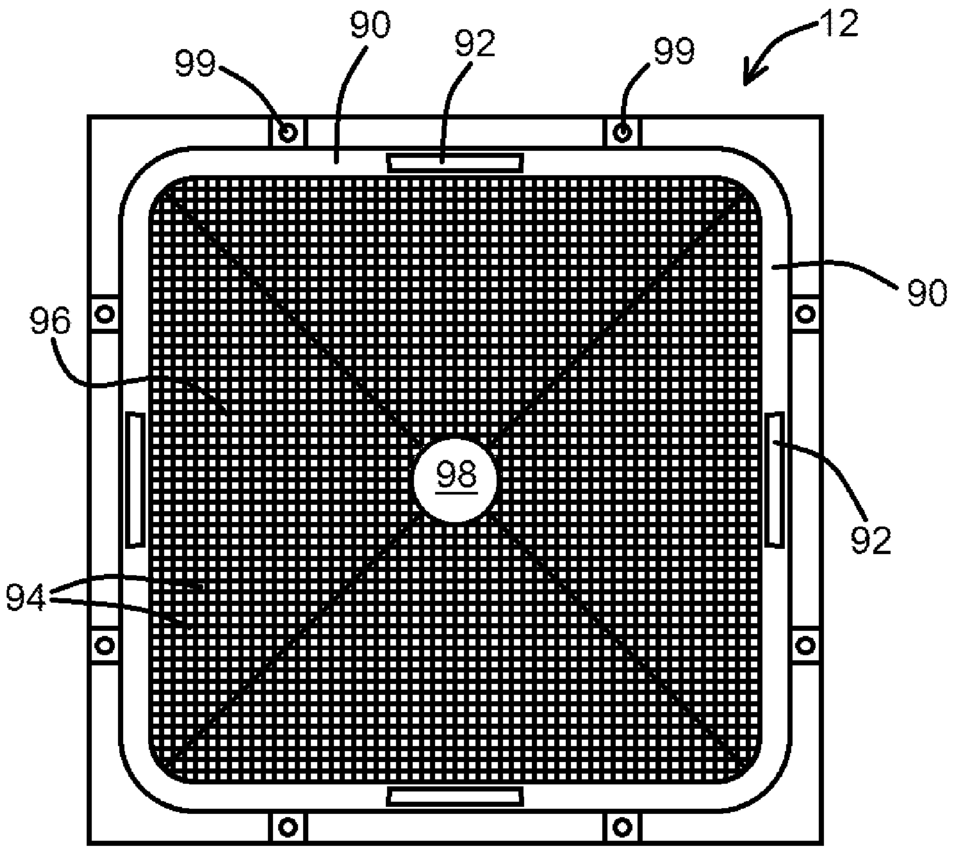
FIG. 36 shows a bottom view of a cover according to exemplary embodiments of the present disclosure.

The data hub 100 may further include a light source 14 disposed within the volume 11 of the fixture 13. The light source 14 is configured to emit a desired amount of visible light. The light source 14 may be any suitable means of providing a desired illumination of an area in the vicinity of the data hub 100 as described in further detail herein. The cover 12 may further include a plurality of optical elements 94, as shown in FIG. 36, formed therein that are configured to distribute light emitted from a light source 14 into a desired light distribution (i.e., pattern). Cover 12 may also include a diffusion surface treatment 96, such as frosted or stippling, configured to diffuse of the light emitted from the light source 14 into the area. To enable the desired light distribution, the cover 12 may be made of a substantially optically transparent or at least translucent material, including but not limited to glass, cyclic olefin copolymer (COC), polymethylmethacrolate (PMMA), polycarbonate (PC), PC/PMMA composite, silicones, fluorocarbon polymers, and polyetherimide (PEI), or other suitable material. Sidewalls 90 of cover 12, such as shown in FIG. 36, may have one or more sidewall apertures 92 defined therein, so that, for example, a sensor 18 can have a direct line of sight from within cover 12 to the outside of cover 12, as may be desired. Covers 12 of the present disclosure may also have one or more fastener apertures 99 defined therein so to receive a fastener (not shown) to fasten/couple cover 12 to one or more of a housing 10 or fixture 13, for example. A cover aperture 98, such as shown in FIG. 36, may be defined within cover 12 and be sized and/or shaped to receive a boss 124 of a sensor unit housing 122 and/or housing lid 180, as referenced herein, so to permit coupling of sensor unit housing 122 and/or housing lid 180 thereto. In another embodiment sensor unit housing 122 may be configured without a lid 180 and thus attached directly to cover 12, or housing 10, or fixture 13.

Figure 35A:
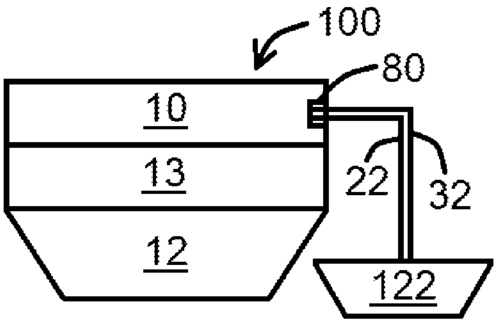
FIGS. 35A, 35B, 35C, 35D, and 35E show data hubs according to exemplary embodiments of the present disclosure.
Figure 35B:
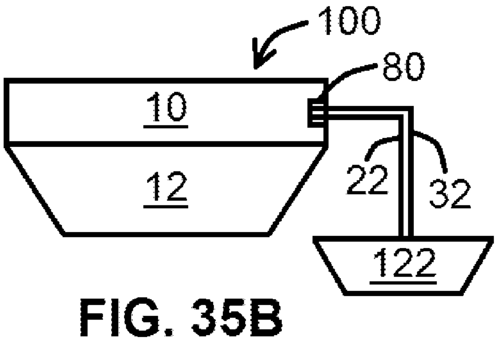
Figure 35C:
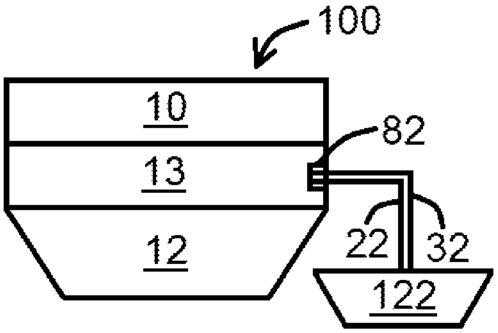
Figure 35D:
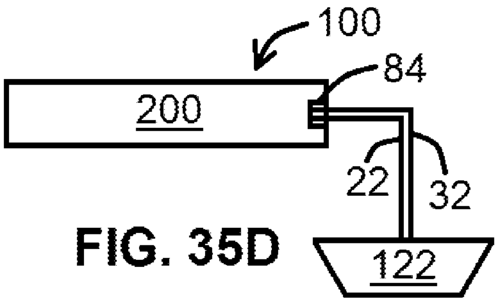
Figure 35E:
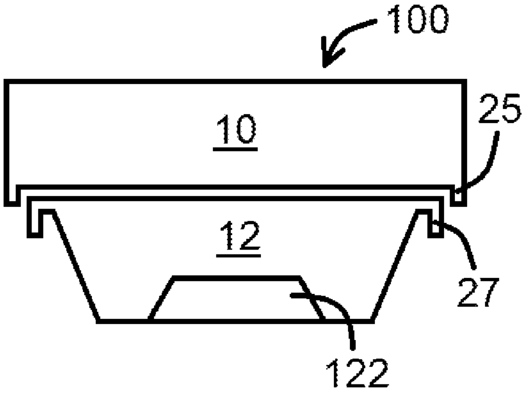
Figure 35F:
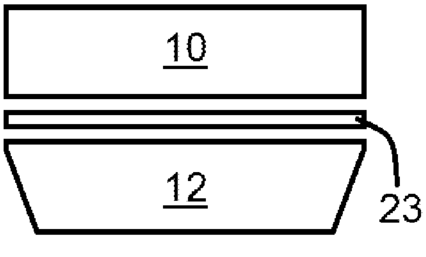
FIG. 35F shows a seal present between a housing and a cover according to exemplary embodiments of the present disclosure.
Figure 35G:
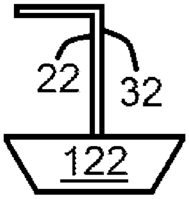
FIG. 35G shows a stand-alone sensor independent of any fixture, according to an exemplary embodiment of the present disclosure.

In addition to enabling the desired light distribution, the cover 12 further facilitates protecting the volume 11 of the fixture 13 and the components housed therein from intrusion of foreign material. A seal 23, such as shown in FIG. 35F, may be disposed between the cover 12 and the housing 10 (or between various components, such as housing 10, fixture 13, or light fixture 200 and cover 12 or sensor unit housing 122) such that, when assembled, the seal 23 prevents the intrusion of dirt, water, insects, or other foreign matter into the volume 11. The seal 23 may be made of any suitably resilient material capable of maintaining a seal between the cover 12 and the housing 10, preferably for the life of the data hub 100. In some embodiments, the cover 12 may engage a housing flange 25, such as shown in FIG. 35E, to facilitate attachment to the housing 10. Housing flange 25 may engage the housing 10 or be present upon housing 10 within a perimeter of the housing 10, thereby shielding the interface therebetween from direct exposure to the environment, thus minimizing potential intrusion into the data hub 100. Cover 12, in various embodiments, may have a cover flange 27, such as shown in FIG. 35E, around perimeter of cover 12, whereby cover flange 27 is configured to engage housing flange 25, as may be desired. A stand-alone sensor 122 independent of any fixture or light as shown in FIG. 35G.

The data hub 100 may further include/comprise an annunciator 16 disposed within the volume 11 of the fixture 13. The annunciator 16 is structured/configured to provide information to a guest using the parking facility, such as occupancy status of parking spaces within the vicinity of the data hub 100. In at least one form, the annunciator 16 may include/comprise a lighting device 17, such as one or more LEDs, configured to indicate the occupancy status of parking spaces nearby. The annunciator 16, and/or the data hub 100 in general, may further include/comprise an audio microphone and/or speaker 19 to listen for audible cues, such as verbal requests, automated requests, specific wavelength sounds, gunshot detection, etc., and/or to broadcast a visual and/or auditory messages to guests. The annunciator 16 may be any suitable means of providing desired information in the vicinity of the data hub 100 as described further herein. In certain embodiments, the annunciator 16 may be connected to the housing 10 or cover 12 and be disposed at least partially within the volume 11, as shown in FIG. 1. Alternatively, the annunciator 16 may be disposed at least partially outside the volume 11, as shown in FIGS. 3 and 8A, for example.

Figure 2:
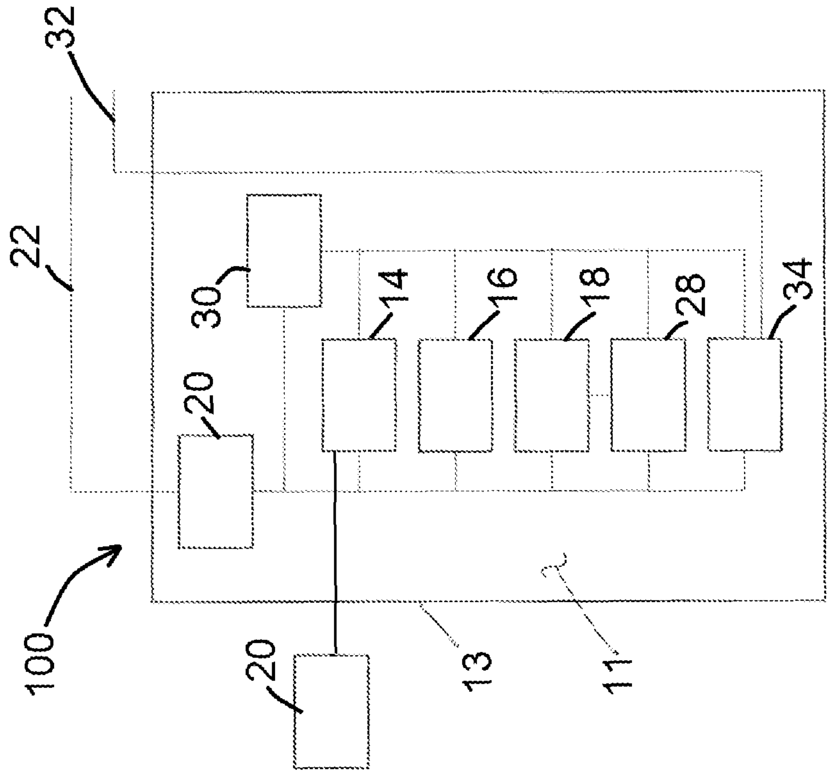
FIGS. 2, 2A, 3, and 3A show schematics of data hubs according to exemplary embodiments of the present disclosure.

FIG. 2 shows a schematic of an embodiment of the data hub 100. As shown in FIG. 2, the data hub 100 includes/comprises a power controller 20 electrically connected to an external power source via the power line 22, which may be part of the infrastructure of the parking facility. The power controller 20 can be disposed within the fixture 13 and may be further electrically connected to one or more of the light source 14, the annunciator 16, a processor 30, a data acquisition (DAQ) module 28 (also referred to herein as a data controller), and a communication module 34, and/or one or more components referenced herein. The power controller 20 is structured/configured to transform and regulate power provided to the data hub 100 via the power line 22 to provide stable power at desired operating voltages and currents to properly power the light source 14, annunciator 16, processor 30, DAQ module 28, communication module 34, and/or other components of the data hub 100 as described further herein. The power controller 20 may include/comprise electronic circuitry to enable various power regulation functions including, but not limited to, changing the frequency of the power from the standard main frequency of 50-60 Hertz (Hz) to some higher frequency, such as 20,000 Hz, stepping the voltage supplied to the light source 14 from startup to steady state operation, converting the power input via the power line 22 from high voltage alternating current to low voltage direct current, regulating power supplied to the light source 14 at a constant current, surge protection, and other regulatory functions. In at least one embodiment, the power controller 20 may step down the power input to supply direct current at a constant or variable Voltage (V). More than one power controller 20 may be used to allow separate powering and control of the light source 14, fixture 13, annunciator 16, DAQ 28, communication module 34, and/or other components.

The power controller 20 is structured/configured to provide suitably regulated power to the annunciator 16, processor 30, sensor 18, DAQ module 28, communication module 34, and/or other components of the data hub 100. The processor 30 may be operatively connected to the light source 14, annunciator 16, DAQ module 28, and/or communication module 34 to control the function(s) thereof. For example, and in certain embodiments, the processor 30 is configured to activate the light source 14 and/or annunciator 16. Alternatively, the processor 30 may be configured to activate the annunciator 16, and the light source 14 may be separately controlled.

In at least one embodiment, the data hub 100 may include/comprise a sensor 18 disposed within the fixture 13, as shown in FIG. 2. The sensor 18 may be electrically connected to the power controller 20 and be in operative communication with the processor 30. The sensor 18 may be structured/configured to sense a condition of one or more areas in the vicinity of the sensor 18 and to generate a corresponding sensor signal 40 (as shown in FIG. 3) indicating the condition. In at least one embodiment, the sensor 18 may be structured/configured to generate the sensor signal 40 indicative of whether an object, such as a vehicle or pedestrian, is in the vicinity of the sensor 18. The sensor 18 may be configured to generate the sensor signal 40 to indicate whether a vehicle is parked in one specific parking space. Alternatively, the sensor 18 may be configured to generate the sensor signal 40 to indicate whether any one of a number of parking spaces is occupied by a vehicle. The sensor 18 may be an optical sensor, such as a camera, radar or LiDAR, an infrared, acoustic, ultrasonic, harmonic, microwave or magnetic sensor, or any combination thereof. While the primary sensor in one or more exemplary data hub 100 system embodiments of the present disclosure uses camera based vision integrated directly into the light or separately mounted, other types of sensors can also be used in conjunction with the camera to further depict, identify, interrogate, verify, etc. space and surrounding status. Such sensors include inferred (IR), LIDAR, ultrasound, magnetic, active and/or passive mounted medallions, reflector, audio, etc. Furthermore, sensor may include an active or passive medallion, badge, reflector, placard, or other device to augment other sensor technology. In certain embodiments, the data hub 100 may receive input from more than one sensor 18.

The sensor 18 may be operatively connected to the DAQ module 28 such that the sensor signal 40 is provided to the DAQ module 28, which is configured to interrogate the sensor signal 40 and communicate the interrogated signal 40 to the processor 30 for analysis. Signals 40 can also be directly transmitted from sensor 18 to processor 30. The processor 30 may analyze and operate upon the interrogated signal 40 to execute various functions. In at least one embodiment, the processor 30 may operate upon the interrogated signal 40 to determine whether one or more vehicles are parked in one or more parking spaces in the vicinity of the sensor 18, for example. Further, the processor 30 may operate upon the interrogated signal 40 to determine whether the sensor signal 40 was transient and indicative of a vehicle or pedestrian in motion. In certain embodiments, the DAQ module 28 may be a module within the processor 30.

In at least one embodiment of the data hub 100, the sensor 18 may be located outside of the fixture 13, as shown schematically in FIG. 3, while the power controller 20, processor 30, communication module 34, light source 14 and DAQ module 28 may be disposed within the fixture 13. In such an embodiment, the data hub 100 may include/comprise a receiver 38 structured/configured to receive the sensor signal 40 from the sensor 18, which may include/comprise a transmitter to communicate the sensor signal 40 to the receiver 38. In various embodiments, the receiver 38 is operatively connected to and communicates the sensor signal 40 to the DAQ module 28. In certain embodiments, the receiver 38 may be incorporated into the processor 30 or the communication module 34. In further embodiments, the receiver 38 may include/comprise an antenna 39, as shown in FIG. 3, to facilitate receipt of various signals. In various embodiments, the sensor 18 may transmit the sensor signal 40 via any capable wireless communication protocol including, but not limited to, 802.11 series Wi-Fi, Bluetooth®, ZigBee® and other radio frequency means.

In at least one embodiment, the processor 30 may operate upon the sensor signal 40 to activate the annunciator 16. In one form, the annunciator 16 may be a lighting device including multiple light sources, each capable of generating a single or narrow color (i.e., wavelength) band of light. In such an embodiment, the processor 30 may activate one light source to indicate that a parking space is occupied, for example a red light. The processor 30 may activate another light source to indicate that a parking space is unoccupied, for example a green light. In one form, the processor 30 may flash one or more light sources on and off as a further indication, for example flashing a green light to indicate an unoccupied space. The annunciator 16 may include/comprise additional light sources, which when lit individually or in combination with one another, are indicative of various conditions in the vicinity of the data hub 100. For example, the annunciator 16 may include/comprise a blue light source to indicate whether one or more parking spaces in the vicinity of the data hub 100 is designated as a handicapped parking space or has some other use restriction.

In at least one embodiment, the annunciator 16 may be a lighting device including a light source capable of generated different colors of light. For example, the annunciator 16 may include/comprise a red-green-blue light-emitting diode, commonly referred to as an RGB LED. An RGB LED has multiple diodes, such as one red, one green and one blue, which enable the RGB LED to generate a broad range of colors. In such an embodiment, the processor 30 may be configured to activate the annunciator 16 and control the specific color or colors emitted by the annunciator 16 to indicate a condition of one or more parking spaces in the vicinity of the sensor 18 or data hub 100. Further, in such an embodiment, the annunciator 16 may communicate by indication additional or alternative information. For example, the annunciator 16 may emit a color light specific to the level or area within a parking facility where the data hub 100 is located. In many cases, the parking facility will designate a different color for each level or area of parking spaces within the parking structure, such as purple, orange, yellow, red, green, blue, etc. According to the present disclosure, the annunciator 16 may emit the color of light designated by the parking facility corresponding to the level or area in which the data hub 100 is located.

In at least one embodiment, the annunciator 16 may indicate one or more colors, or sequences thereof, when sensor 18 senses a pedestrian approaching a parked vehicle, thus alerting area vehicles in search of a space that one may be vacated shortly i.e. flashing yellow.

In another embodiment, the annunciator 16, or a series of remote annunciators 16, may indicate one or more colors, in a sequence, when sensor 18 senses a potential convergence between pedestrian and vehicle or other defined objects. With the ability to detect objects, exemplary systems of the present disclosure can also predict potential conflict between moving objects. For example, and in high areas of vehicle/pedestrian interaction, exemplary systems have the ability and are configured to combine motion detection, visual indicators, and/or audio capability to audibly and visually warn the objects (vehicles and/or pedestrian) of potential interaction. This conflict alert can serve as one more deterrent to incident, injury, etc. Visual indication of a potential event can be displayed by the annunciator 16 but also projected onto other surfaces including floor, ceiling and/or wall.

Parking space status can visually provided to the user (vehicle driver) via an RGB LED indicator, for example, either attached to a light fixture or separately mounted. The use of colors, i.e. GREEN for unoccupied, RED for occupied, BLUE for ADA, etc., provides the visual cue of the space status to the user, thus aiding them in their parking decision-making process. The RGB LED indicator can also be configured to provide way-finding, define spaces/zones with specific parking "attributes," i.e. reserve, premium, staff, etc. In addition to the multitude of colors that can be displayed on the indicator, the images can also be provided in either a steady state (constant color ON) or dynamic state (colors depicted in i.e. changing patterns, sequences, scrolls, flashes, strobes, etc.). Such a dynamic state can be used to draw further attention to the indicator and conditions in/around/surrounding/associated with said physical environment. In that the RGB Indicator can display a broad range of colors, and that it does have a lighting output value, the indicator could also be used as a supplemental or emergency lighting source. Such RGB visual indication can be displayed by the annunciator 16 but also projected onto other surfaces including floor, ceiling and/or wall.

Figure 7:
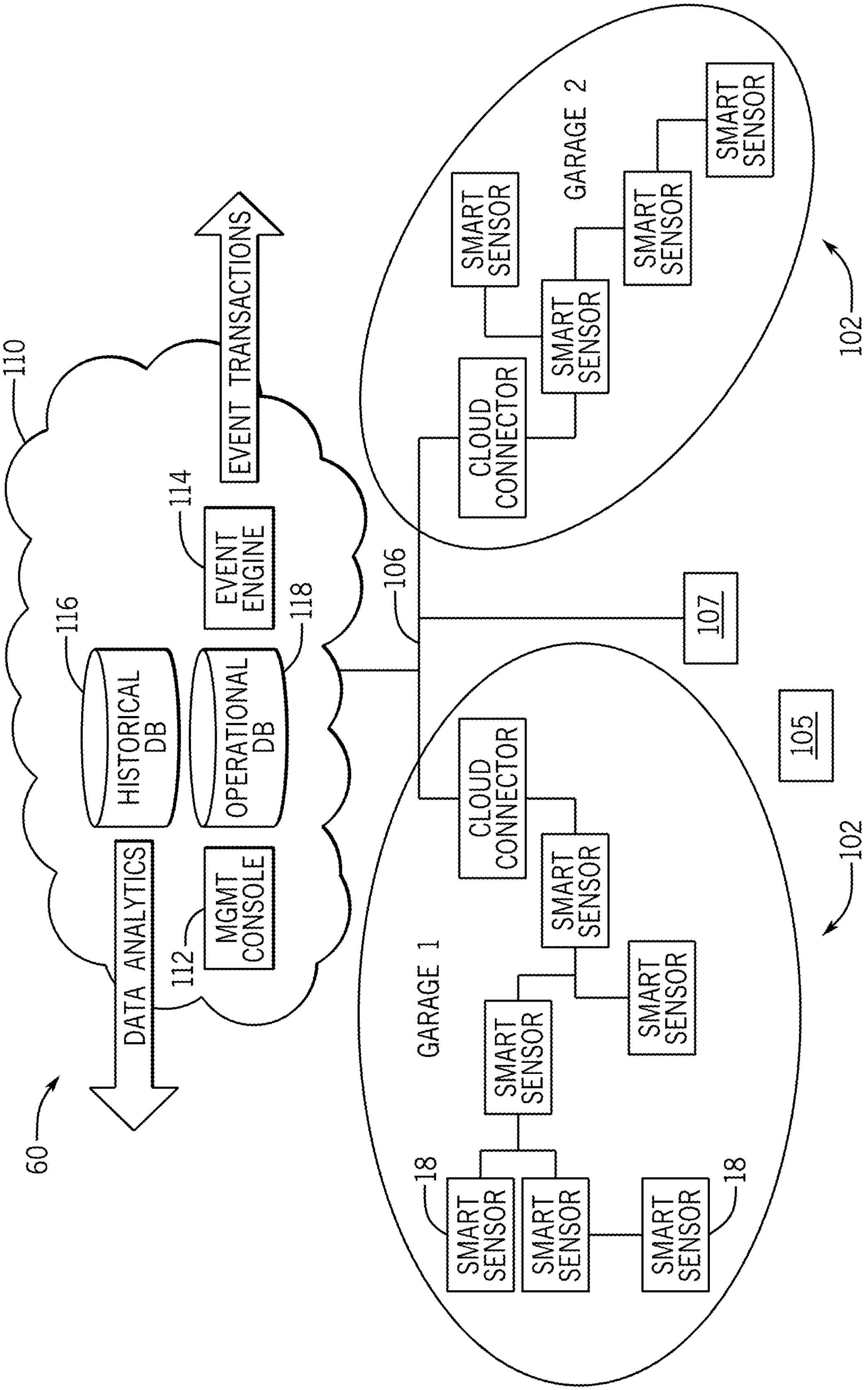
FIGS. 7 and 7A show schematics of parking commerce systems according to exemplary embodiments of the present disclosure.

In at least one embodiment, the data hub 100 may include/comprise an emergency alert function. In such an embodiment, the sensor 18 may be configured to generate a distress signal when activated by a guest within the parking facility to initiate an emergency response and to communicate the location of the data hub 100. The processor 30 via the DAQ module 28 may interrogate the distress signal has described herein with respect to the sensor signal 40 and may operate upon the distress signal to initiate the emergency response. In such an embodiment, the sensor 18 may be/comprise an Emergency Blue Light, manual fire alarm switch, an automatic carbon monoxide detector, smoke detector, and/or fire detector, a "panic button", smart device, audible recognition, or like device that communicates with the DAQ module 28 either wired or wirelessly. In certain wireless embodiments, the sensor 18 may be an application (i.e., an application or "app") run on a smart device such as a smartphone, a tablet, a personal digital assistant, a laptop, etc. (such as a smart device 105 in communication with data hub 100, such as shown in FIG. 7) that allows the guest to activate the distress signal and summons assistance when within sufficient proximity of the data hub 100. In at least one embodiment, the data hub 100 may broadcast a banner to the smart device of the guest upon entering the parking facility. The banner prompts the guest to wirelessly connect to the data hub 100 and, upon the guest doing so, launches a virtual panic button, as well as other potential interfaces, on the smart device 105. In certain embodiments, the emergency alert sensor 18 may be separate from the data hub 100 but in communication with the data hub 100 by any suitable means. In at least one embodiment, and as shown in FIG. 7, a button 107 may be in wired (as shown) or wireless communication with other aspects of data hub 100, such that depressing button 107 (or depressing virtual button of smart device 105) causes one or more of the following: a) an audio signal to be emitted from audio microphone and/or speaker 19, such as an alarm, a notification that the police or other authorities have been contacted, and/or a notification that a representative of the parking location has been contacted, b) causes light sources 14 to illuminate and/or illuminate from less than 100% to 100%, and/or c) causes sensors 18 (such as cameras) to record video and optionally audio at or near a location of button 107 and/or smart device 105. With the development of a private Wi-Fi network, for example, exemplary systems of the present disclosure have the ability to receive other wireless signals and respond. These signals include monitoring sensors such an Emergency Blue Light, smoke, fire, CO, etc., but can also include a distress signal sent by a wireless device. As a result, if a guest has logged on to our network (such as via a smartphone application), and becomes distressed, threatened, etc., they can activate the "panic button" in the application which will trigger a data hub 100 response that may include lights increasing to 100%, cameras beginning to record, audio recording, speaker broadcasting, and authority notification, for example.

In certain embodiments, the annunciator 16 may include/comprise an audio device structured/configured to communicate an auditory message, for example, to a guest who has presently parked a vehicle in the vicinity of the data hub 100. The auditory message may include, but not limited to, music, current location (e.g., level or area), directions, advertising, greetings, guest information, weather warnings or alerts, emergency alerts and directions (e.g., fire, medical, assault, etc.), and Amber or Silver alerts. In such an embodiment, the sensor 18 may be structured/configured to detect the presence of a pedestrian passer-by, generate the sensor signal to indicate the presence and communicate the sensor signal 40 to the processor 30, which may distinguish between the pedestrian passerby and a passing vehicle and, as appropriate, cause the annunciator 16 to broadcast a greeting, warning of a nearby vehicle or other defined object, and/or other information to the passer-by. By further example, the annunciator 16 may communicate a message of appreciation to a departing guest. To augment an exemplary parking sensor, and as noted above, audio can also be added to the data hub 100 as an additional communication method. The placement of speakers and/or microphones, either in the sensor or in proximity to the sensor, with wired or wireless communication, can be used for voice communication, advertising, public service announcements (PSAs), directions, notifications, space availability, alerts, warning, shotgun detection, music, etc., to users within the garage. Such communication would be controlled by the applicable system gateway and may be integrated with other services and/or providers. The data hub may also continuously broadcast a banner across Bluetooth, Wi-Fi, or other acceptable protocols inviting/prompting the guest to wirelessly connect to the data hub operating system, allowing them access benefits created for the guest's benefit. These benefits may include, but not be limited to, panic parking, vehicle location, wayfinding, etc.

The data hub 100 may include/comprise more than one annunciator 16 and may include/comprise more than one type of annunciator 16. In one form, the data hub 100 includes/comprises one auditory annunciator 16 and one lighting annunciator 16. In an alternative form, the annunciator 16 includes/comprises one lighting device to indicate parking space occupancy and a separate lighting device to indicate the current location with the parking facility. In certain embodiments, the annunciator 16 may comprise multiple lighting devices and multiple auditory devices, each dedicated to a specified condition. In such an embodiment, each annunciator 16 may be controlled by the processor 30. In alternative embodiments, certain annunciators 16 may be controlled by the processor 30 while the remaining annunciators 16 may be controlled by a device external to the data hub 100.

In at least one embodiment, the annunciator 16 and sensor 18 may be at least partially disposed within the volume 11 of the data hub 100, as shown in FIG. 2. In such embodiments, the annunciator 16 and sensor 18 may be positioned adjacent or within the volume 11 as to enable the functionality described herein. In one form, the sensor 18 may be positioned adjacent or within the cover 12 as to enable the sensor 18 to sense the condition (e.g., parking space occupancy). The annunciator 16 may be positioned adjacent or within the cover 12 as to enable the annunciator 16 to be seen or heard within the vicinity of the data hub 100.

As shown in FIG. 3, the annunciator 16 and/or sensor 18 may be physically connected to the processor 30. In certain embodiments, the annunciator 16 and/or sensor 18 may be hardwired to the processor 30. Alternatively, the annunciator 16 and/or sensor 18 may be connected to the processor 30 via a port in the data hub 100 by a reversible connection, such as a plug, coupling, jack, quick-connect, or other suitable means.

The data hub 100 may be mounted in a desired location by attaching the housing 10 to a ceiling, wall, or other desired surface of a structure by any suitable means, such as screws or bolts. The data hub 100 may be attached to the structure by a hanger 24, as shown in FIG. 1, where the hanger 24 is attached to the housing 10 at one end and to the structure at the opposite end. In certain embodiments, the hanger 24 may be/comprise a tube having attachment flanges at opposing ends through which the power line 22 may pass. In embodiments such as shown in FIG. 3, the data hub 100 may be mounted in the vicinity of one or more sensors 18. Power to the data hub 100 may be controlled external to the data hub 100, for example manually via a wall or panel switch, a remote sensor that controls individual data hubs 100, or a centrally-located sensor that controls a bank of data hubs 100.

As shown in FIGS. 1 and 2, the communication module 34 may be connected to the processor 30. In certain embodiments, the communication module 34 may be incorporated within the processor 30. The module 34 may be further connected to a network external to the data hub 100 via a communication line 32. The communication module 34 may communicate data generated by the data hub 100 to the network. For example, the communication module 34 may communicate the occupancy status in the vicinity of the data hub 100, as determined by the processor 30 based on the sensor signal 40 form the sensor 18. As a further example, the communication module 34 may communicate the presence of pedestrian guests in the vicinity of the data hub 100. As shown in FIG. 3, the communication module 34 may communicate data generated by the data hub 100 to the network via a wireless connection. In such an embodiment, the communication module 34 may generate and transmit a communication signal 35.

The communication module 34 may be configured with an open communications protocol to enable the data hub 100 to communicate with networks and servers operating under different protocols, either wired, as shown in FIGS. 1 and 2, or wirelessly, as shown in FIG. 3. Such protocols enable authentication, error detection and correction, and signaling and can also describe the syntax, semantics, and synchronization of analog and digital communications. Such protocols may be implemented in hardware and/or software and may include definitions of packet size, transmission speed, error correction types, handshaking and synchronization techniques, address mapping, acknowledgement processes, flow control, packet sequence controls, routing and address formatting.

Figure 2A:
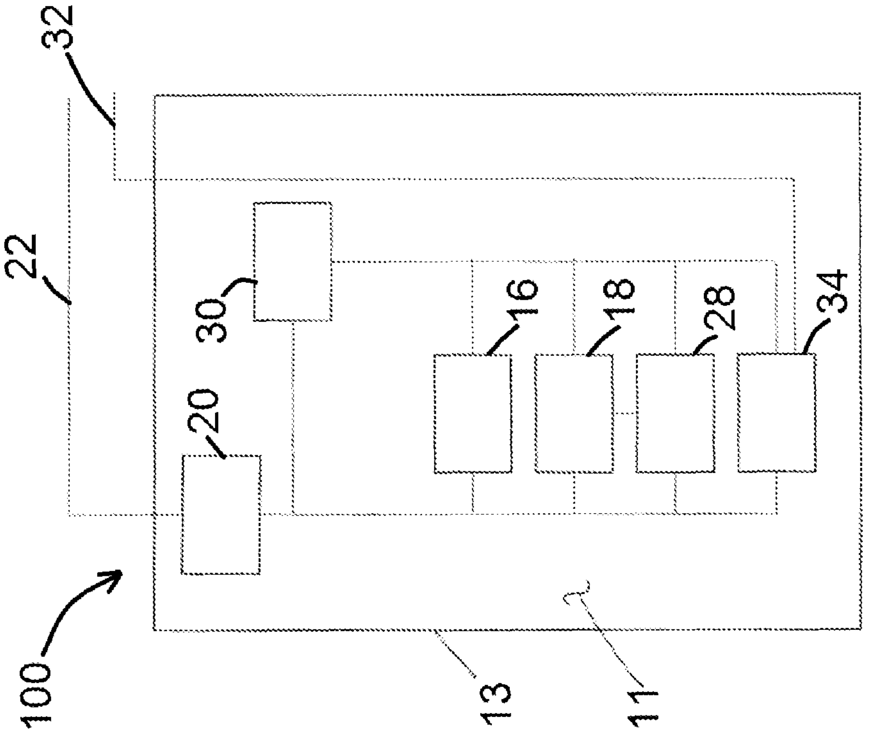
Figure 3A:
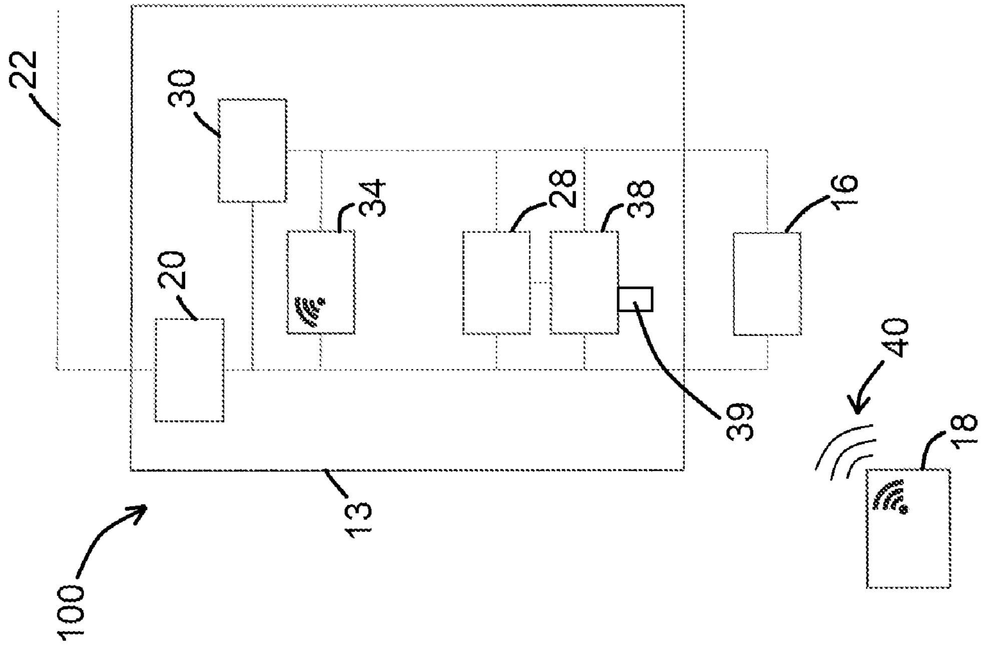
Figure 3:
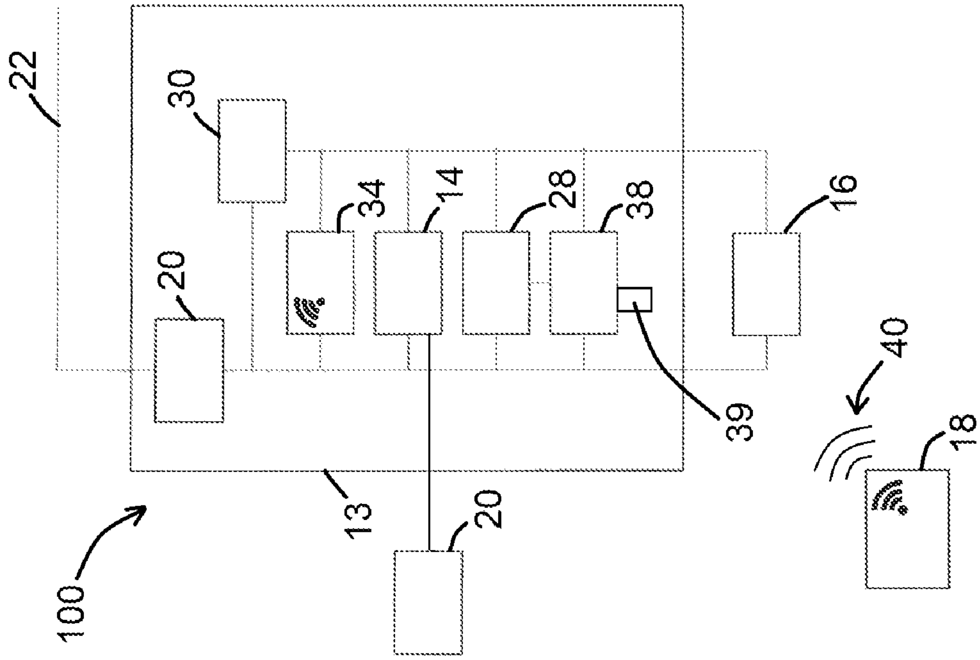

Furthermore, sensor unit housing 122 may be free-standing and independent of fixture 13, as shown in FIGS. 2A and 3A. In at least one embodiment, power controller 20, annunciator 16, processor 30, DAQ 28, communication module 34, and/or one or more components referenced herein may be configured in a data hub 100 other than a fixture, such as shown in FIGS. 2A and 3A.

Figure 4:
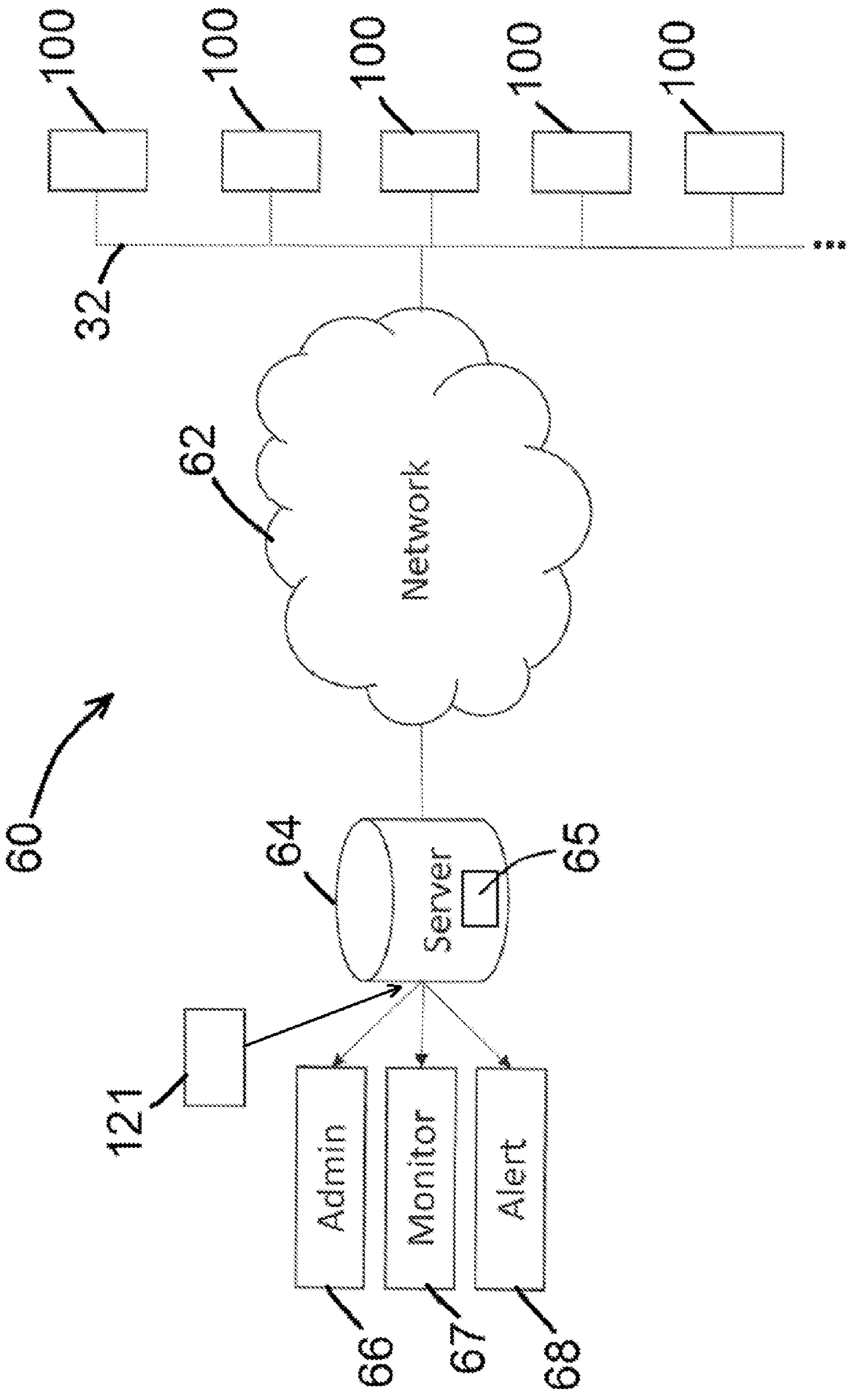
FIGS. 4 and 4A show schematics of parking commerce systems according to exemplary embodiments of the present disclosure.
Figure 4A:
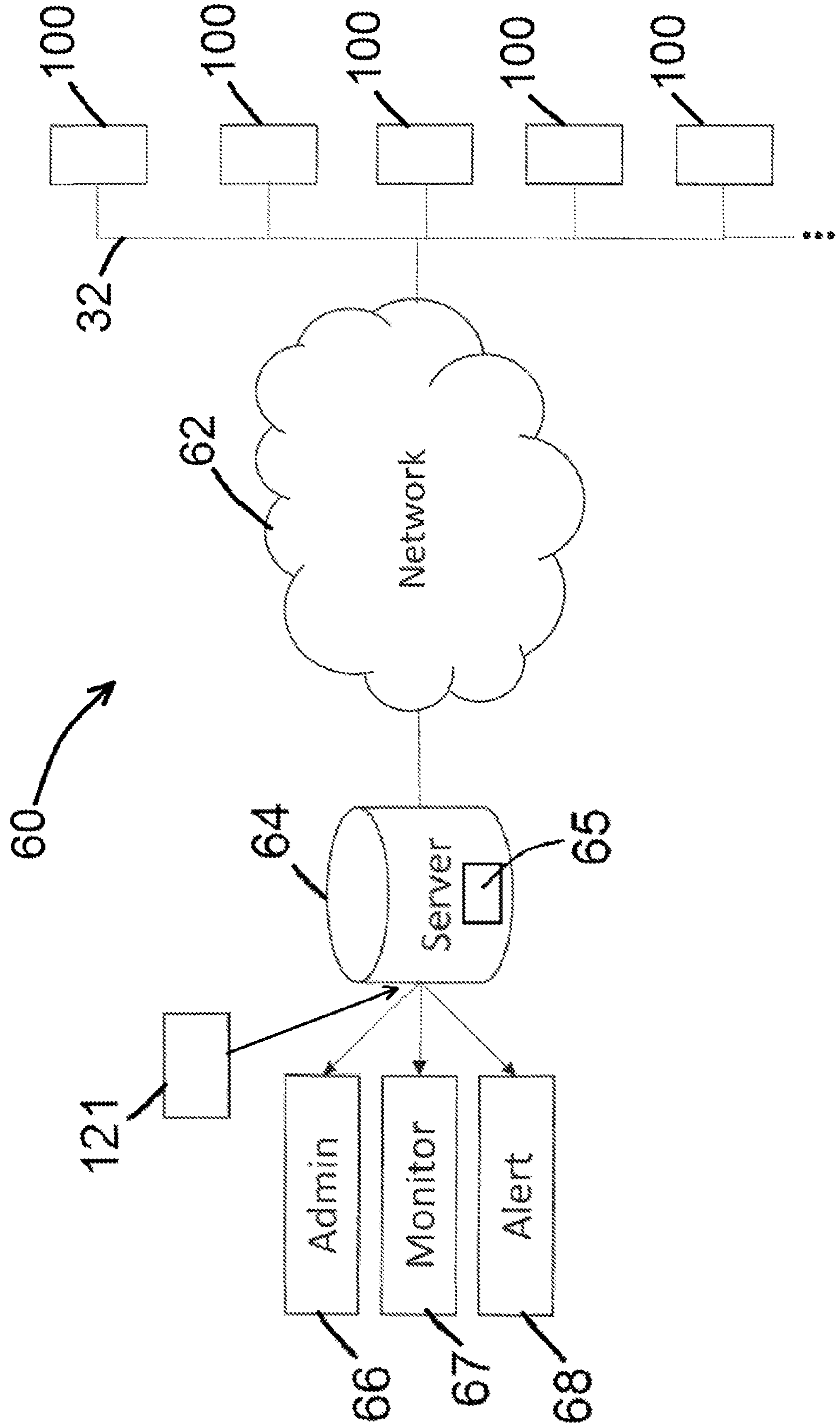

FIGS. 4 and 4A illustrate systems 60, such as a parking commerce systems (PCSs) 60, according to at least one embodiment of the present disclosure. The PCS 60 may include/comprise a plurality of data hubs 100 operably connected to a network 62 via one or more communication lines 32. Alternatively, the data hubs 100 may be operably connected to a network 62 via wireless communication as described further herein. The network 62 may include/comprise various components, such as sensors, indicators, devices, toll or other gates, payment subsystems and other PCS subsystems, including the sensors 18 in such embodiments as shown in FIGS. 2 and 3. The network 62 may be connected to a server 64 and/or gateway 64A, which is structured/configured to control and manage operation of the network 62 including, at least partially, the data hubs 100. Server 64 and/or gateway 64A, as shown in FIGS. 4 and 4A, can comprise several hardware and software components, such as a storage medium 65 (a memory, such as RAM, ROM, a hard drive, a solid-state drive, etc.) configured to store signal 40 data from one or more sensors 18 of one or more data hubs. The server 64 and/or gateway 64A may include/comprise various modules configured to facilitate the control and management of the PCS 60. By way of non-limiting example, the server 64 and/or gateway 64A may include/comprise an administrative module 66 configured to facilitate overall control and management of the PCS 60 by generating commands to be executed by the server 64. The server 64 and/or gateway 64A may include/comprise a monitoring module 67 configured to monitor the sensors and subsystems of the PCS 60 and provide data to the administrative module 66. The server 64 and/or gateway 64A may further include/comprise an alert module 68 configured to provide an interface to external resources in the event of an emergencies and to generate appropriate alerts that may be communicated via the annunciators 16 of the data hubs 100 in such situations, for example, fire, weather, and other emergency alerts.

The communication module 34 may enable communication with the network 62 via the communication line 32 using file transfer protocol (FTP), transmission control protocol and the internet protocol (in combination, TCP/IP), user datagram protocol (UDP), hypertext transfer protocol (HTTP), post office protocol (POP3), internet message access protocol (IMAP), simple mail transfer protocol (SMTP), or other suitable protocols compatible with the specific PCS 60 to which the data hub 100 is connected. In certain embodiments, the communication module 34 may enable communication with the network 62 via a wireless connection including, but not limited to, 802.11 series Wi-Fi, Bluetooth® and other radio frequency means. In embodiments whereby a secure private Wi-Fi network for the applicable data hub 100 allows for secure communication and data transfer, there is the opportunity to “carry” other select and vetted wireless signal not directly associated with said parking guidance systems. Such signals may include carbon monoxide (CO) monitors, fire and smoke detectors, equipment status monitors, communication, data, etc.

Figure 5:
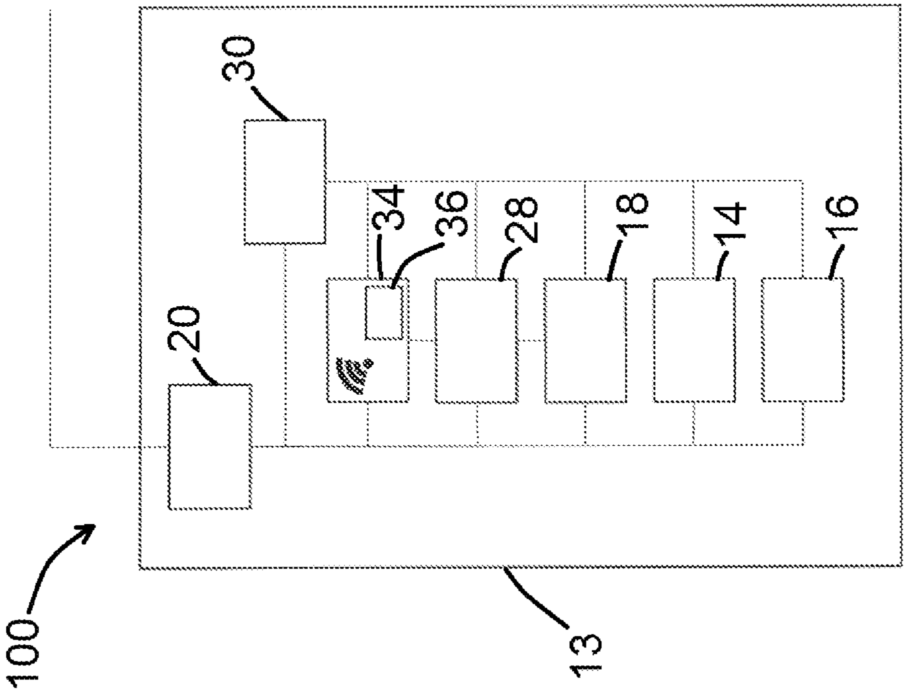
FIGS. 5 and 5A show schematics of data hubs according to exemplary embodiments of the present disclosure according.
Figure 5A:
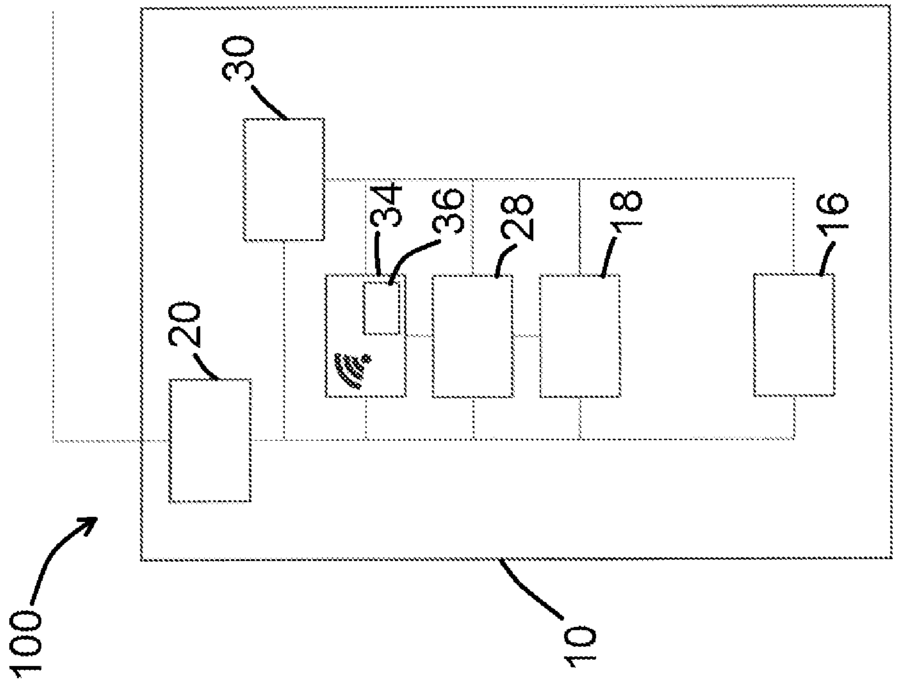

In at least one embodiment of the present disclosure as shown in FIG. 5, the data hub 100 may include/comprise a transceiver 36 in communication with the communication module 34. The transceiver 36 is structured/configured to both transmit and receive data between the communication module 34 and the network 62. The transceiver 36 may be structured/configured to enable wireless communication between the communication module 34, between multiple data hubs 100, and between the data hub 100 and the network 62 (not shown in FIG. 5). The transceiver 36 may include/comprise an antenna embedded, external or internal to the fixture 13 to facilitate wireless communication as referenced herein. Furthermore, data hub 100 may also be located separate and independent of fixture 13, in a subsequent housing 10 which may not be in connection to data hub 100, such as shown in FIG. 5A.

Figure 6:
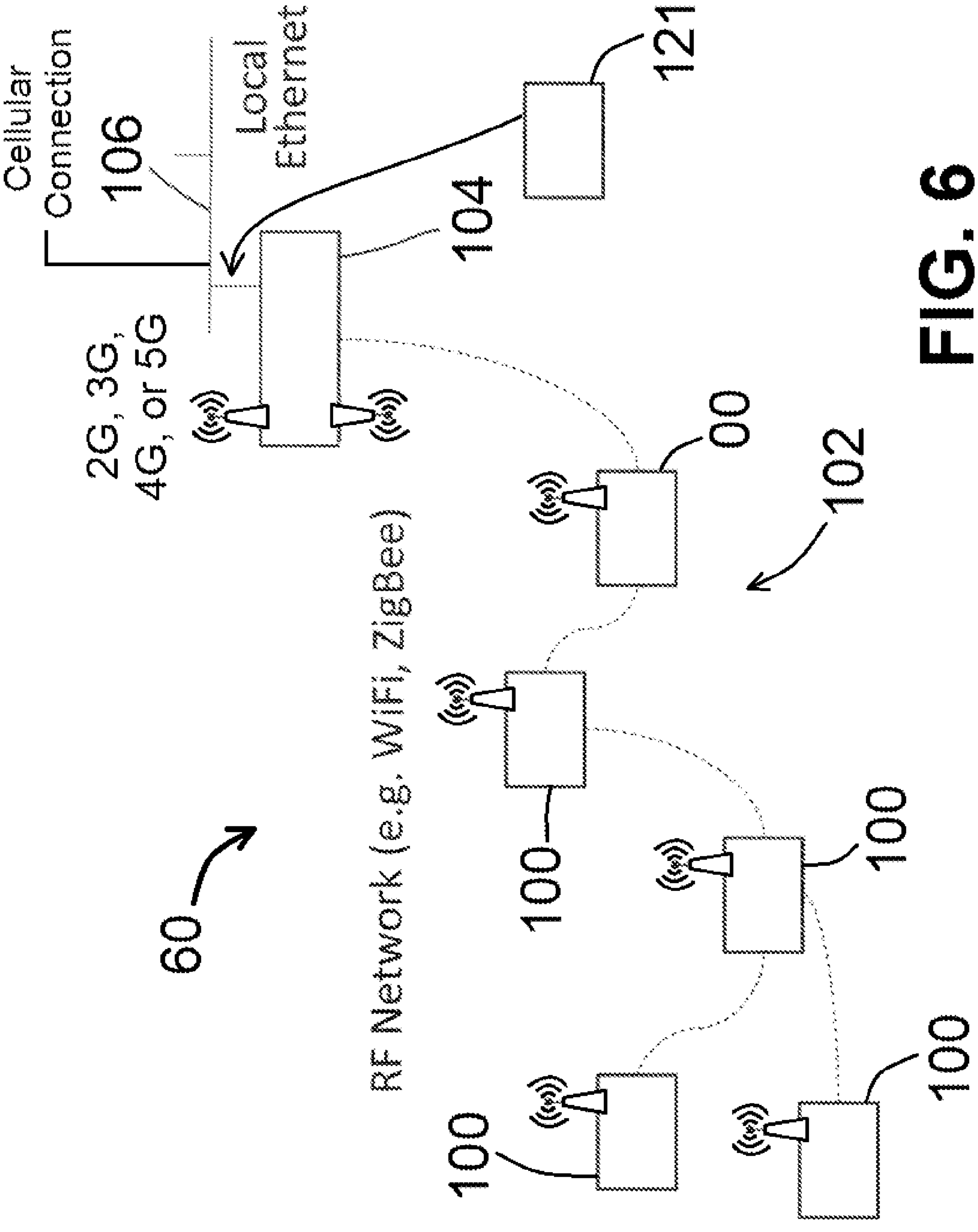
FIGS. 6, 6A, and 6B show data hub networks according to exemplary embodiments of the present disclosure.

The communication module 34 and transceiver 36, in various embodiments, enable multiple data hubs 100 to be wirelessly connected to each other to form a data hub mesh network 102, as shown in FIG. 6. The data hub mesh network 102 may include/comprise any desired number of data hubs 100 connected by wired and/or wireless communication. In embodiments where the data hubs 100 of the data hub mesh network 102 are connected wirelessly, the data hubs 100 may communicate within the network via any capable wireless communication protocol including, but not limited to, 802.11 series Wi-Fi, Bluetooth®, ZigBee® and other radio frequency means. The data hub mesh network 102 may further include or comprise a server 64, and/or gateway 64A, and/or firewall 121, such as shown in one or more of FIGS. 4, 4A, and/or 6A. The data hub mesh network 102 may further include/comprise a cloud connector 104 (which may utilize 3G, 4G, or other configurations) to enable the data hub mesh network 102 to connect, interact and integrate with cloud computing services via a local Ethernet 106, cellular or other connection, for example.

Figure 6A:
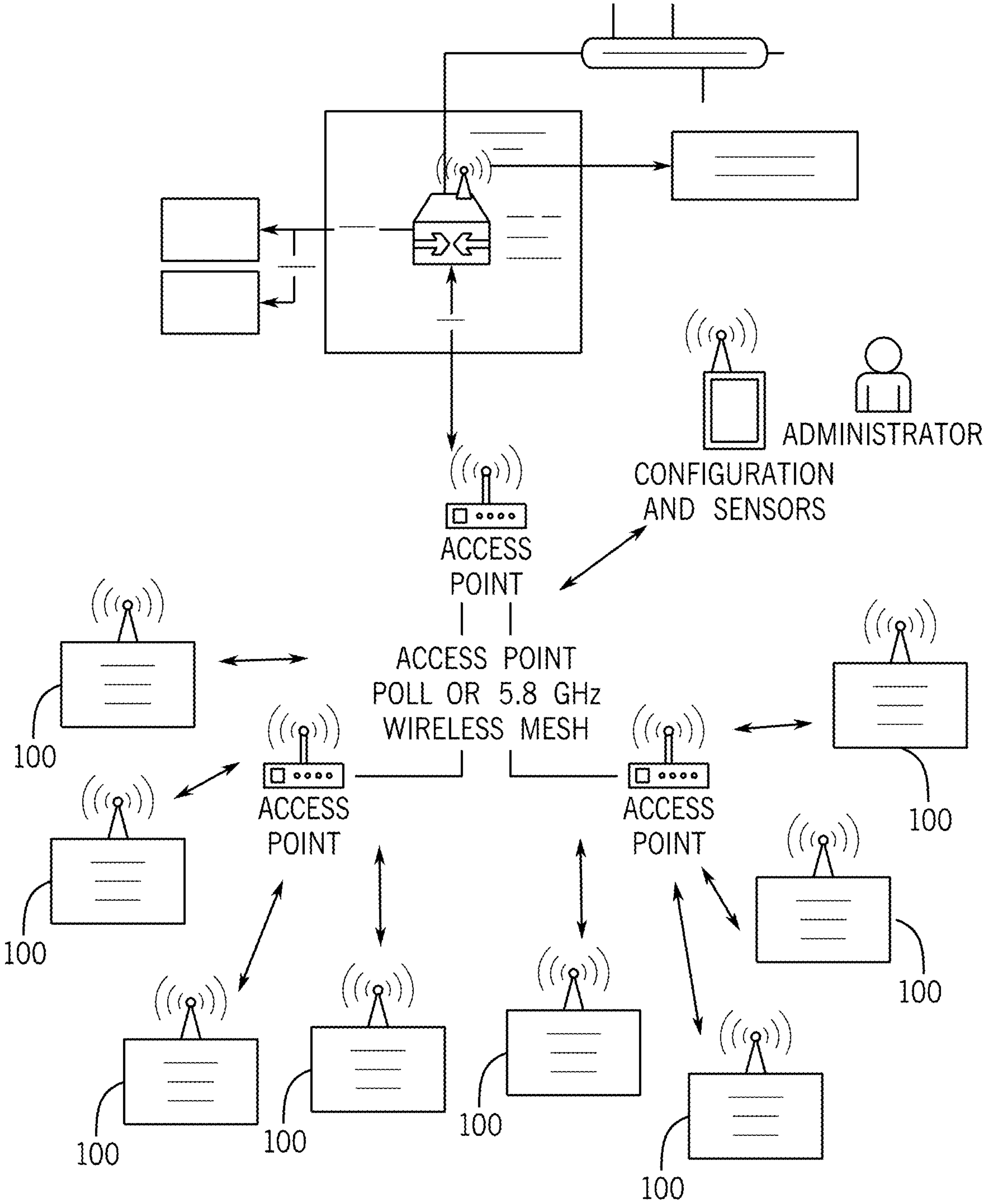
Figure 6B:
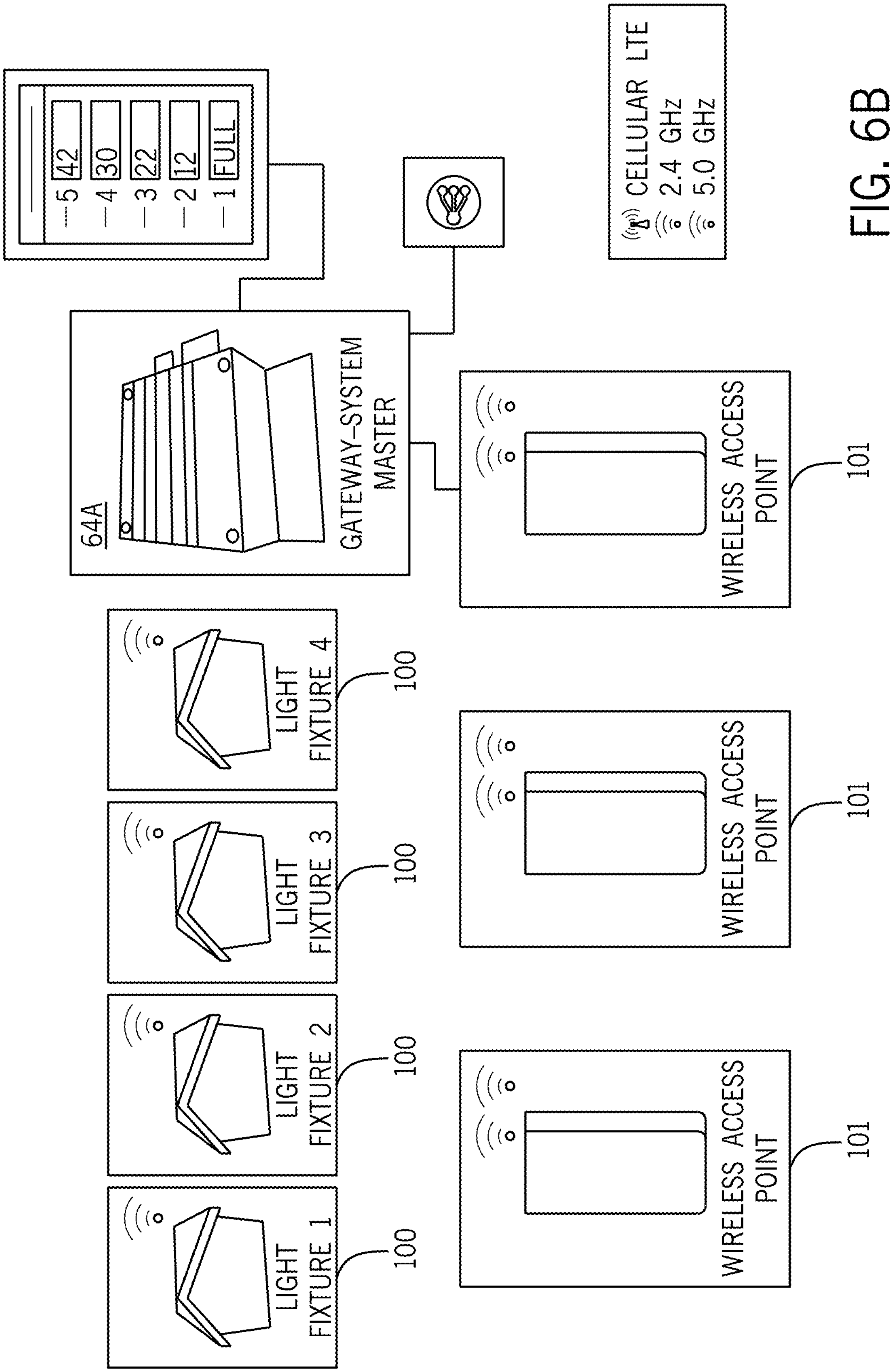
Figure 6C:
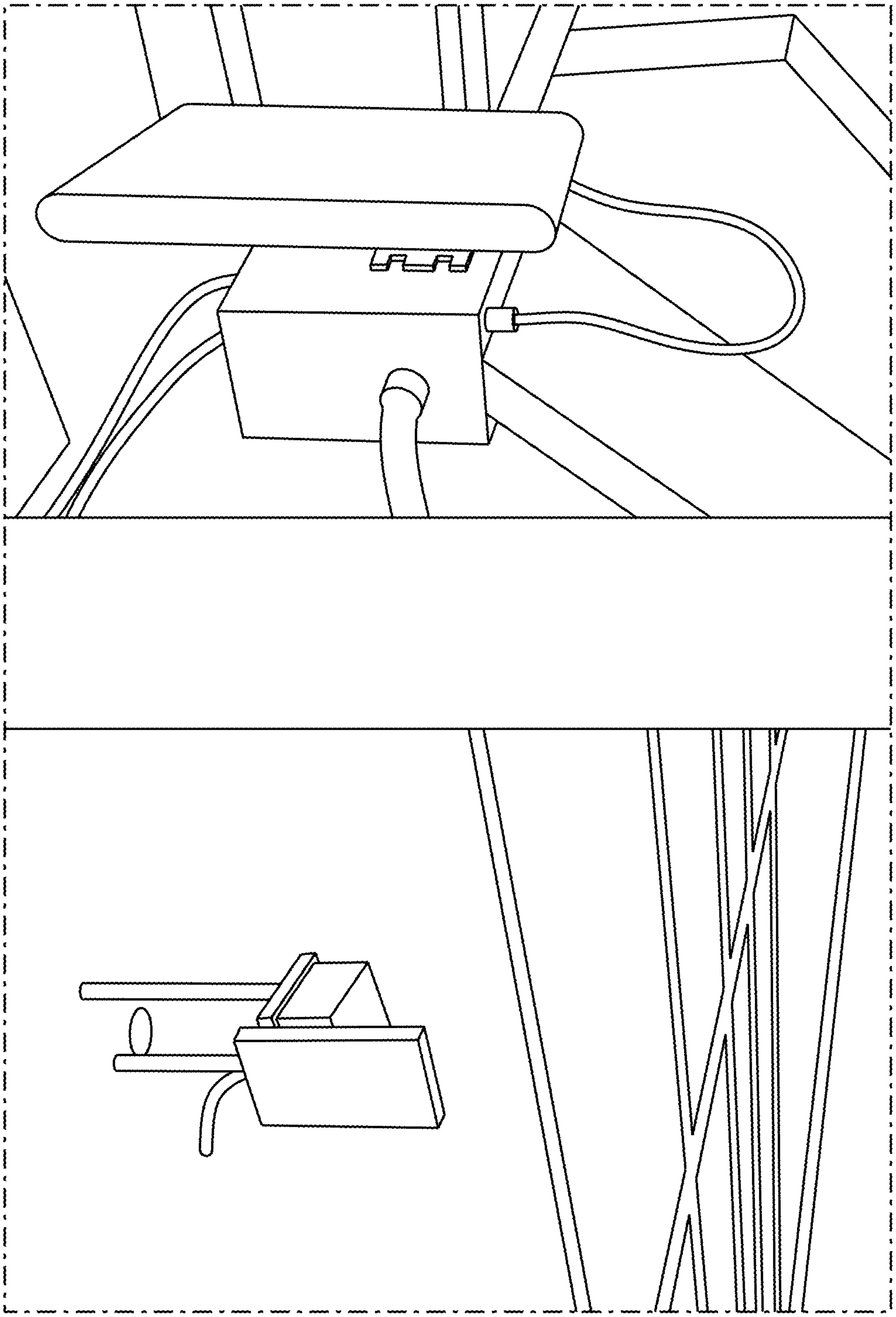
FIG. 6C shows componentry of the present disclosure positioned within a parking structure, according to an exemplary embodiment of the present disclosure.

FIGS. 6A-6C illustrate additional embodiments wherein data hub 100 may be configured to communicate with the gateway 64A and/or one or more access points 101. Communication with the gateway 64A and/or the access points 101 may be wired or wireless. The access points 101 communicate information from the data hub 100 to the gateway 64A either direct, or via an ad-hoc or access point mesh network 102. Communication between the access points 101 may be wired or wireless including power over ethernet (POE), ethernet, fiber, etc. Data hub 100 communicates processed sensor 18 information to the gateway 64A either direct or via network 102, wired or wirelessly, for the gateway 64A to evaluate and determine the appropriate annunciator 16, signage 131, or other response.

Gateway 64A may be connected to the cloud or another network for communication via wired or wireless interface including ethernet, fiber, cellular, etc.

Gateway 64A actions may include processing, decision making, data storage, analytics, cloud and other interface, etc.

Data hub 100 and gateway 64A, with or without access points 101, form a private wireless mesh network 102 for the PCS communication, processing, decision making and data transfer.

Gateway 64A connection to signage can be wired or wireless.

Gateway 64A can store sensor 18 information, images and communications for later use or transfer.

Gateway 64A in communication with a network video recorder (NVR) (an exemplary camera or sensor 18, for example) or other device can capture, stream, transfer and storage real time images for subsequent viewing, processing and archiving. Image quality and rate of transfer can be enhanced over the private Wi-Fi network with the use of POE connected access points 101. The Data Hub has the ability to live stream video from one or multiple sensors for live viewing, storage and/or analysis through a firewall and NVR. Sensors designated to stream to the NVR can be changed and re-allocated as deemed appropriate.

Gateway 64A can transfer information to third party via firewall and user interface including cloud, ethernet, fiber, and other.

Data hub 100 can be either integrated into fixture 13, or other forms of housings 10, independent of fixture 13.

FIG. 7 illustrates a parking commerce system (PCS) 60 according to at least one embodiment of the present disclosure. The PCS 60 may include/comprise one or more data hub mesh networks 102 connected to a cloud computing service 110 via a local Ethernet 106, cellular or other connection. The cloud computing service 110 may include/comprise one or more modules structured/configured to functionally execute the operations of the cloud computing service 110. In certain embodiments, the cloud computing service 110 includes/comprises management console 112, an event engine 114, a historical database 116 and an operational database 118. The description herein including modules emphasizes the structural independence of the aspects of the cloud computing service 110, and illustrates one grouping of operations and responsibilities of the cloud computing service 110. Other groupings that execute similar overall operations are understood within the scope of the present disclosure. Modules may be implemented in hardware and/or by a computer executing instructions stored in non-transient memory on one or more computer readable media, and modules may be distributed across various hardware or computer based components. The cloud computing service 110 may provide data analytics of the information collected and communicated by the data hubs 100. The cloud computing service 110 may further provide event transaction information collected and communicated by the data hubs 100, such as occupancy rates, revenues and other data.

In general, and regarding FIG. 7, data hubs 100, including "smart" sensors 18, potentially using license plate recognition (LPR, referenced in further detail herein) or other sensors, status signage and graphics (referenced herein as one or more of parking space identifiers 145, vehicle identifiers 147, and/or pedestrian identifiers), and cloud connectors (various hardware referenced herein used to transmit and/or receive signal 40 and related data) can be deployed in various parking environment. Data hubs 100 communicate with each other and cloud elements (which may include, but are not limited to, one or more of a data hub mesh network 102, a cloud connector 104, a cloud computing service 110, a management console 112, an event engine 114, a historical database 116, and/or an operational database 118, for example.

Figure 7A:
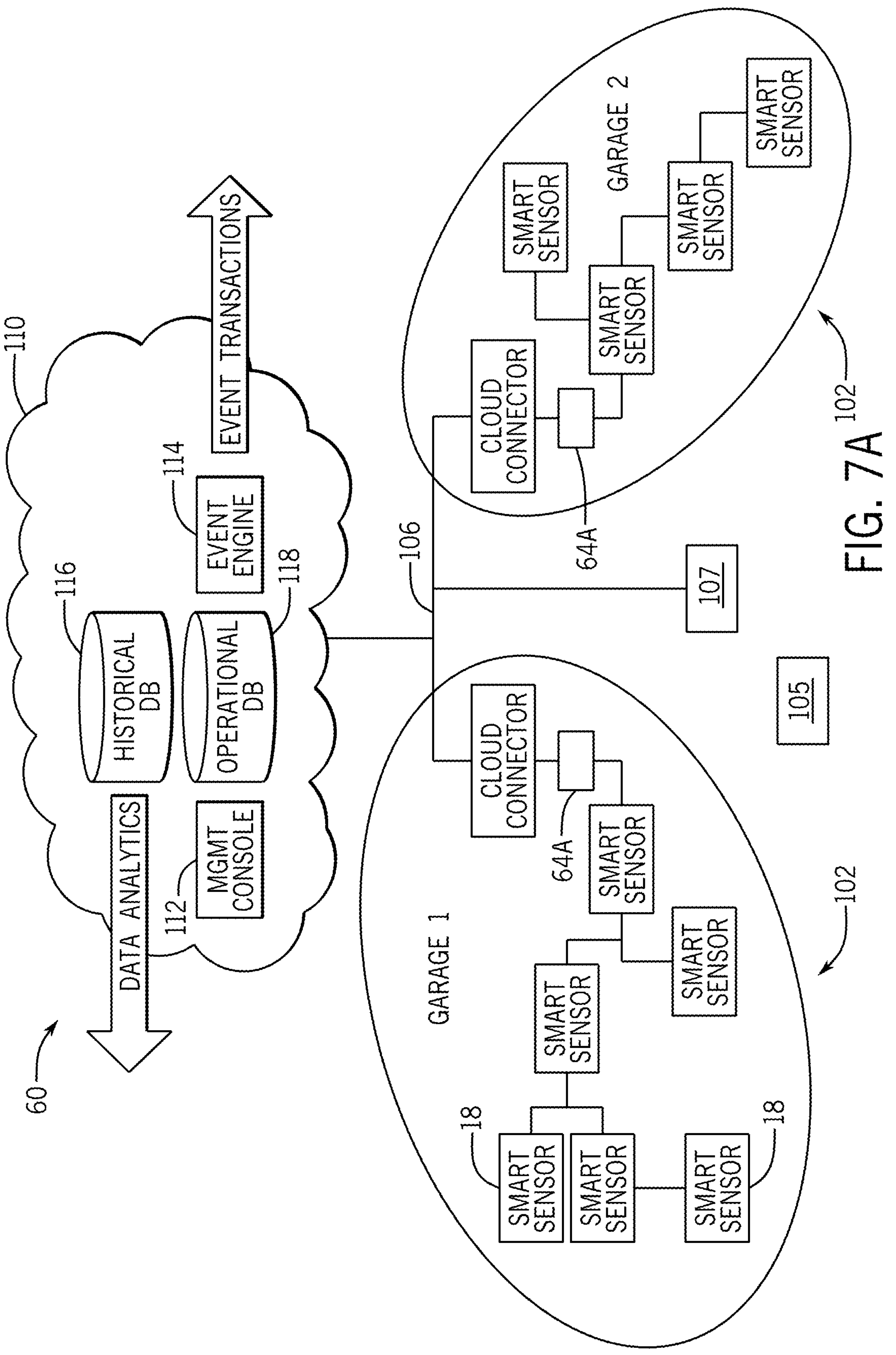
Figure 29A:
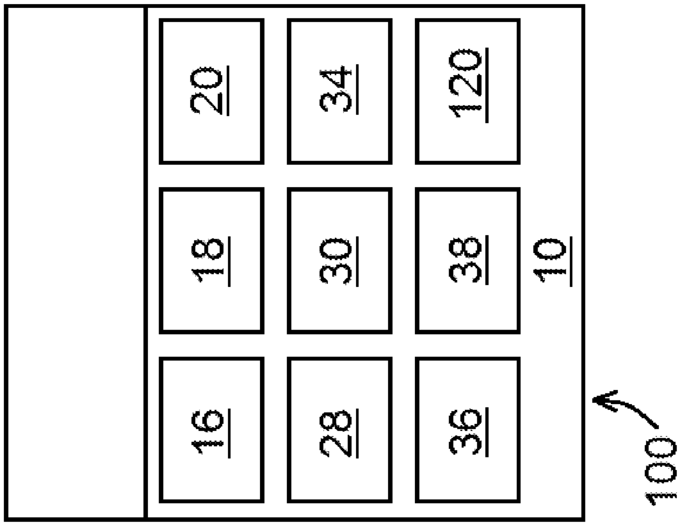
FIG. 29A shows a data hub having exemplary componentry that is not coupled to a fixture according to exemplary embodiments of the present disclosure.

In general, and regarding FIG. 7A, data hubs 100, including "smart" sensors 18, potentially using license plate recognition (LPR, referenced in further detail herein) or other sensors, status signage and graphics (referenced herein as one or more of parking space identifiers 145, vehicle identifiers 147, and/or pedestrian identifiers), server 64 and/or gateway 64A, and cloud connectors (various hardware referenced herein used to transmit and/or receive signal 40 and related data) can be deployed in various parking environment. Data hubs 100 communicate with each other, the servers 64 and/or gateway 64A, and cloud elements (which may include, but are not limited to, one or more of a data hub mesh network 102, server and/or gateway 64A, a cloud connector 104, a cloud computing service 110, a management console 112, an event engine 114, a historical database 116, and/or an operational database 118, for example. Smart sensors 18 of data hubs 100 can integrated into each light of a parking environment, such as an existing light 200 referenced in FIG. 28, or as part of a housing 10 and/or fixture 13 of the present disclosure having a light source 14, or as a stand-alone unit in an independent enclosure 100, and not in connection with a fixture or light source, such as shown in FIG. 29A. Said smart sensors 18 can work independently or collectively with other networked smart sensors 18 to assess their environment. These assessments include, but are not limited to parking spot availability, pedestrian motion, vehicle motion, pedestrian and vehicular interaction/conflict, predictive space availability, license plate numbers associated with parking spots or zones, approaching vehicle presence in association with parking spots or zones, etc. as referenced in detail herein. Under the same operating principles as disclosed in predictive conflict alert, for example, exemplary systems of the present disclosure have the ability to observe pedestrians moving toward their parked vehicle and thence cycle (flash, strobe, scroll, etc.) the respective indicators to advise any oncoming driver of a potential forthcoming parking space opening.

Regarding FIG. 7, for example, cloud connectors 104 can provide a network gateway for sensors 18 to communicate securely with cloud services, either via a secure server 64, firewall 121, or directly to the connector. DAQ modules 28 and/or processors 30 can receive signals 40 from sensors 18, and depending on the type of signal 40, said signals 40 can be routed to one or both of a historical database 116 and/or an event engine 114.

A historical database 116 can be a data warehouse and multidimensional model that stores and aggregates data about the parking and/or environments. This data can be made available via analytics dashboards and ad hoc analysis. Event engines react to configurable event conditions with configurable actions, allowing for the sharing specific of data and events with parking management partners, for example. Management consoles 112 can provide the ability to monitor and update deployed smart sensors 18 and related network infrastructure.

As further shown in FIG. 8A, the annunciator 16 and/or sensor 18 may be attached to the cover 12 housing 10 to enable proximity information to be collected by the sensor 18 and lighting or auditory information to be emitted or broadcast to the server 64 and/or gateway 64A from the annunciator 16. In at least one embodiment according to the present disclosure, the data hub 100 may include/comprise a sensor unit 120. As shown in FIG. 8A, the sensor unit 120 may be attached to the cover 12 of the fixture 13. In alternative embodiments, the sensor unit 120 may be attached to the housing 10 of the fixture 13. Alternatively, the sensor unit 120 may be disposed within the fixture 13. The sensor unit 120 may be include/comprise the sensor 18 and the annunciator 16 packaged together within a sensor unit housing 122. The sensor unit 120 may include/comprise more than one sensor 18.

Figure 8B:
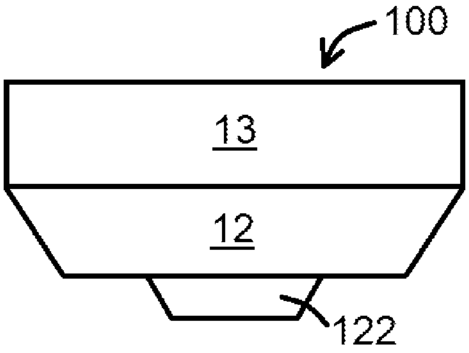
Figure 8C:
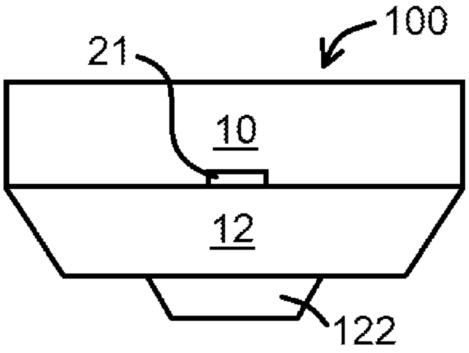
Figure 8D:
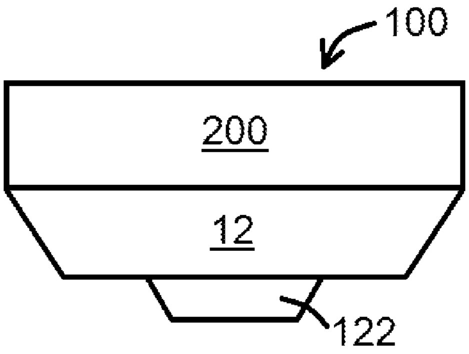
Figure 8E:
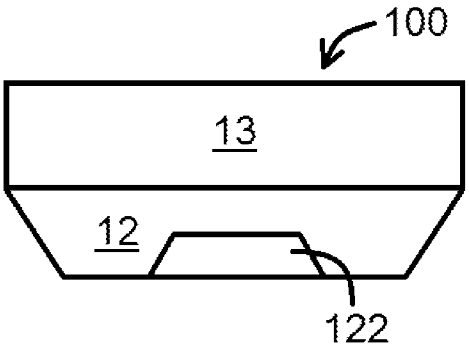
Figure 8F:
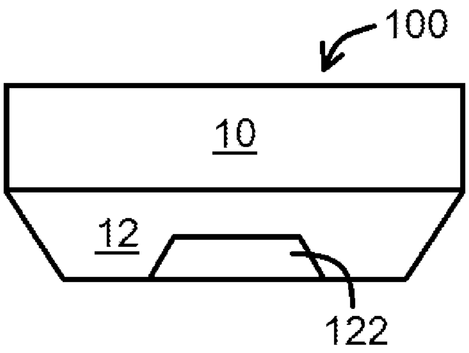
Figure 8G:
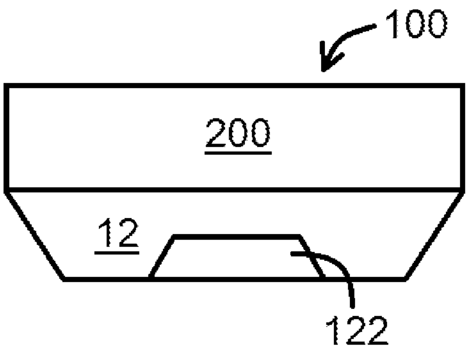
Figure 8H:
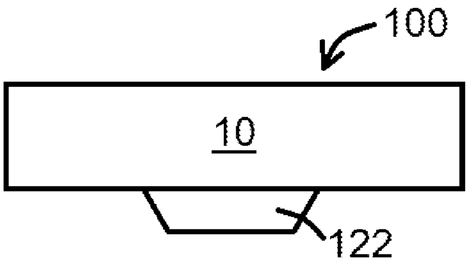
FIGS. 8H and 8I shows a stand-alone sensor unit housing according to an exemplary embodiment of the present disclosure.
Figure 8I:
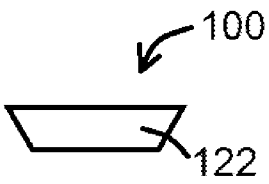

FIGS. 8B-8I show additional embodiments of data hubs 100 of the present disclosure. FIGS. 8B, 8C, and 8D show exemplary data hubs 100 of the present disclosure whereby sensor housing units 122 are coupled to and positioned outside of covers 12, whereby covers 12 are coupled to a fixture 13 (FIG. 8B), housing 10 (FIG. 8C), or light fixture 200 (FIG. 8D). FIGS. 8E, 8F, and 8G show exemplary data hubs 100 of the present disclosure whereby sensor housing units 122 are coupled to and positioned inside of covers 12, whereby covers 12 are coupled to a fixture 13 (FIG. 8E), housing 10 (FIG. 8F), or light fixture 200 (FIG. 8G). Alternately, sensor unit housing 122 may be stand-alone or disposed of in other housing (FIGS. 8H & 8I). It is expressly noted that various data hubs 100 of the present disclosure may have components, features, and/or configurations shown and described with respect to one or more embodiments, and said components, features, and/or configurations can also apply to other embodiments as may be desired (sec FIGS. 28 and 29, for example, and additional disclosure herein).

Figure 9:
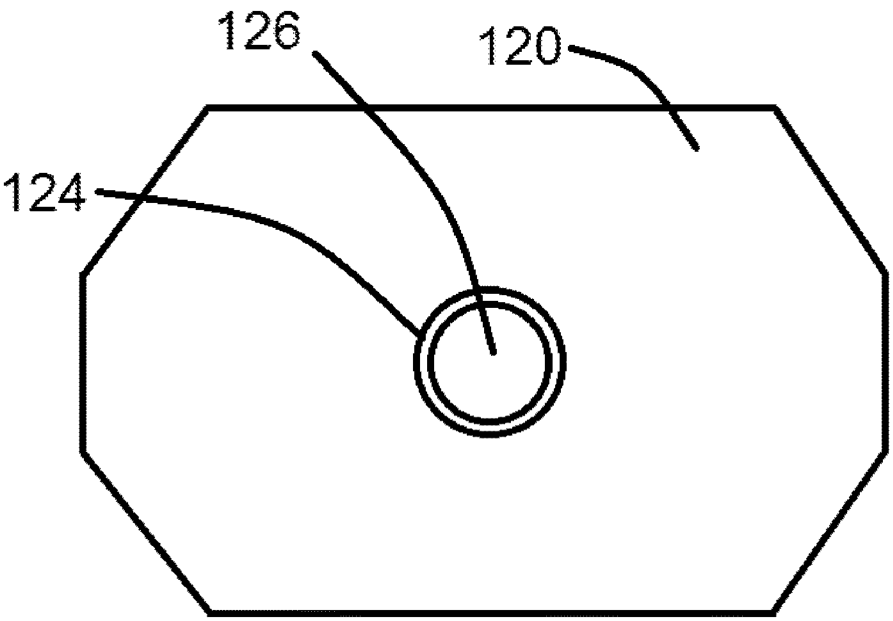
FIG. 9 shows a top view of a sensor unit according to exemplary embodiments of the present disclosure.
Figure 10:
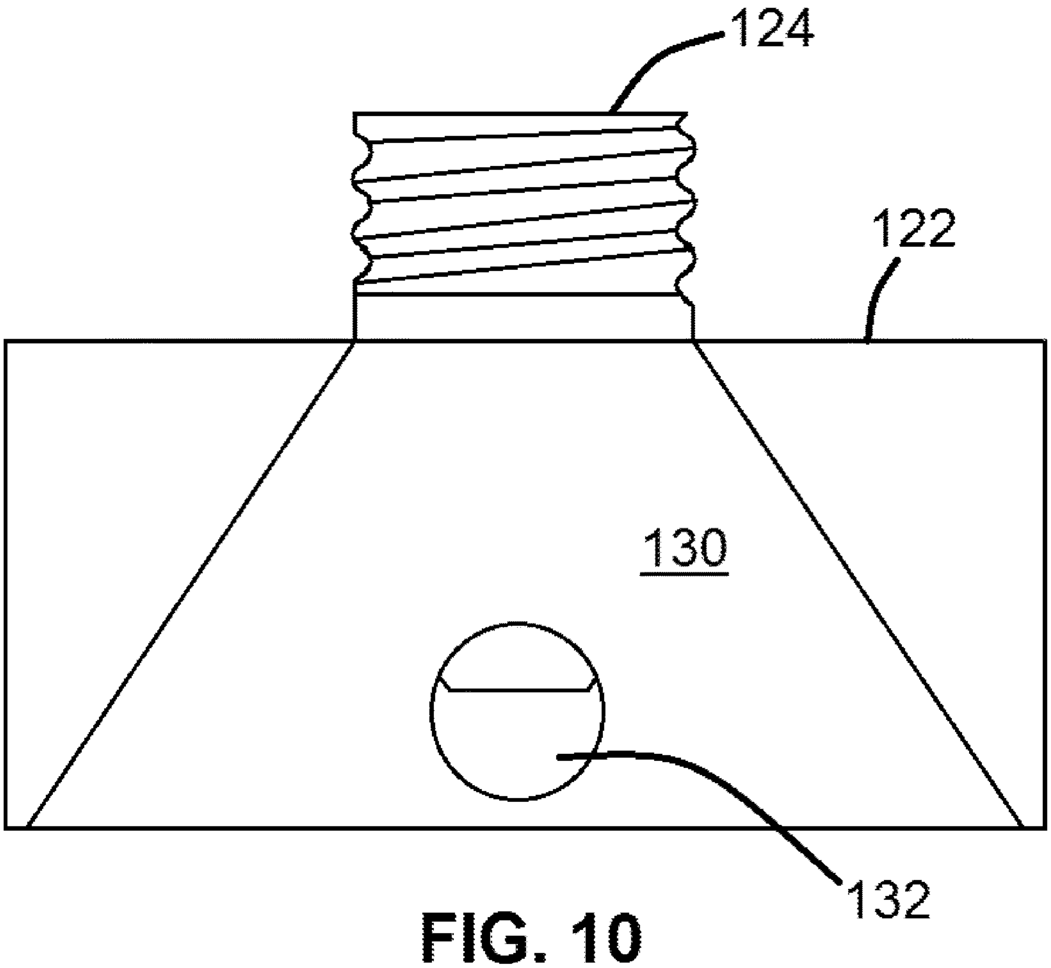
FIG. 10 shows a side view of a sensor unit according to exemplary embodiments of the present disclosure.
Figure 11:
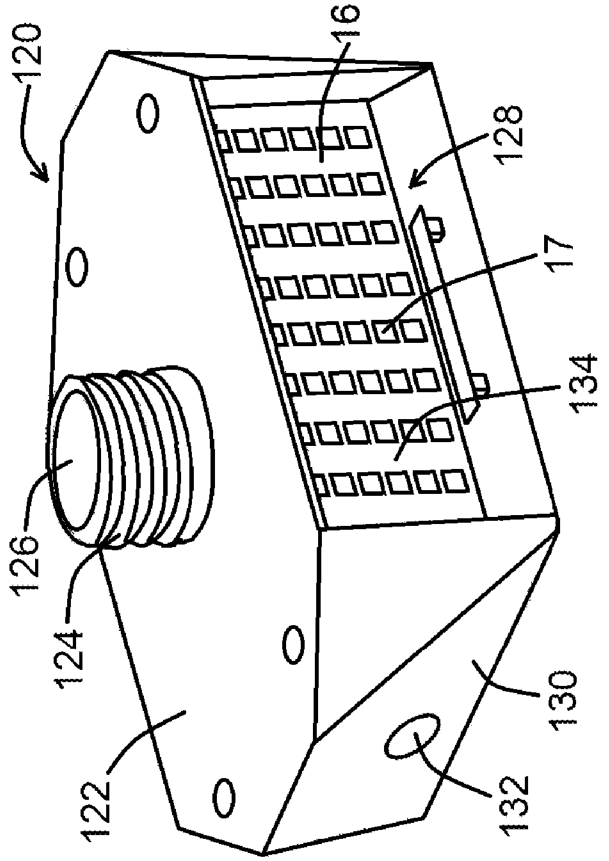
FIG. 11 shows an isometric view of a sensor unit according to exemplary embodiments of the present disclosure.
Figure 12:
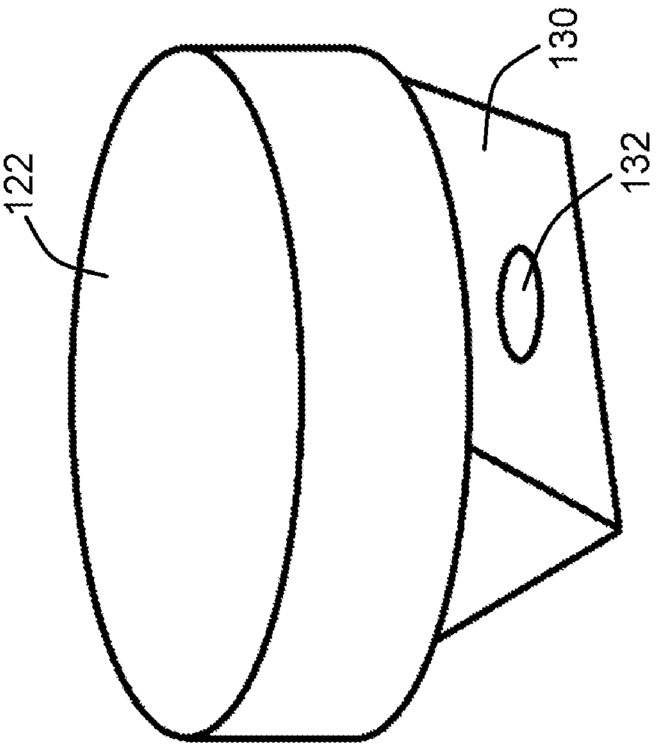
FIG. 12 shows an isometric view of an alternative sensor unit according to exemplary embodiments of the present disclosure.
Figure 13:
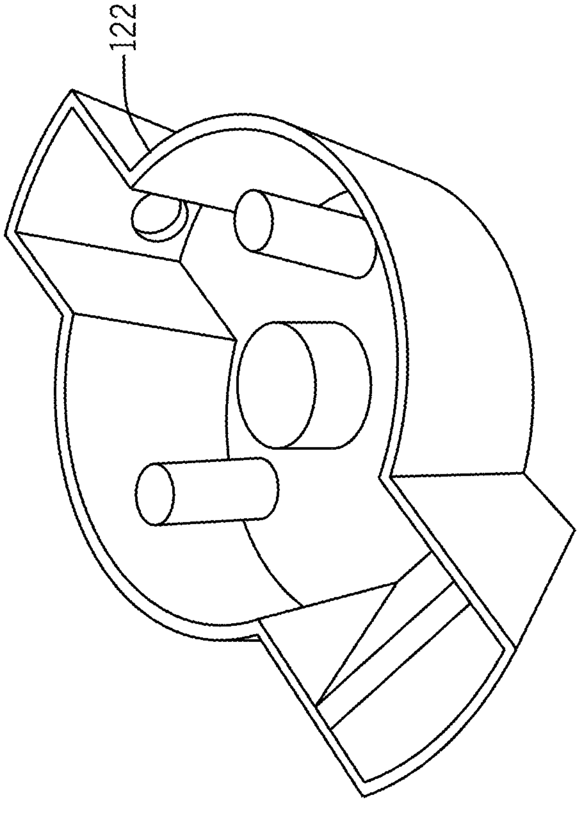
FIG. 13 shows an isometric view of a sensor unit housing according to exemplary embodiments of the present disclosure.

FIGS. 9-11 show exemplary views of the sensor unit 120 and sensor unit housing 122. As shown therein, the sensor unit housing 122 may include/comprise a boss 124 by which the sensor unit 120 may be attached to the fixture 13. The boss 124 may include/define a passage 126 therethrough which power and/or communications lines 22, 32, or POE line may pass from the power controller 20 and processor 30 to the sensor 18 and annunciator 16. The sensor unit housing 122 may include/comprise a sensor face 130 and an annunciator face 128. The annunciator face 128 may include/comprise a sensor aperture 132 formed/defined therethrough. The sensor aperture 132 enables access between the sensor 18 and the environment of the data hub 100 that the sensor 18 is monitoring. The annunciator face 128 may be/comprise a transparent or at least translucent surface that enables light emitted by the annunciator 16 to be visible outside of the fixture 13 or sensor unit housing 122. In such an embodiment, the annunciator 16 may include/comprise an array of LEDs. FIGS. 12 and 13-13B show alternative embodiments of exemplary sensor unit housings 122.

Figure 13A:
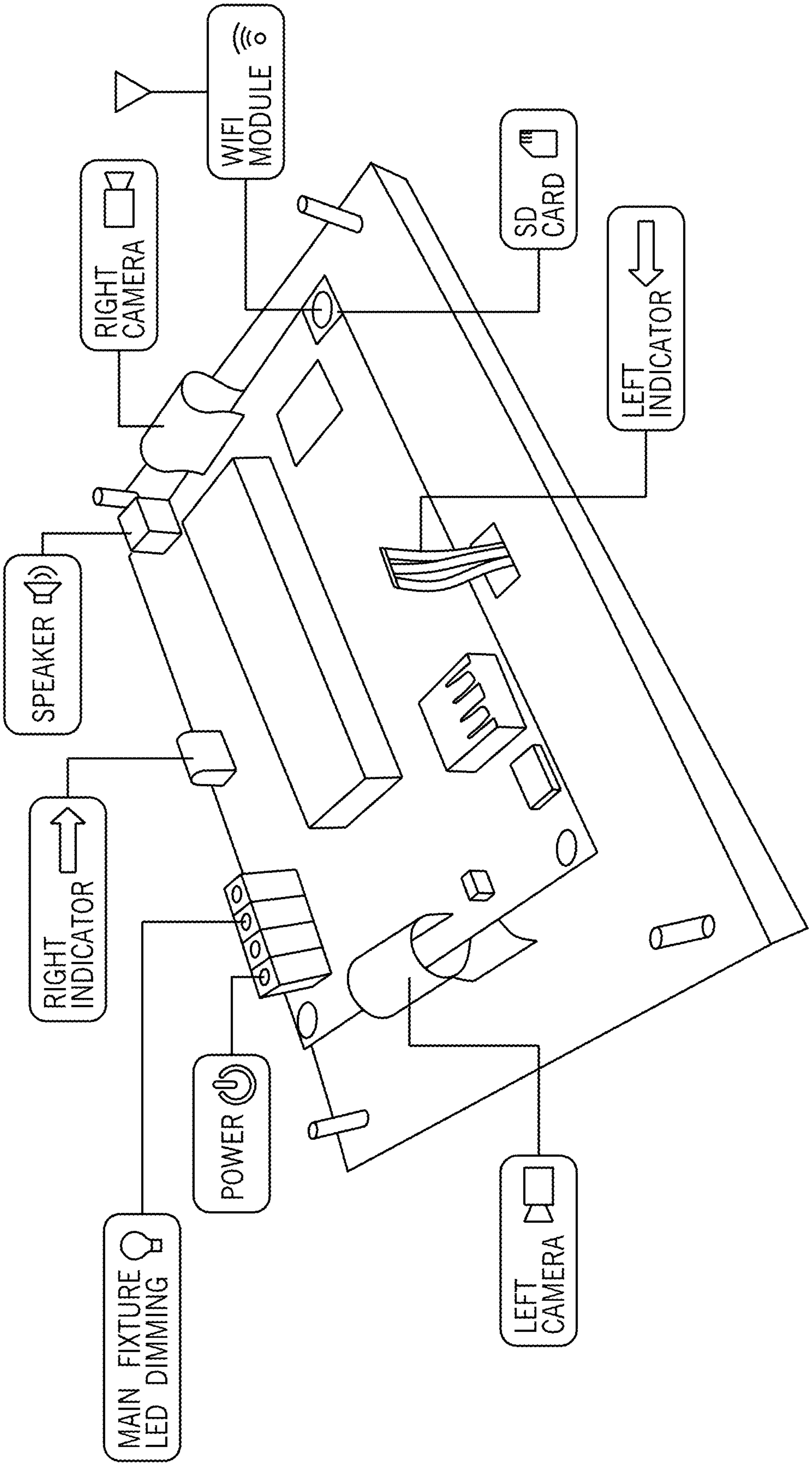
FIG. 13A shows a sensor according to an exemplary embodiment of the present disclosure.
Figure 13B:
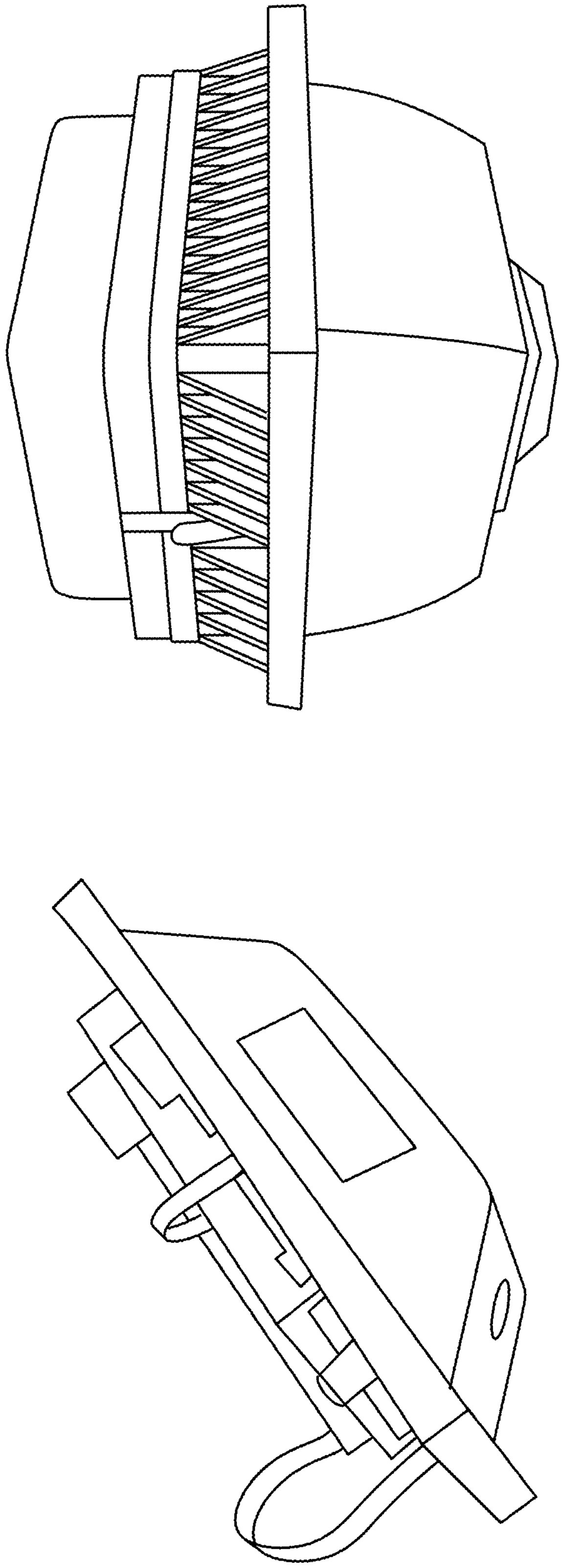
FIG. 13B shows a sensor unit housing (left side) and a data hub (right side) according to exemplary embodiments of the present disclosure.

FIG. 13A shows an exemplary sensor 18 of the present disclosure. In various embodiments, sensor 18 can be self-contained, camera-based, wireless, object detecting, and/or machine-learning devices. Motion activation capability of sensors 18 can include image and/or video capture, on-board storage, and EDGE processing, such as processing with intelligent EDGE internet of things (IoT) design with Cloud Native reporting and application programming interface (API) integration via a cellular link, for example. A private Wi-Fi mesh network, such as one having a 2.4 GHz Access Point (AP) and a 5.8 GHz backbone can be accessed using sensor 18 or components coupled thereto. Sensors 18 can be gateways, or a plurality of sensors 18 can use a dedicated gateway, for sensor decisions and communication, and involve a cellular uplink for cloud communication. Open-protocol for Parking Access Revenue Control Systems (PARCS) integration can also be used by sensor 18. Sensor 18 can be free-standing or integrated into a fixture 13, such as a light fixture, and can include lighting controls as desired. Various components referenced herein can be modularized, SOM, and/or COTS for easy upgrade.

Figure 14:
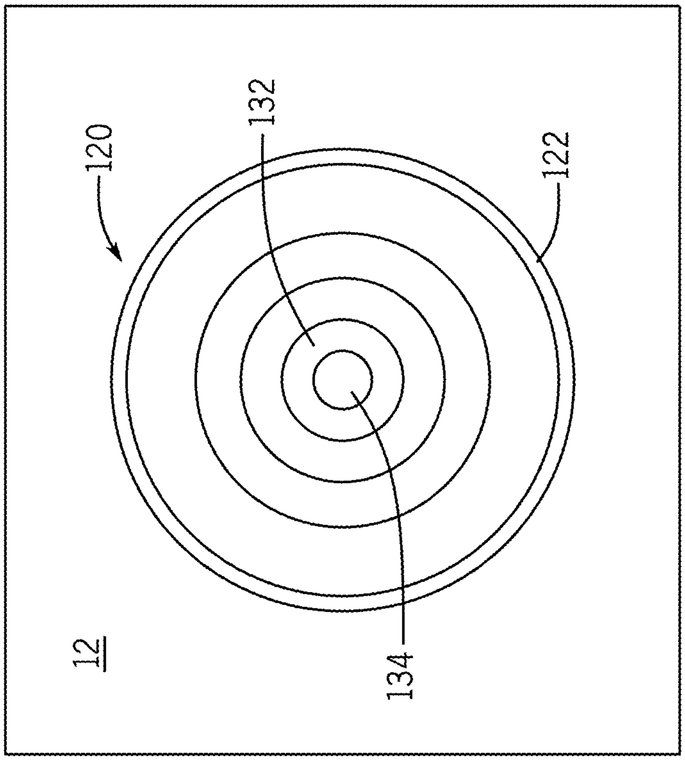
FIG. 14 shows an isometric view of a sensor unit according to exemplary embodiments of the present disclosure.

In at least one embodiment of the present disclosure, the sensor 18 may be/comprise a digital camera, including but not limited to a complementary metal-oxide-semiconductor (CMOS) camera or other suitable device. In such an embodiment, the sensor 18 may include/comprise a sensor lens 134 disposed within the sensor aperture 132 of the sensor unit 120, as shown in FIG. 14. In such an embodiment, the data hub 100 may use computer vision to monitor the environment, enabled by the camera of sensor 18 and the processor 30.

Figure 15:
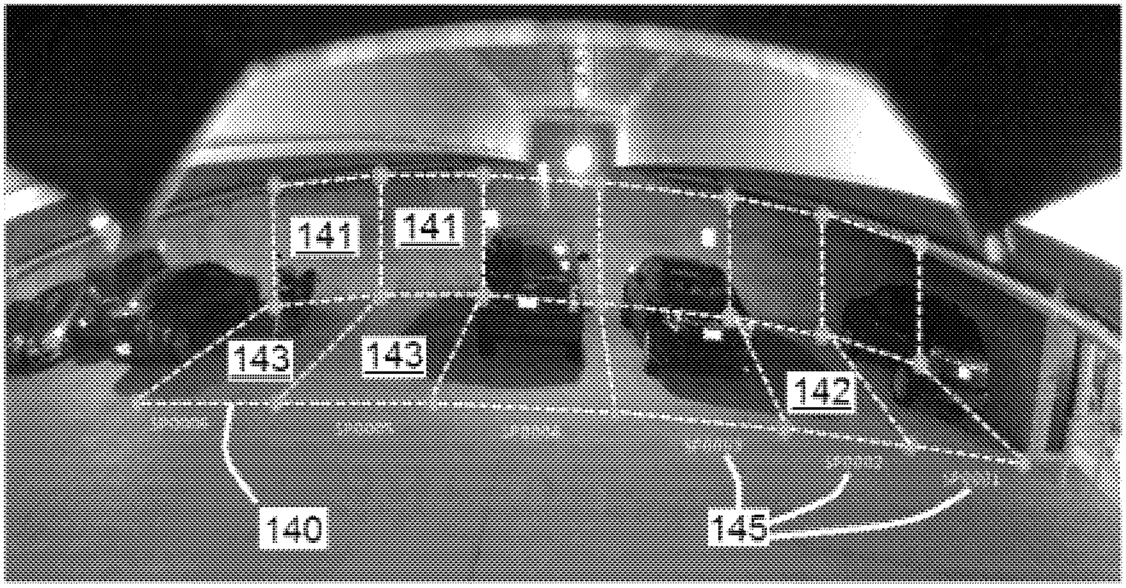
FIG. 15 illustrates a calibration mode of an occupancy analysis program according to exemplary embodiments of the present disclosure.

Using the sensor 18 in a calibration mode, for example, the processor 30 may generate a grid 140 of potential parking spaces 142, as shown in FIG. 15. Grid 140, as shown in FIG. 15, can identify general outlines of a parking surface 141 and/or a wall adjacent to a parking surface 143, such that a parking space 142 corresponds with the area(s) defined by outlines of parking surface 141, for example. Parking space identifiers 145 can also be generated using processor 30, such as shown in FIG. 15, so to "name" each parking space 142 identified using an exemplary sensor 18. The parking spaces 142 identified within a particular grid 140 may also be referred to herein as a zone 150 (such as shown in FIG. 20), whereby a zone 150 represents the parking spaces 142, volume or area, monitored (or monitorable) using a data hub 100 of the present disclosure.

Figure 16:
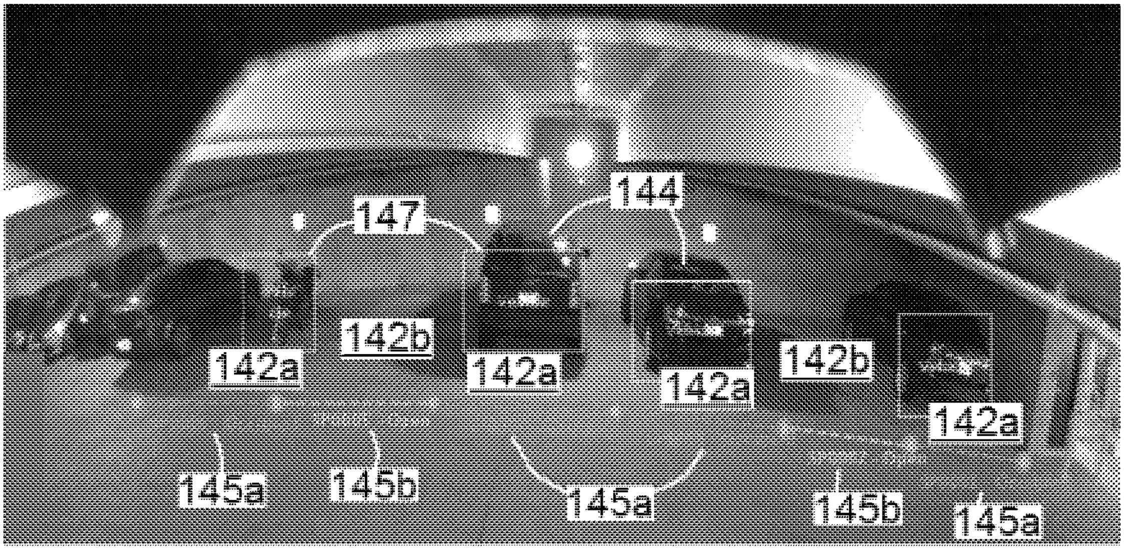
FIGS. 16-20 illustrate execution modes of an occupancy analysis program according to exemplary embodiments of the present disclosure.

The processor 30 may periodically or continuously monitor the grid 140 to determine whether a specific space 142 or zone is occupied by vehicle, pedestrian or other objects, or available, as shown in FIG. 16, and if occupied what attribute is assigned to the occupying object, space or zone. For example, and as shown in FIG. 16, processor 30 can determine which parking spaces 142 are occupied (identified as parking spaces 142*a*) and which parking spaces 142 are available/vacant (identified as parking spaces 142*b*). Parking space identifiers 145 can also reflect whether or not a parking space 142 is occupied (parking spaces 142*a*, corresponding to parking space identifiers 145*a*, for example) or is vacant (parking spaces 142*b*, corresponding to parking space identifiers 145*b*, for example). Processor 30, in various embodiments, can also generate one or more vehicle identifiers 147, such as, for example, a graphical indication that a particular parking space 142 is occupied by a vehicle 144, as shown in FIG. 16. Vehicle identifiers 147 can appear as boxes, such as shown in FIG. 16, including an identifier therein (such as "Vehicle") or other identifier as may be desired. Furthermore, the various parking space identifiers 145, vehicle identifiers 147, and/or pedestrian identifiers 149 (referenced in further detail below) can comprise any number of colors, such as different colors to indicate the presence or absence of an available parking space 142, a vehicle 144, and/or a pedestrian 146, for example. Parking space identifiers 145 may also include active or passive mounted medallions, badges, reflector, placards, etc. in the parking space 142 or designated zone that can only be visually or electronically "seen" when the space or zone is not occupied.

Figure 17:
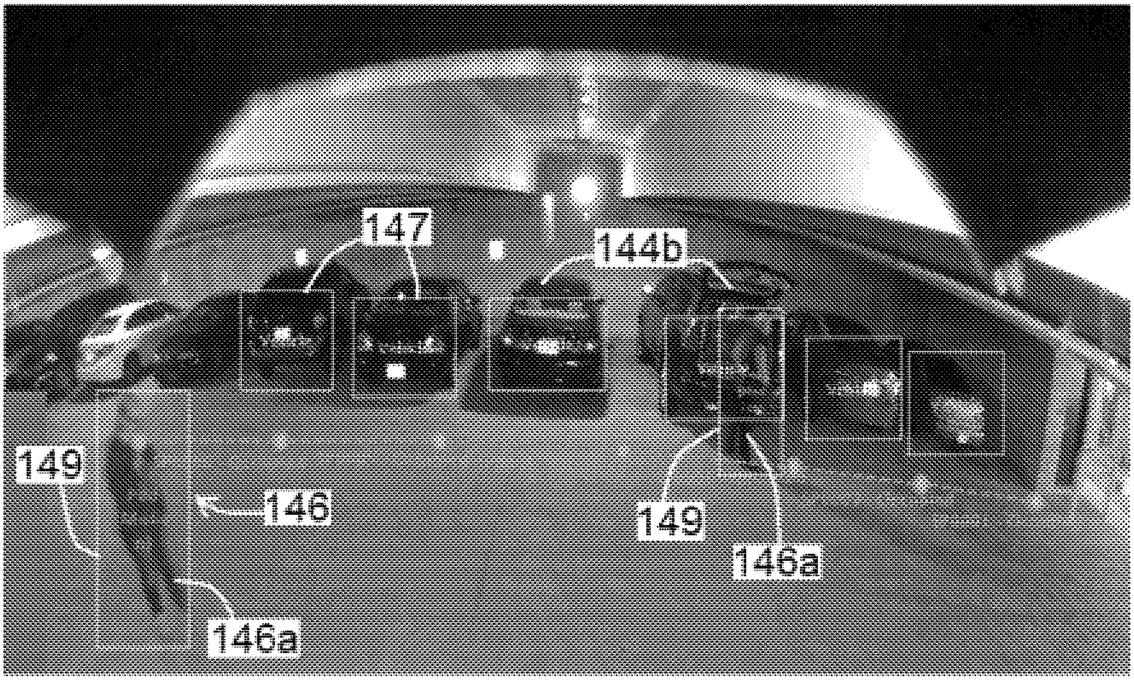
Figure 18:
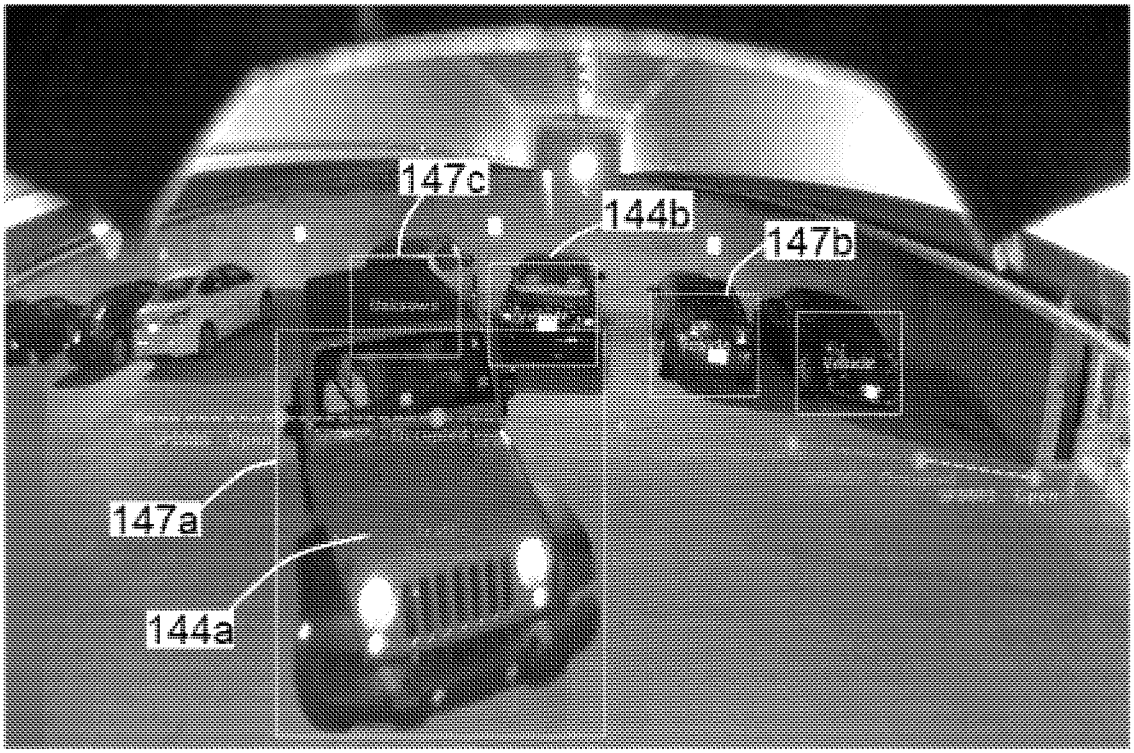
Figure 19:
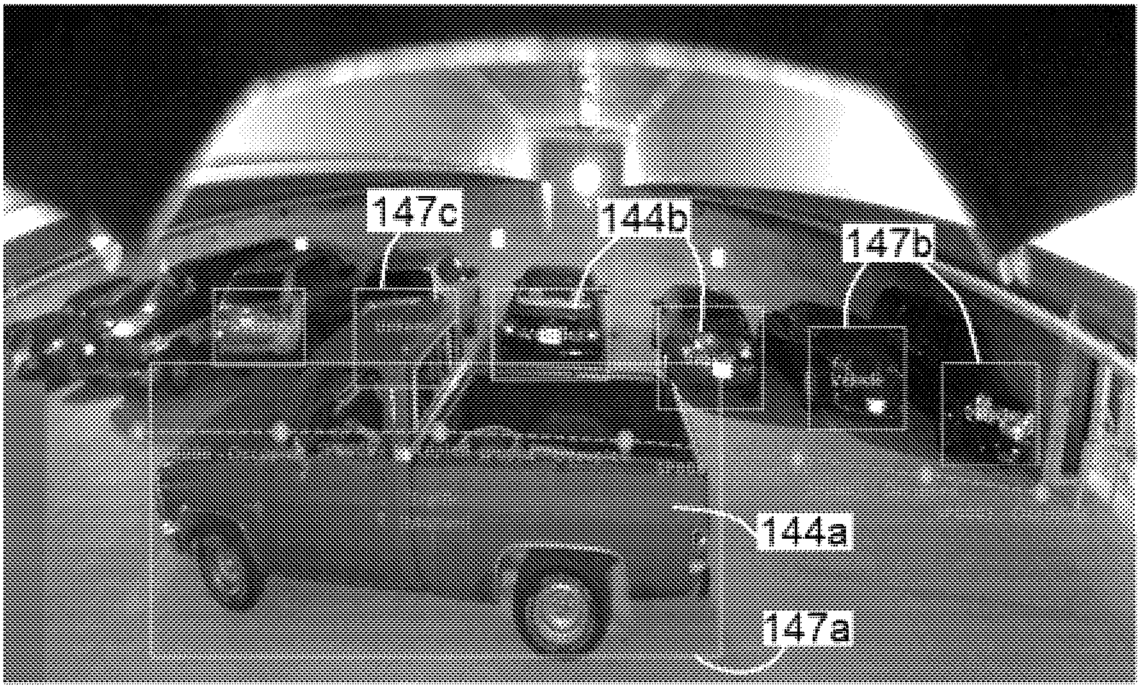
Figure 20:
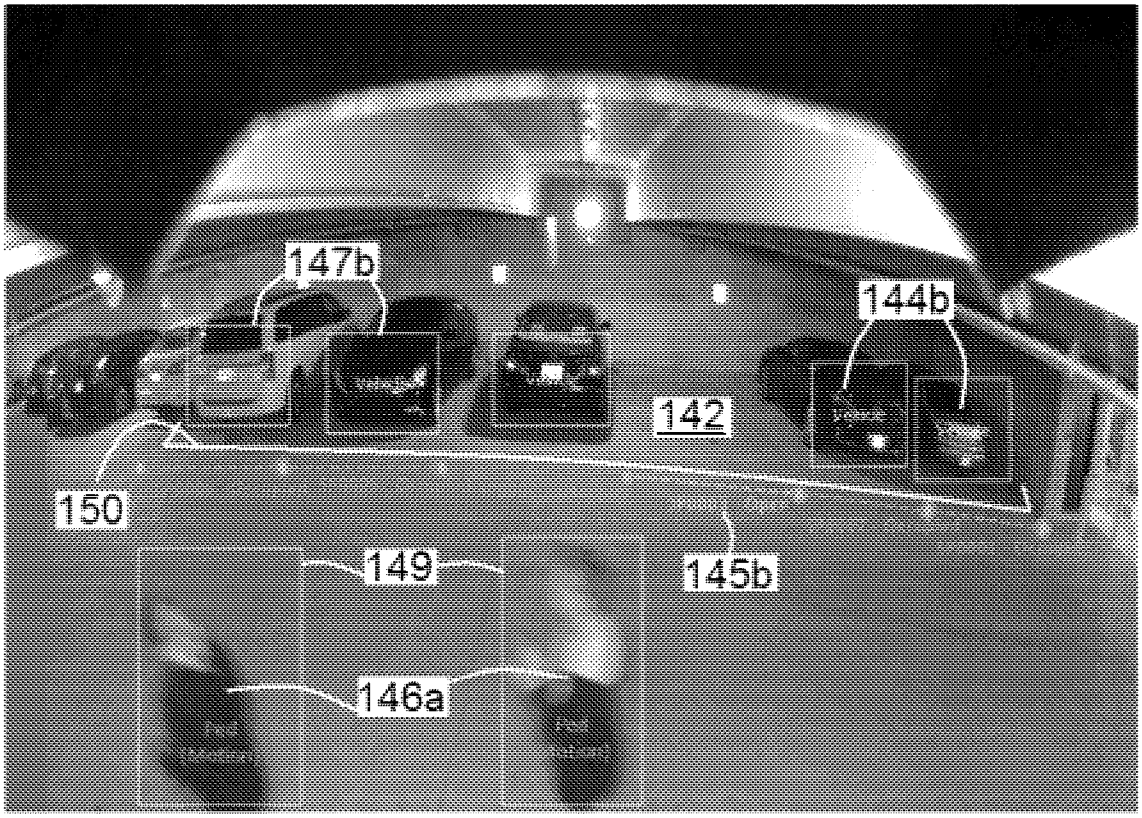

The processor 30 may further distinguish between vehicles 144 and pedestrians 146 in the field of view, as shown in FIGS. 17-20. FIGS. 18 and 19 show moving vehicles 144*a* as well, while FIG. 20 shows moving pedestrians 146*a*.

FIG. 17 shows various stationary vehicles 144*b* and moving pedestrians 146*a*. All parking spaces 142 shown in FIG. 17 are occupied, as identified by parking space identifiers 145. Processors 30 are configured to determine whether or not vehicle(s) 144 and/or pedestrian(s) 146 is/are present, and if so, whether or not said vehicle(s) 144 and/or pedestrian(s) 146 are moving (moving vehicles 144*a* and/or moving pedestrians 146*a*) or are stationary (stationary vehicles 144*b* and/or stationary pedestrians (not shown)).

FIG. 18 shows various stationary vehicles 144*b* and one moving vehicle 144*a* (in the foreground). As shown in FIG. 18, three vehicle identifiers 147 (shown in the figure as 147*a*, 147*b*, and 147*c*) identify, for example, the presence of vehicles 144 (using vehicle identifier 147*a* to indicate a moving vehicle identifier 147*a* and vehicle identifier 147*b* to indicate a stationary vehicle identifier 147*b*), while one vehicle identifier 147 (using vehicle identifier 147*c*) is identified as "Unknown," as sensor 18, working with processor 30, cannot readily identify the status of one of the parking spaces 142 in view because it is partially obstructed by a moving vehicle 144*a*. As such, processors 30, working with sensors 18 of the present disclosure, can identify whether or not a parking space 142 within the scope of a particular sensor 18 is occupied or vacant, and when a determination cannot be made regarding whether or not a parking space 142 within the scope of a particular sensor 18 is occupied or vacant, processor 30 can generate a vehicle identifier of "Unknown" or some other type of identifier that indicates that a parking space 142 status cannot be identified at that time. Unknown and other non-exclusive identifiers can be retrieved for further evaluation, learning, etc.

FIG. 19 shows three versions of exemplary vehicle identifiers 147, including a moving vehicle identifier 147*a* (the truck in the foreground), stationary vehicle identifiers 147*b* (the parked vehicles that are not blocked by the truck in the foreground), and an unknown vehicle identifier 147*c*, which can be generated by processor 30 when processor 30 cannot readily identify the status of one of the parking spaces 142 in view because it is partially obstructed by a moving vehicle 144*a* or some other object or person, such as a pedestrian 146.

FIG. 20 shows two moving pedestrians 146*a*, with pedestrian identifiers 149 identifying said pedestrians 146*a*. Zone 150, as referenced above, is identified here as including or encompassing six parking spaces 142, noting that in various embodiments, zones 150 can include or encompass one, two, three, four, five, six, or more parking spaces 142, as well as drive lane and other surfaces, areas and volumes. Within zone 150 shown in FIG. 20, for example, there is one vacant parking space (identified as 142 in the figure), and five parking spaces 142 that are occupied by stationary vehicles 144*b*, which are identified by sensor 18 and/or processor 30 as stationary vehicle identifiers 147*b*. The vacant parking space is identified with a vacant parking space identifier 145*b*. As shown in FIG. 20, data hubs 100 of the present disclosure can identify and distinguish between stationary vehicles 144*b* and moving pedestrians 146*a*, and as referenced herein, can identify and/or distinguish between moving vehicles 144*a*, stationary vehicles 144*b*, moving pedestrians 146*a*, stationary pedestrians 146*b*, occupied parking spaces 142*a*, and vacant parking spaces 142*b*.

By monitoring the field of view over time, the processor 30 determines whether a vehicle 144 or pedestrian 146 is either stationary or in motion. When the processor 30 determines that a vehicle 144 is stationary within a space 142 of the grid 140, the processor 30 may activate the annunciator 16 to indicate that a space 142 in the vicinity is occupied. When the processor 30 determines that a space 142 of the grid 140 is unoccupied by a stationary vehicle 144, the processor 30 may activate the annunciator 16 to indicate that a space 142 in the vicinity is available. The processor 30 may not generate an indication of space 142 occupancy if no stationary vehicle 144 is detected. When the processor 30 determines that a pedestrian 146 is in motion (a moving pedestrian 146*a*) within the field of view, the processor 30 may activate the annunciator 16 to broadcast music, current location (e.g., level or area), directions, advertising, greetings, guest information, weather warnings or alerts, emergency alerts and directions (e.g., fire, medical, assault, etc.), and Amber or Silver alerts to the passer-by and/or notification of potential interaction or conflict with approaching vehicles of objects.

In certain embodiments, the processor 30 is configured to activate the light source 14 and/or annunciator 16. Alternatively, the processor 30 may be configured to activate the annunciator 16, and the light source 14 may be separately controlled. The processor 30 may enable light balancing where light output of the light 14 can be adjusted, via a variable output driver, to deliver a desired output of actual light illumination. In at least one embodiment, the data hub 100 includes/comprises a battery to provide emergency lighting via the light source 14 and/or emergency messages and indication via the annunciator 16. In certain embodiments, the data hub 100 includes/comprises a global positioning system to identify the location of specific data hub 100 to aid in guidance and other functionality as described herein. The data hub 100 may include/comprise data management capability to enable information gathered by the data hub 100 to be processed and provided in desired formats to third parties interested in the data.

Figure 21A:
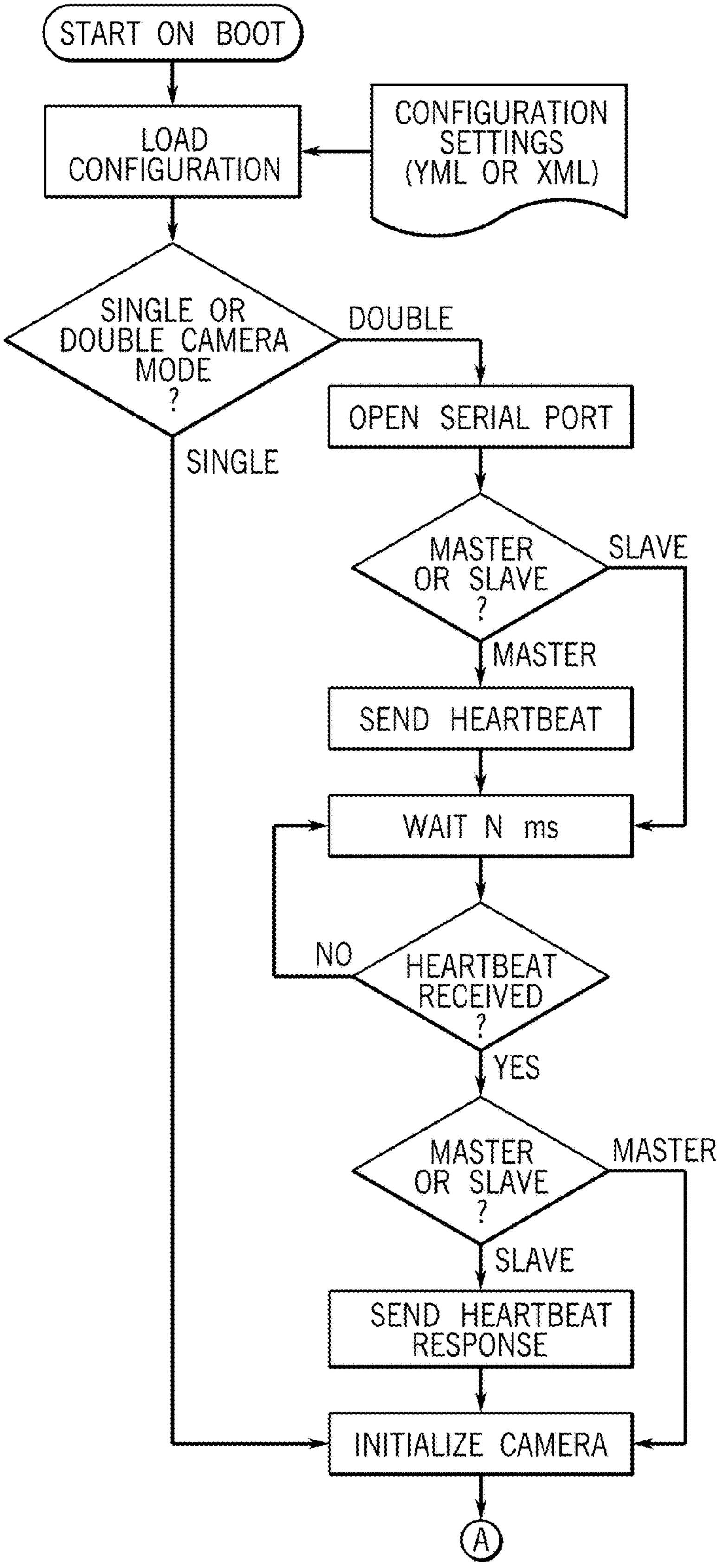
FIGS. 21A, 21B, 22, 23, 23A, and 24A show sensor logic diagrams according to exemplary embodiments of the present disclosure.

FIGS. 21A-24 illustrate control logic for the sensor 18 for an embodiment in which the processor 30 or gateway 64A is controlling more than or one sensor 18. In certain embodiments, the processor 30 of one data hub 100 may control and operate upon the sensor signal 40 communicated from a sensor 18 disposed within a different data hub 100. For example, FIG. 21A illustrates control logic relating to general start-up of one or more data hubs 100 of the present disclosure. Various configuration settings are available, whereby different loads can be determined, such as, for example, using existing power infrastructure that powers one or more lights of a parking garage to also power one or more data hubs 100 (such as one or more light sources 14, one or more processors 30, etc.) of the present disclosure, so that no additional power lines are required. Existing power for illumination, for example, can also power a processor 30 and other low-voltage downstream systems as may be desired.

Figure 21B:
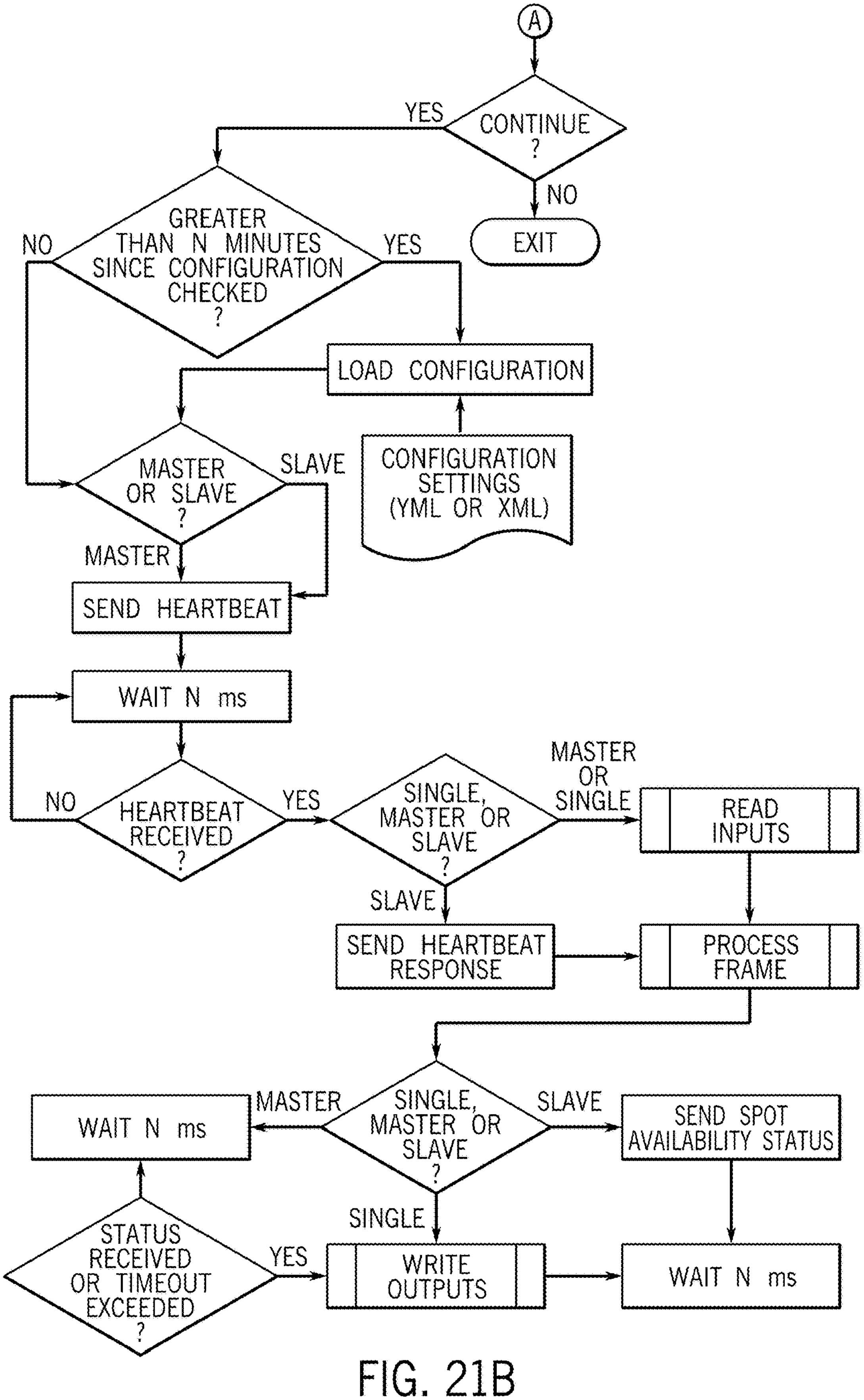

Single camera mode, as referenced in FIG. 21B, relates to embodiments where one camera (sensor 18) is used, and double camera mode relates to embodiments where two cameras (sensors 18) are used in conjunction with one another. For example, in an embodiment of a data hub 100 of the present disclosure having two light sources 14, one sensor 18 can be used, and in embodiments having one light source 14, two sensors 18 can be used, for example. One sensor 18 can be considered as the master sensor 18, and the other sensor 18 can be considered the slave sensor 18, in various embodiments, a "heartbeat," or a signal, can be sent from one sensor 18 to the other 18, so to detect active operation of the sensor 18 receiving the heartbeat/signal, and a response can then be received by the sending sensor 18 to indicate that both sensors 18 are operational and in communication with one another. A master sensor 18 can communicate with a slave sensor 18 and/or to other master sensors 18 within a general vicinity, as may be desired. Sensor 18 data, such as camera images, for example, can be saved at various time increments, such as one frame per second, one frame per five seconds, thirty frames per second, one frame per ten seconds, or at larger or smaller time increments.

Vehicles are becoming more connected with vehicle-to-vehicle, vehicle-to-device, vehicle-to-host, etc. This V2X communication using mobile broadband, cellular and other wireless technologies have partially evolved under the 3GPP umbrella. Such advancements in communication has led to the development of mobile broadband guidelines including IEEE802.11p, and others industry standards. While IEEE802.11p, an extension of the IEEE802.11a (Wi-Fi) standard presently used in this disclosure, is considered ready for use now, its LTE-V2X counterpart is still in its development phases. Both methods address the direct broadcast of messages and vehicle specific information in a V2X environment. The ability to communicate with V2X equipped vehicles allows access to vehicle specific information which could include vehicle year, make, model, color, VIN, License plate number, etc. This information could be used to identify, augment and provide specific services for vehicles located within this disclosure's service area. Embodiments of this disclosure include and support both the IEEE802.11p and LTE protocol with its private wireless mesh network 102, its 5 GHZ gateway 64A, other radio frequencies may be uses, and cellular communication (FIG. 6A).

Figure 22:
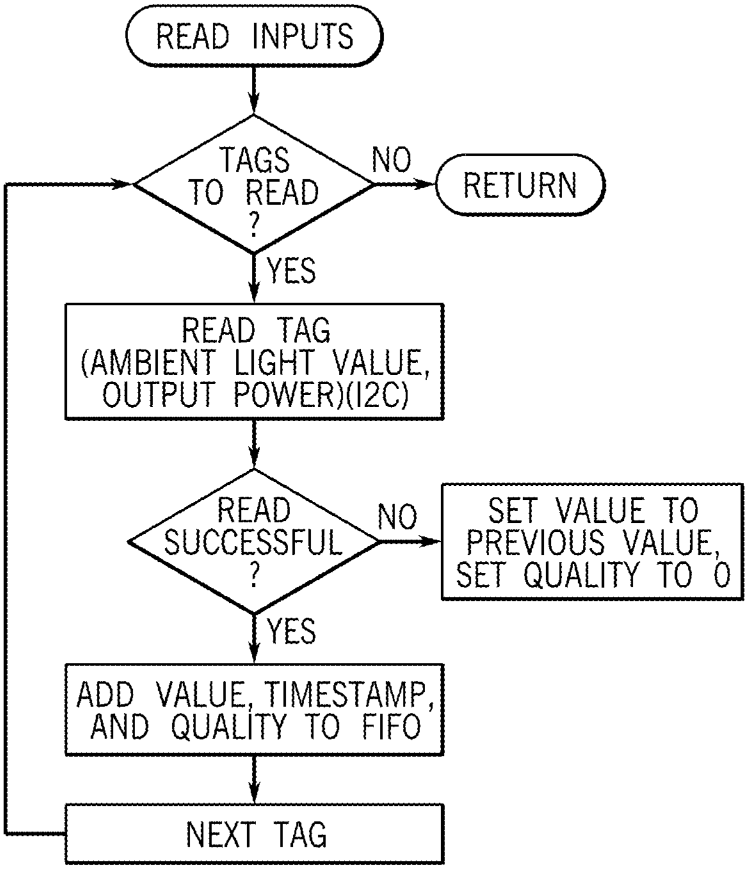
Figure 37:
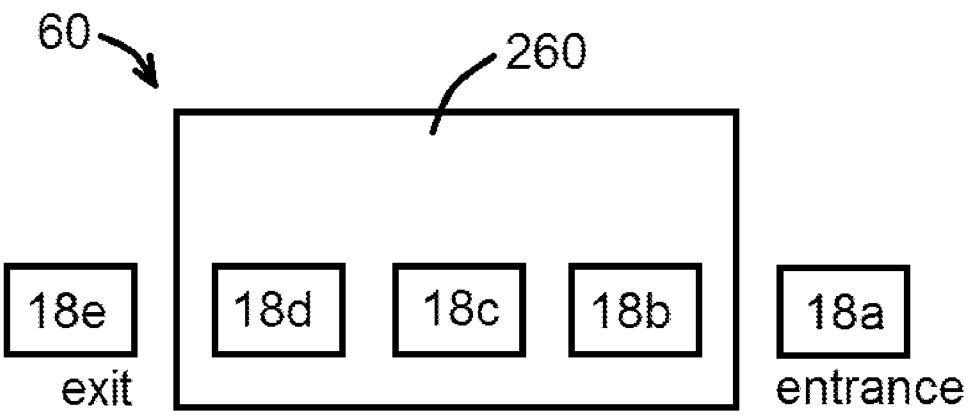
FIG. 37 shows sensors of a system inside and outside of a parking lot or garage according to exemplary embodiments of the present disclosure.

FIG. 22 illustrates control logic for various read inputs of the present disclosure, such as read inputs relating to tags, including but not limited to license plates/tags. Sensors 18 of the present disclosure, as referenced herein, are configured to operate to do one or more of a) detecting parking spaces 142, such as occupied parking spaces 142*a* and vacant parking spaces 142*b*, b) detecting vehicles 144, such as moving vehicles 144*a* and stationary vehicles 144*b*, c) detecting pedestrians 146, such as moving pedestrians 146*a* and stationary pedestrians (not shown), and d) detect other items, such as license plate, tag, Bluetooth enabled devices, radio transmitters, V2X designator, etc., referenced in FIG. 22. Sensors 18, working with processors 30, can detect a license plate, tag, Bluetooth enabled devices, radio transmitters, V2X designator, and/or vehicle specifics when vehicle 144 enters a garage or lot, as it travels through the garage and parks, and when it leaves the parking space 142 and exits the garage or lot. Various sensors 18 and processors 30 (of various data hubs 100) can work together, such as shown in FIG. 7 or 37, for example, so to detect entry, parking, and exit of various vehicles 144 within one or more parking garages or lots. Sensors 18 can operate as, or in conjunction with, license plate recognition (LPR) devices and/or V2X designator, etc., whereby, for example, processors 30, server 64, and/or gateway 64A can directly or indirectly facilitate payment for parking in connection with a particular vehicle 144, such as, for example, by way of a license plate, tag, Bluetooth enabled devices, radio transmitters, V2X designator, etc. being used in connection with a payment mechanism (such as a credit card, checking account, debit card, and/or other electronic payment means) so to charge the operator or owner of the vehicle 144 for parking, as appropriate, without requiring a payment kiosk, for example. Data hubs 100 of the present disclosure can therefore identify a license plate tag, Bluetooth enabled devices, radio transmitters, V2X designator, camera, etc. to assign a value and timestamp (as shown in FIG. 22) in connection with that license plate, tag, Bluetooth enabled devices, radio transmitters, V2X designator, camera, etc. to monitor movement and ultimate parking of the vehicle 144 having that license plate, tag, Bluetooth enabled devices, radio transmitters, V2X designator, etc. to monitor exit of that vehicle 144, calculate fee(s) due for parking, and process payment for said fee(s). FIG. 37, for example, shows a diagram of a parking lot or structure 260, whereby a first sensor, LPR device, and/or V2X designator (shown as sensor 18*a*) is positioned at and/or directed to a relative entrance of the parking lot or structure 260, and whereby a plurality of sensors (shown as sensors 18*b*, 18*c*, and 18*d*, for example) are positioned in and/or directed to locations (such as zones 150 and/or specific parking spaces 142) within parking lot or structure 260, and whereby an additional sensor, LPR device, and/or V2X designator (shown as sensor 18*e*) is positioned at and/or directed to a relative exit of parking lot or structure 260. Using such a system 60, a vehicle 144 can enter parking lot or structure 260, and a processor 30 in communication with sensor 18*a* can identify vehicle 144 by LPR, V2X designator, or otherwise, and associate the identified vehicle 144 with a date and time of entry. Sensors 18*b*, 18*c*, 18*d*, and/or other sensors 18 can effectively follow identified vehicle 144 through the parking lot or structure 260 until vehicle 144 parks, for example, as vehicle 144 has been identified by system 144, and the identification can be communicated to sensors 18*b*, 18*c*, 18*d*, and/or other sensors 18. The specific parking space 142 used by vehicle 144 can also be identified. Sensors 18*b*, 18*c*, 18*d*, and/or other sensors 18 can then effectively follow vehicle 144 from the parking space 142 to the exit of the parking lot or structure 260, whereby sensor 18*e* can detect the identified vehicle and associate the identified vehicle 144 with a date and time of exit. Portions of system 60 can then determine a parking and other fees owed based upon the date and time of entry, the date and time of exit, and optionally the parking space(s) 142 used, imposed time limitations, violations, etc. and charge the owner/operator of the vehicle 144 accordingly. Furthermore such vehicle specific data can be used to determine whether a vehicle is listed on White/Black/Gray lists, or any other vehicle specific database (i.e. Amber Alert, Silver Alert, etc.).

While object detection provides space occupancy status, vehicle tracking (VT) provides specific information on the vehicle (object) upon ingress into the parking structure, its movements within the structure, its precise parking location, duration of stay, and point of egress, for example. Vehicle data can be capture using any one single or a combination of technologies including license plate recognition, photographs, Bluetooth signature, Radio, Wi-Fi signature, IR images, LIDAR, and/or V2X communication to identify the vehicle and pair this information with the space detection results of the recently parked vehicle. Upon departure this accumulated information can be used to determine items such as vehicle parking location, duration of stay, dynamic pricing, event billing, black/gray/white list, violations, alerts, etc. to dashboards, handheld and smart devices, kiosks, as well as other communication devices.

One or more of sensors 18*b*, 18*c*, and 18*d*, for example as noted above, can identify the parking space 142 used by vehicle 144. Using an application (or "app") on a smart device 105, as referenced herein, a user can find his or her parked vehicle 144 as the app can provide location information for the vehicle 144 from the sensor (18*b*, 18*c*, 18*d*, or other sensor 18) that detected the parked vehicle 144, as the location would be known by said sensor (18*b*, 18*c*, 18*d*, or other sensor 18).

Figure 23:
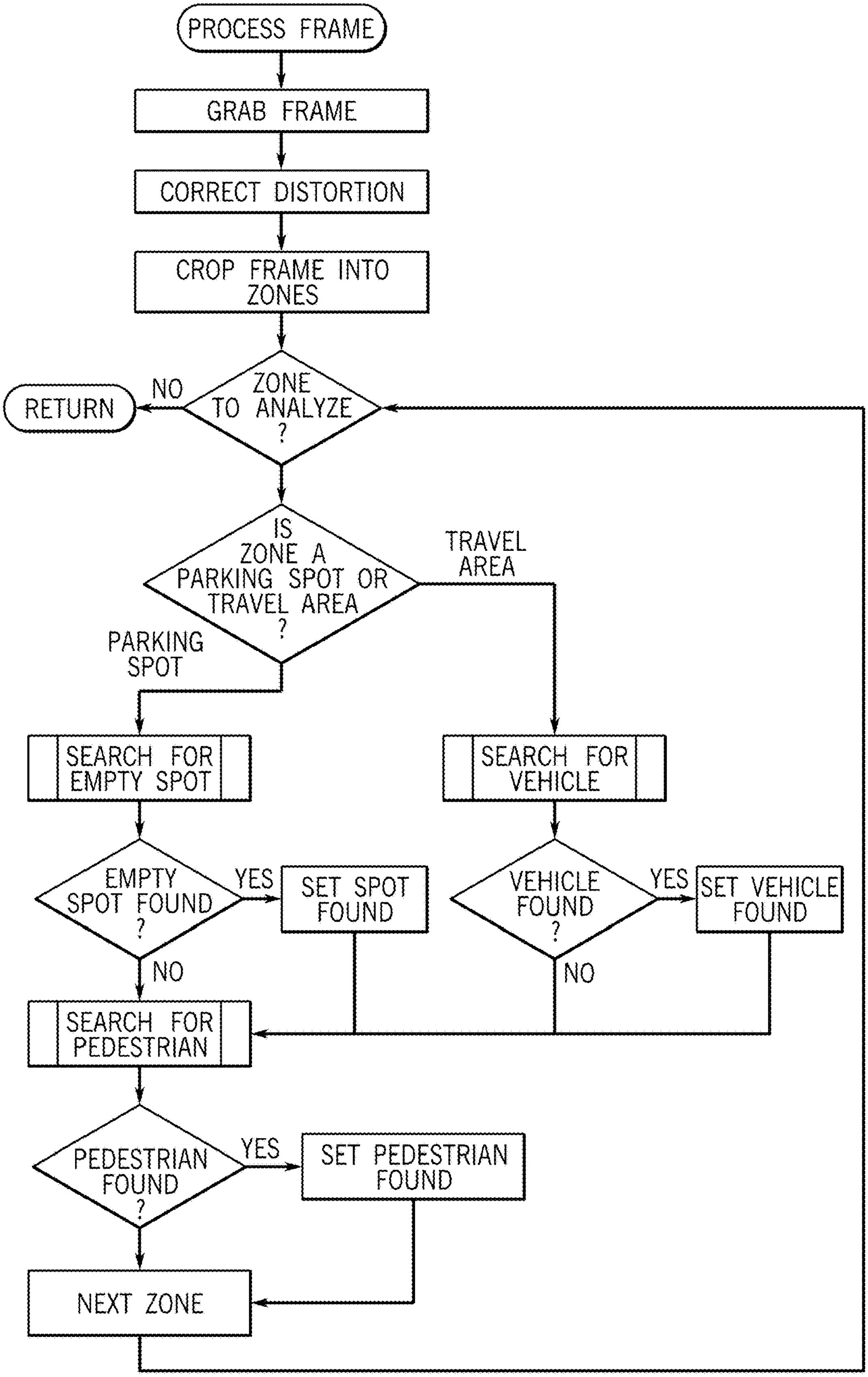
Figure 23A:
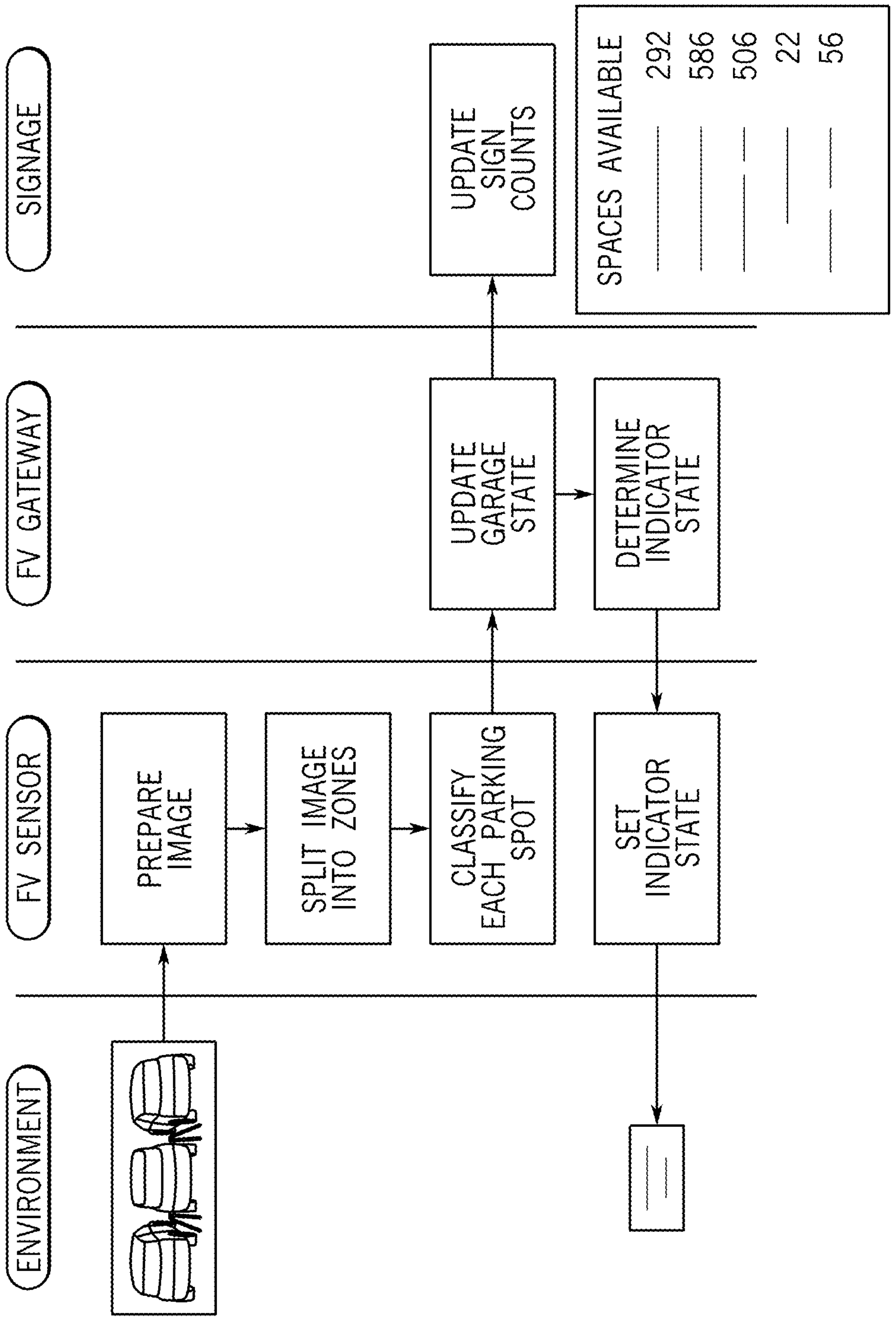
Figure 23B:
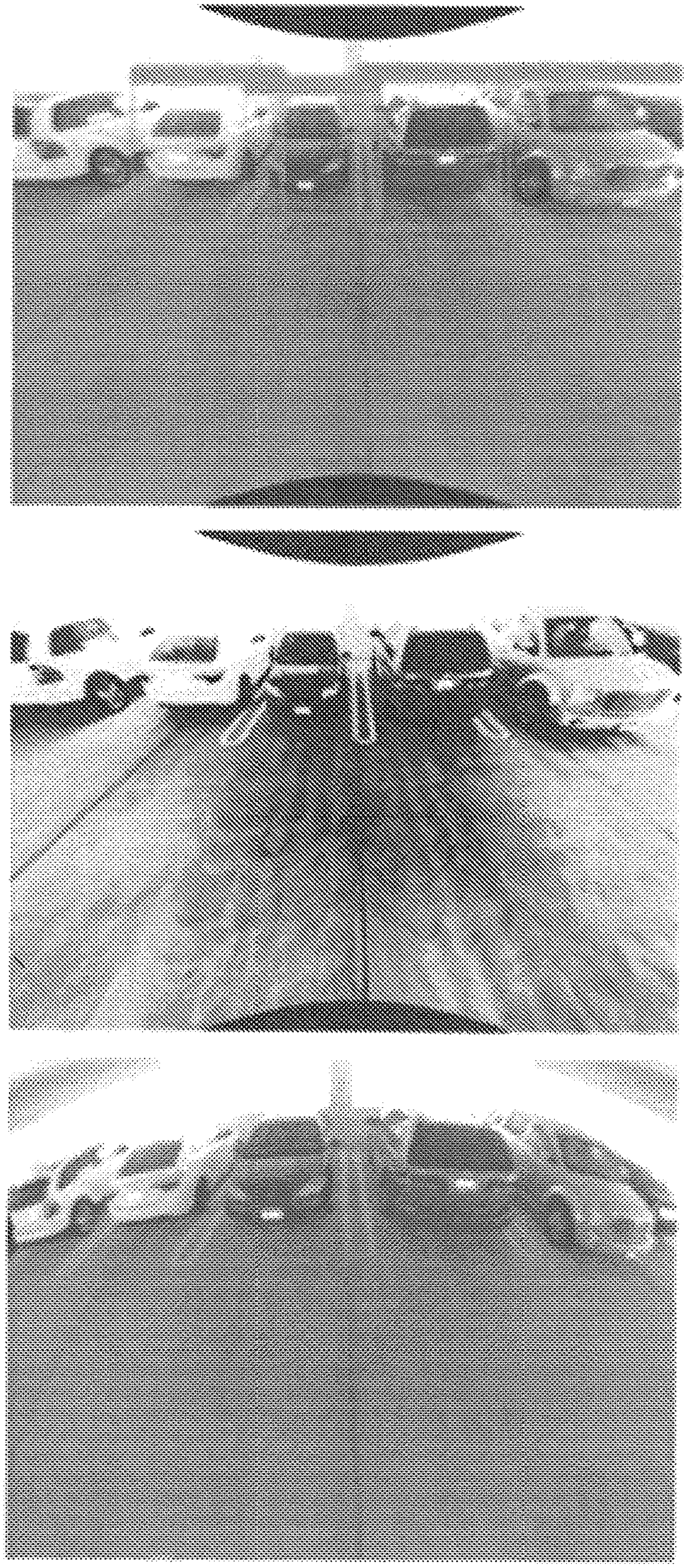
FIG. 23B shows images obtained using a sensor according to exemplary embodiments of the present disclosure.

FIGS. 23-23B illustrate control logic and processes for various frame processes of the present disclosure, including, but not limited to, grabbing/obtaining video frames (video data), correcting distortion within the same, cropping frames into zones (so to monitor a desired number of parking spaces 142, for example), and analyzing parking spaces 142 as generally referenced herein, such as, for example, detecting the presence of vehicles 144 and/or pedestrians 146. This process can be repeated over time and for various zones, as frequently as desired.

Figure 24A:
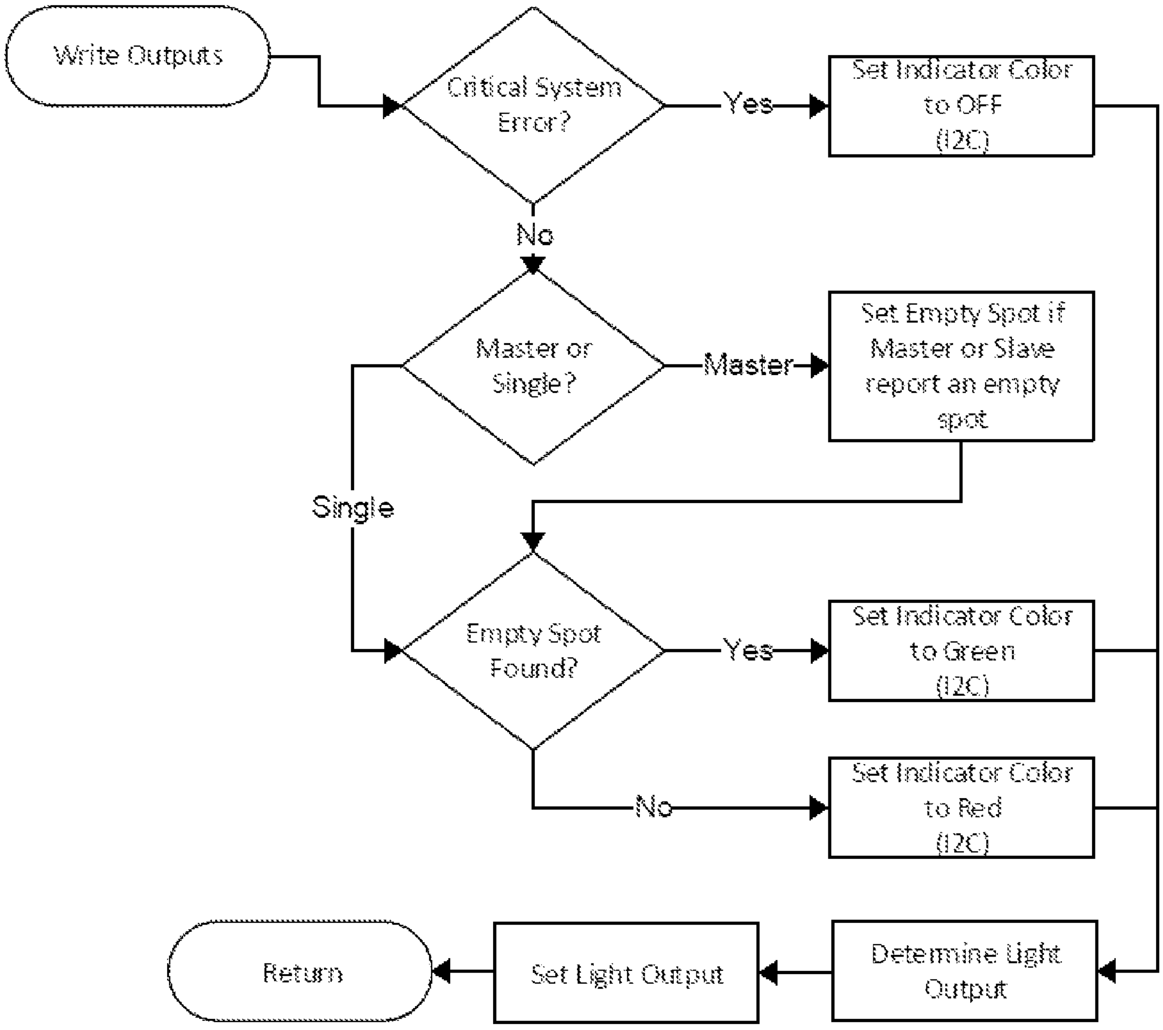

FIG. 24A illustrates control logic for various write outputs of the present disclosure, such as to eventually set one or more indicators (annunciators 16) to a desired color. For example, a data hub 100 of the present disclosure can be set to monitor a zone of six parking spaces 142, such as shown in FIGS. 15-20. Should at least one parking space 142 within said zone be available (not occupied), processor 30, server 64, and/or gateway 64A could direct annunciator 16 to emit a green light, indicating that a parking space 142 is available for use within said zone, such as would be the case in FIG. 16, as two parking spaces 142 are available. Should no parking spaces 142 within a zone be available, meaning that all parking spaces 142 in said zone are occupied (such as shown in FIG. 17), processor, server 64, and/or gateway 64A could direct annunciator to emit a red light. Other light colors or uses are also contemplated herein. In various embodiments, annunciators 16 could emit a first color when one or more parking spaces 142 within a zone are available, and annunciators 16 could emit a second, different color when no parking spaces 142 within a zone are available. Furthermore, annunciator 16 could emit more than one color as its first announcement i.e. ADA and general parking could be split between blue and green (or different) colors in the same annunciator, changing to all green (or another color) when all the ADA spaces are occupied, all blue (or another color) when all the general parking is occupied, or all red (or another color) when all spaces are occupied.

FIG. 24B shows an exemplary table relating to the "determine light output" aspect of the control logic illustrated in FIG. 24A, whereby light sources 14 of data hubs 100 can be adjusted depending on a level of ambient light (which can change when it is sunny outside versus cloudy, and which also can change based on time of day), so that, for example, light sources 14 can be at a setback or turned off when there is a level of ambient light (measured in foot-candles, for example) is high enough so not to require light sources 14 to be on, turned on when ambient light is low, generally non-existent and/or motion is sensed, or at certain times of the day, and adjusted from 100% to a level below 100% (such as 25% or 50%, for example), so that some light is emitted by light sources 14 but done in an energy efficient manner. For example, should a sensor 18 detect a relatively low ambient light level, said detection can be relayed/transmitted to processor 30, server 64, and/or gateway 64A, whereby processor 30, server 64, and/or gateway 64A can cause light source 14 to either fully illuminate, partially illuminate, or illuminate at a higher level than a then-current level of illumination. Should a sensor 18 detect a relatively high ambient light level, said detection can be relayed/transmitted to processor 30, server 64, and/or gateway 64A, whereby processor 30, server 64, and/or gateway 64A can cause light source 14 to discontinue illumination, partially illuminate, or illuminate at a lower level than a then-current level of illumination. The table shows current LED (light source 14) output power as off, low, and high, the ambient light value as being high (45 foot-candles) or neutral (35 foot-candles), motion timer activity with default settings, and output power with off, low, and high output settings, for various scenarios. Control can also send signals to adjust light output based upon vehicle 144 and/or pedestrian 146 motion, and control levels can be variable, such as 0-10 volt, as well as in various steps as referenced herein.

While the motion(s) is/are used in one or more object detection protocols for space occupancy determination of the present disclosure, it can also be used to trigger the lighting control system to raise light levels when motion is detected. This lighting control system can be applied universally to all lights, individual lights, and/or defined lighting zones made up of selected lights—of which all parameters are adjustable on the applicable computer graphics interface dashboard. Light levels i.e. minimum and maximums, can also be adjusted as inputs, as can the duration that light levels will remain at a determined set level before automatically returning to their minimum state, awaiting the next motion or controller event. Furthermore, exemplary lighting control systems of the present disclosure can determine the ambient light level within the garage which can be used to override an increase in light output if the ambient level exceeds the preset minimum for controls initiation. In addition, exemplary lighting controls systems of the present disclosure can also determine the light level in the vicinity of the light fixture. This information can then be used to manage light output as well as generate lighting audits, surveys, photometrics, and other analytical and control purposes.

In situations where motion is detected, and based upon ambient light levels being lower than the predetermined setpoint, the light singularly or in a defined group, will increase from its resting level up to 100%, depending upon its assigned control parameters. Once all motion in the sensor zone has ceased the light(s) will return to their predetermined resting output level after a specific period of time.

Figure 25:
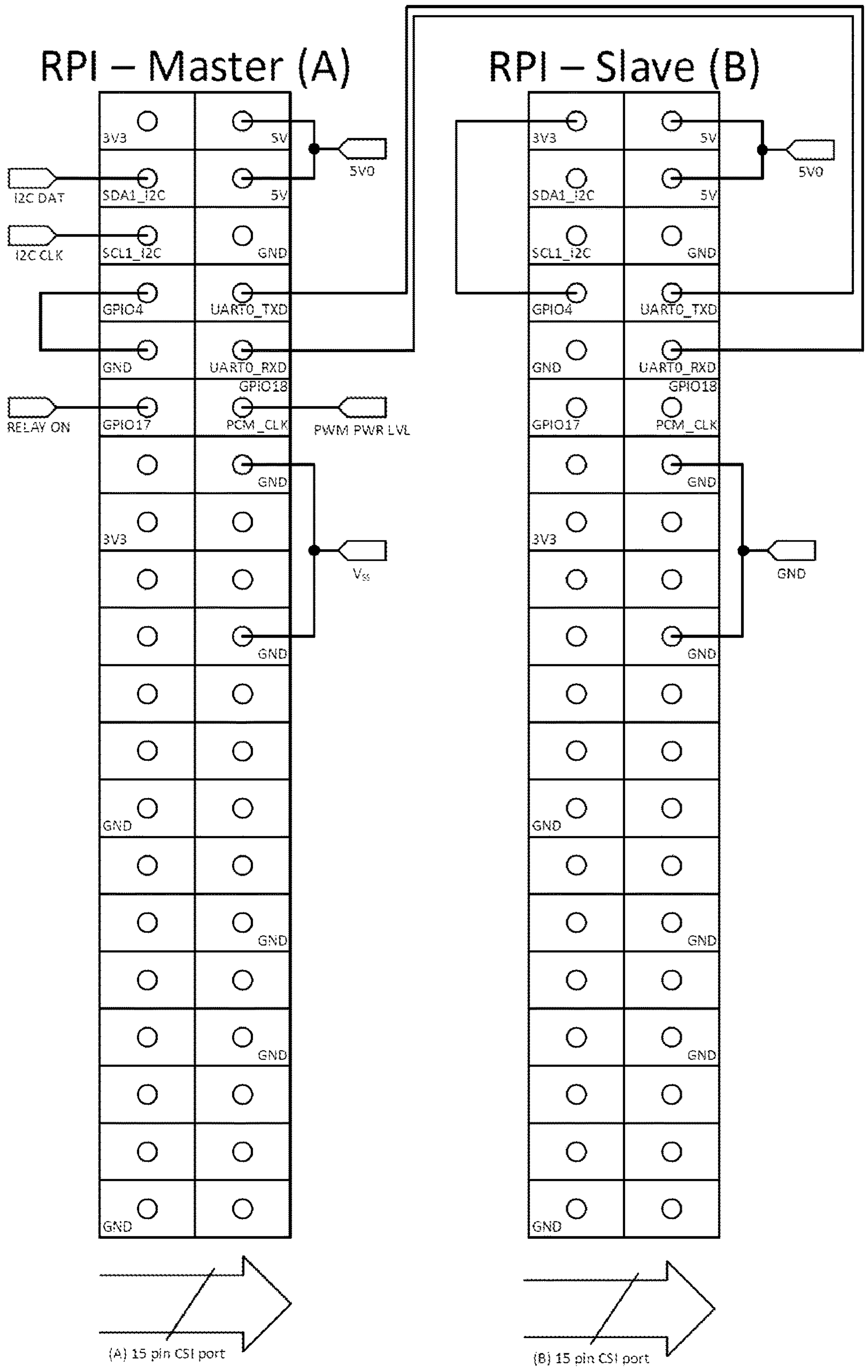
Figure 26:
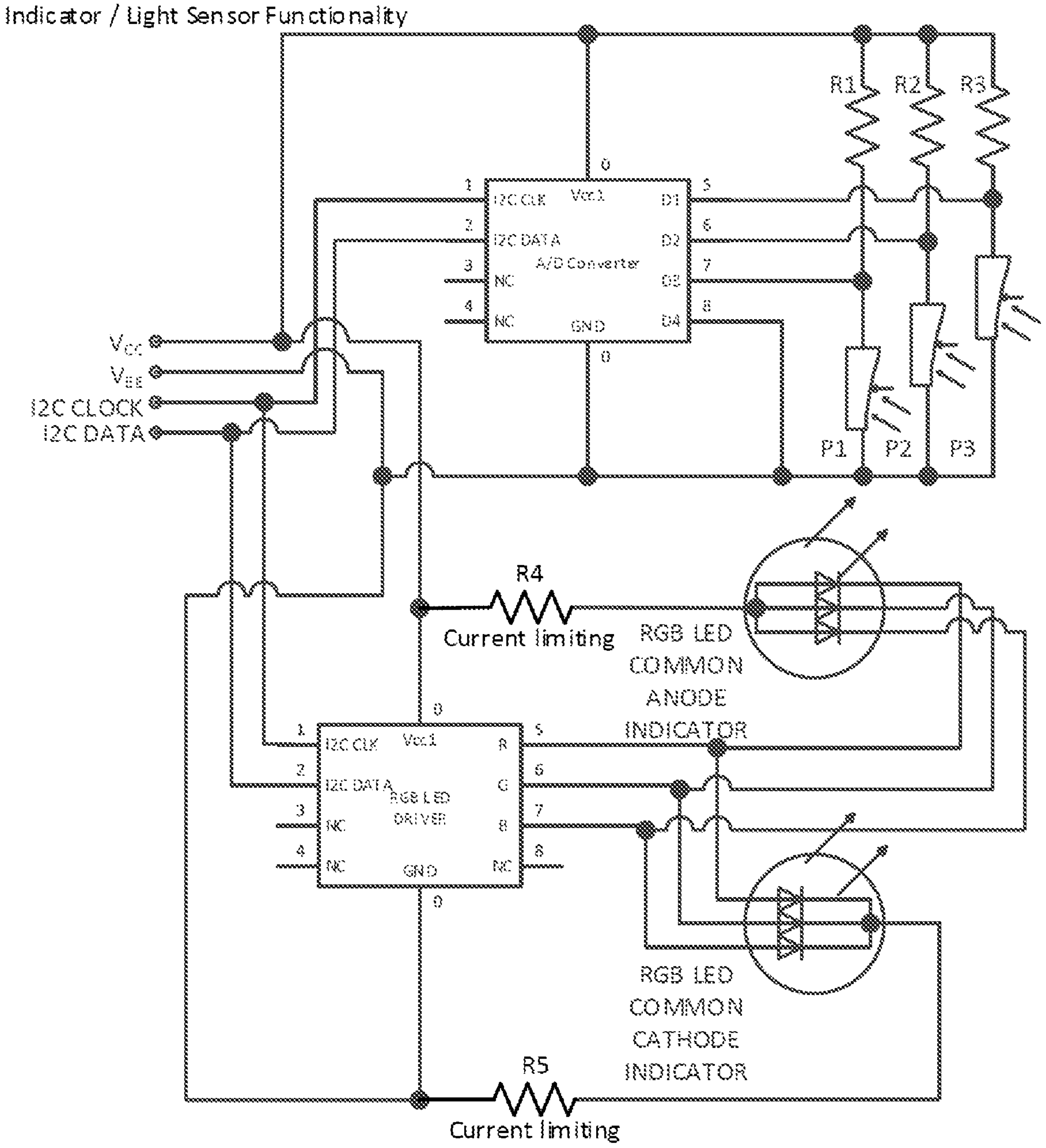
Figure 27A:
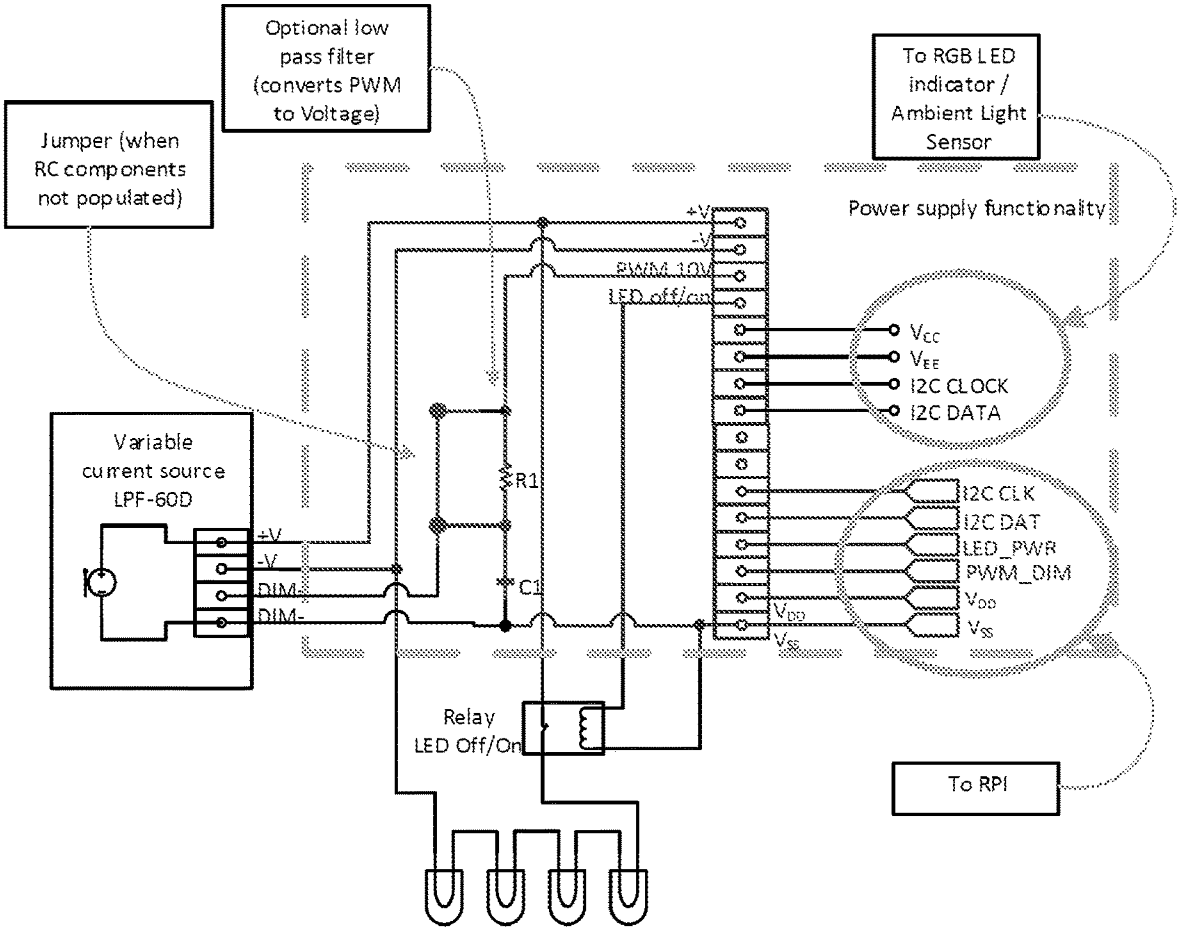

FIGS. 25-27 show electrical diagrams for a sensor unit 120 according to exemplary embodiments of the present disclosure, including various components as shown therein.

The processor 30 may be structured/configured to control and command the data hub 100. In certain embodiments, the processor 30 may be a portion of a processing subsystem including one or more computing devices having memory, processing, and communication hardware associated with the network 62, data hub mesh network 102 and/or server 64. The processor 30, server 64, and/or gateway 64A may be a single device or a distributed device, and the functions of the processor 30, server 64, and/or gateway 64A may be performed by hardware or software. The processor 30, server 64, and/or gateway 64A may comprise digital circuitry, analog circuitry, or a hybrid combination of both of these types. The processor 30, server 64, and/or gateway 64A may include/comprise one or more Arithmetic Logic Units (ALUs), Central Processing Units (CPUs), memories, limiters, conditioners, filters, format converters, or the like which are not shown to preserve clarity.

Further, the processor 30, server 64, and/or gateway 64A may be programmable, an integrated state machine, or a hybrid combination thereof. In at least one embodiment, the processor 30, server 64, and/or gateway 64A is programmable and executes algorithms and processes data in accordance with operating logic that is defined by programming instructions such as software or firmware, whereby said software or firmware can be stored within storage medium 65 as referenced herein. Alternatively or additionally, operating logic for the processor 30, server 64, and/or gateway 64A may be at least partially defined by hardwired logic or other hardware. It should be appreciated that the processor 30, server 64, and/or gateway 64A may be exclusively dedicated to controlling the activation of the light source 14 and/or annunciator 16 or may further be used in the regulation, control, and/or activation of one or more other subsystems or aspects of the data hub 100.

The processor 30, server 64, and/or gateway 64A may include/comprise system self-monitoring and diagnosis and may employ learned intelligence with computer vision, including methods for acquiring, processing, analyzing, and understanding images from the sensor 18 and high-dimensional data from the environment in the vicinity of the data hub 100 to produce numerical or symbolic information, for example, in the forms of decisions. Learned intelligence allows image processing and select data transfer at the level of the data hub 100 instead of sending raw data to local/non-local processor for interpretation and action. Learned intelligence and subsequent immediate action eliminates unnecessary data transfer, which reduces congestion and the bandwidth required for subsequent communication. Learned intelligence allows the data hub 100 to response to existing conditions instead of relying on a set of established rules or developed algorithm pushed to the data hub 100 from an external processor or server. In such an embodiment, the data hub 100 transfers (i.e., pushes, pulls and syncs) only needed information in a form as specifically requested by the PCS 60 instead of handling large quantities of unwanted data in a "data dump." In certain embodiments, the data hub 100 and processor 30, server 64, and/or gateway 64A transfer data via a capable open protocol, which may appeal to a broader range of potential markets and PCS developers.

In certain embodiments, the processor 30, server 64, and/or gateway 64A includes/comprises one or more modules structured/configured to functionally execute the operations of the processor 30. In at least one embodiment, the communication module 34 may be included in or integral with the processor 30. The description herein including modules emphasizes the structural independence of the aspects of the processor 30, and illustrates one grouping of operations and responsibilities of the processor 30. Other groupings that execute similar overall operations are understood within the scope of the present disclosure. Modules may be implemented in hardware and/or software on a non-transient/transitory computer readable storage medium, and modules may be distributed across various hardware or software components.

In at least one embodiment, the light source 14 is at least one LED. In at least one embodiment of the present disclosure, the light source 14 is a high-output white light LED, such as the XP-G and XP-L LED manufactured by Cree, Inc.® However, many possible LED light sources are operable in the system, including, but not limited to LED products produced by Cree®, Phillips, Osram-Sylvania, Nichia, etc. The at least one LED may be in thermal contact with a heat sink, to which the LED is fixed by any suitable means of attachment, such as at least one machine screw, a thermally conductive adhesive, or similar means.

In other embodiments, the light source is an induction fluorescent light source including an electrodeless tube filled with a mixture of inert gas and mercury vapor. Such fluorescent lighting technology is well-known in the art, and examples include ICETRON® products from Osram-Sylvania. In such an embodiment, the light source 14 includes/comprises at least one induction coil surrounding a portion of the electrodeless tube. One or more mounting bands surround the at least one induction coil and attach the light source 14 to a mounting surface, which in turn may be attached to the housing 10. The mounting surface may include/comprise a reflective surface at least on the side adjacent the light source 14 capable of reflecting incident light from the light source 10.

Figure 28:
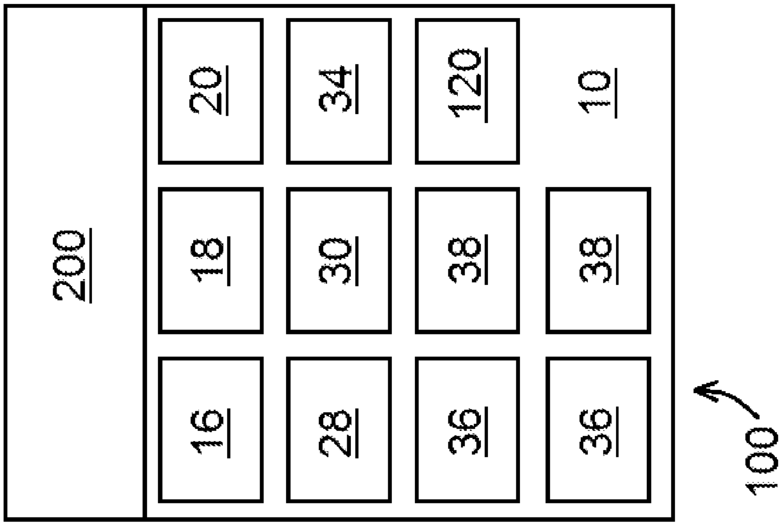
FIG. 28 shows a data hub having exemplary componentry coupled to a light fixture according to exemplary embodiments of the present disclosure.

In at least one embodiment, the data hub 100 may include, comprise, or have coupled thereto a discharge unit 70, whereby discharge unit 70 is structured/configured to discharge a desired scent or fragrance from a source of scent/fragrance 72, such as shown in FIG. 28. The fragrance may be any suitable means, for example as an atomized. If a person is detected as getting out of the car, as they pass the fixture, discharge unit 70 could discharge a fragrance, like "Summer Breeze", or "Spring Rain", a refreshing odor, or it could do a smoky barbeque smell that is announced as an ad to Ruth's Chris, for example, and a lunch special. The data hub 100, knowing whether the current time is near lunch or dinner time, may discharge a fragrance that evokes food and stimulates hunger. In an embodiment, a parking facility or a parking facility operator may have a specific fragrance (from a source of scent/fragrance 72) that is discharged as desired.

Due to exhaust fumes, emissions, urine, moisture and other odor causing conditions in a parking garage, an unpleasant physical environment can be created. The ability to introduce a neutralizing or scented product into this environment will benefit the user/customer's experience. Since the sensor and/or housing of the applicable data hub 100 has reliable permanent power, available space within its physical structure, and sufficient unit quantities in advantageous garage locations, the integration of a scent dispenser into the sensor/housing provides optimal coverage, performance, economics, and user experience.

The present disclosure, as generally referenced herein, includes disclosure relating to various devices and systems that can be readily integrated into an existing light fixture 200. Traditional parking guidance systems known in the art are all stand-alone systems, requiring their own fixture mechanisms (to a parking garage ceiling, for example), dedicated power lines/sources, and the like. Contrary to those existing systems, data hubs 100 of the present disclosure, in various embodiments, can be configured as integrated systems, such as comprising a combination of a fixture 13 with a light source 14 and the elements of an exemplary data hub 100 (such as sensors 18, annunciators 16, processors 30, and the like), or as a system that can be either stand alone, or a quick addition to an existing light fixture 200, such as described in further detail below, so to simplify installation of the same. Said systems (data hubs 100) are vision-based, using various sensors 18 referenced herein, and capitalize on learned intelligence (as referenced above) and various data hub mesh networks 102, also as referenced herein, for efficient operation and so to drive revenues of parking structure/location owners/operators.

In various embodiments of data hubs 100 of the present disclosure, data hubs 100 are configured to attach to an existing light fixture 200, such as shown in block format in FIG. 28. As shown in FIG. 28, light fixture 200 is positioned relatively above data hub 100, whereby data hub 100 includes (and/or has coupled thereto) various elements referenced herein including, but not limited to, one or more annunciators 16, one or more sensors 18, one or more power controllers 20, one or more DAQ modules 28, one or more processors 30, one or more communication modules 34, one or more transceivers 36, one or more receivers 38, and/or one or more sensor units 120, and the like, as referenced herein. Said elements can be within, or coupled to, a housing 10.

Figure 29:
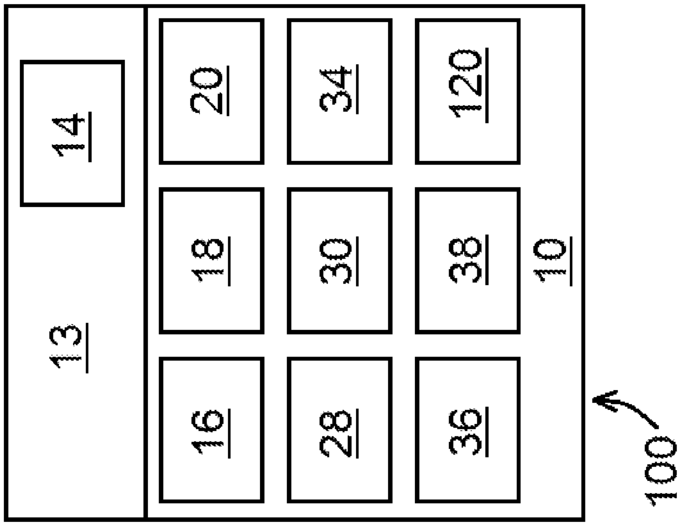
FIG. 29 shows a data hub having exemplary componentry coupled to a fixture according to exemplary embodiments of the present disclosure.

FIG. 29 shows an exemplary data hub 100 of the present disclosure, whereby various elements/components are present within and/or coupled to a housing 10, and whereby housing 10 is configured to attach to a fixture 13 (similar to an existing light fixture 200 of a parking garage, for example). Fixture 13, in such an embodiment, can contain one or more light sources 14, and be configured to receive housing 10.

FIG. 29A shows an exemplary data hub 100 of the present disclosure, whereby various elements/components are present within and/or coupled to a housing 10, and whereby housing 10 is configured to stand alone from fixture 13 (similar to an existing light fixture 200 of a parking garage, for example), or any other device.

It is noted that in various embodiments of data hubs 100 of the present disclosure, various components, including but not limited to zero, one or more light sources 14, one or more annunciators 16, one or more sensors 18, one or more power controllers 20, one or more DAQ modules 28, one or more processors 30, one or more communication modules 34, one or more transceivers 36, one or more receivers 38, and/or one or more sensor units 120, and/or one or more server 64, and/or one or more gateway 64A and the like, can be positioned within housing 10 and/or fixture 13, in various configurations, as may be desired.

Furthermore, various data hub 100 embodiments of the present disclosure can include one, two, three, or more sensors 18, which can be operated using one, two, three, or more processors 30, server 64, and/or gateway 64A. In various embodiments, sensors 18 can comprise cameras with resolutions of 1920×1080 (having an aspect ratio of 16:9), 2592×1944 (having an aspect ratio of 4:3), 1296×972 (also having an aspect ratio of 4:3), 1296×972 (also having an aspect ratio of 4:3), 1296×730 (also having an aspect ratio of 16:9), 640×480 (also having an aspect ratio of 4:3), or other resolutions and corresponding aspect ratios, operating at ⅙ frame per second up to 90 frames per second, or faster or slower as may be desired, and configured to obtain and/or generate video data/signals 40 and/or audio data/signals 40, as may be desired.

Figure 30:
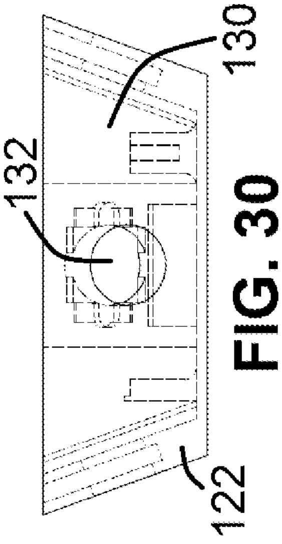
FIG. 30 shows a side view of a housing according to exemplary embodiments of the present disclosure.
Figure 31:
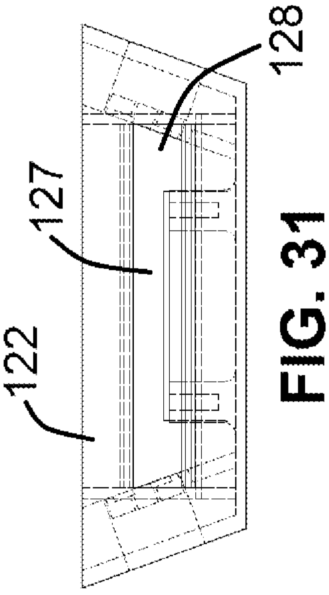
FIG. 31 shows another side view of a housing according to exemplary embodiments of the present disclosure.

FIGS. 30-34 show various additional embodiments of a sensor unit housing 122 for a data hub 100 of the present disclosure. FIG. 30 shows a side view of a sensor unit housing 122 having a sensor aperture 132 defined therein, whereby sensor face 130 (also shown in FIG. 33) having sensor aperture 132 defined therein is configured to have a tapered angle (less than 90° relative to a top of sensor unit housing 122) so that sensor aperture 132, and therefore a sensor 130 positioned within sensor unit housing 122 at sensor aperture 132, angles downward. FIG. 31 shows another side view of a sensor unit housing 122 having an annunciator aperture 127 defined therein, whereby annunciator face 128 (also shown in FIG. 33) having annunciator aperture 127 defined therein is also configured to have a tapered angle (less than 90° relative to a top of sensor unit housing 122) so that annunciator aperture 127, and therefore an annunciator 16 positioned within sensor unit housing 122 at annunciator aperture 127, angles downward.

Figure 32:
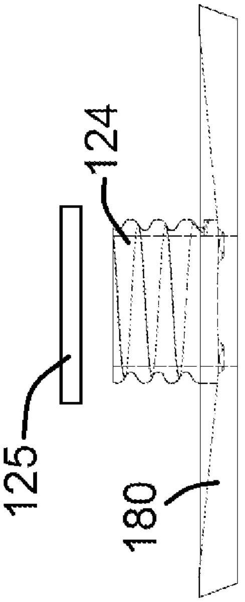
FIG. 32 shows a side view of a housing lid according to exemplary embodiments of the present disclosure.
Figure 33A:
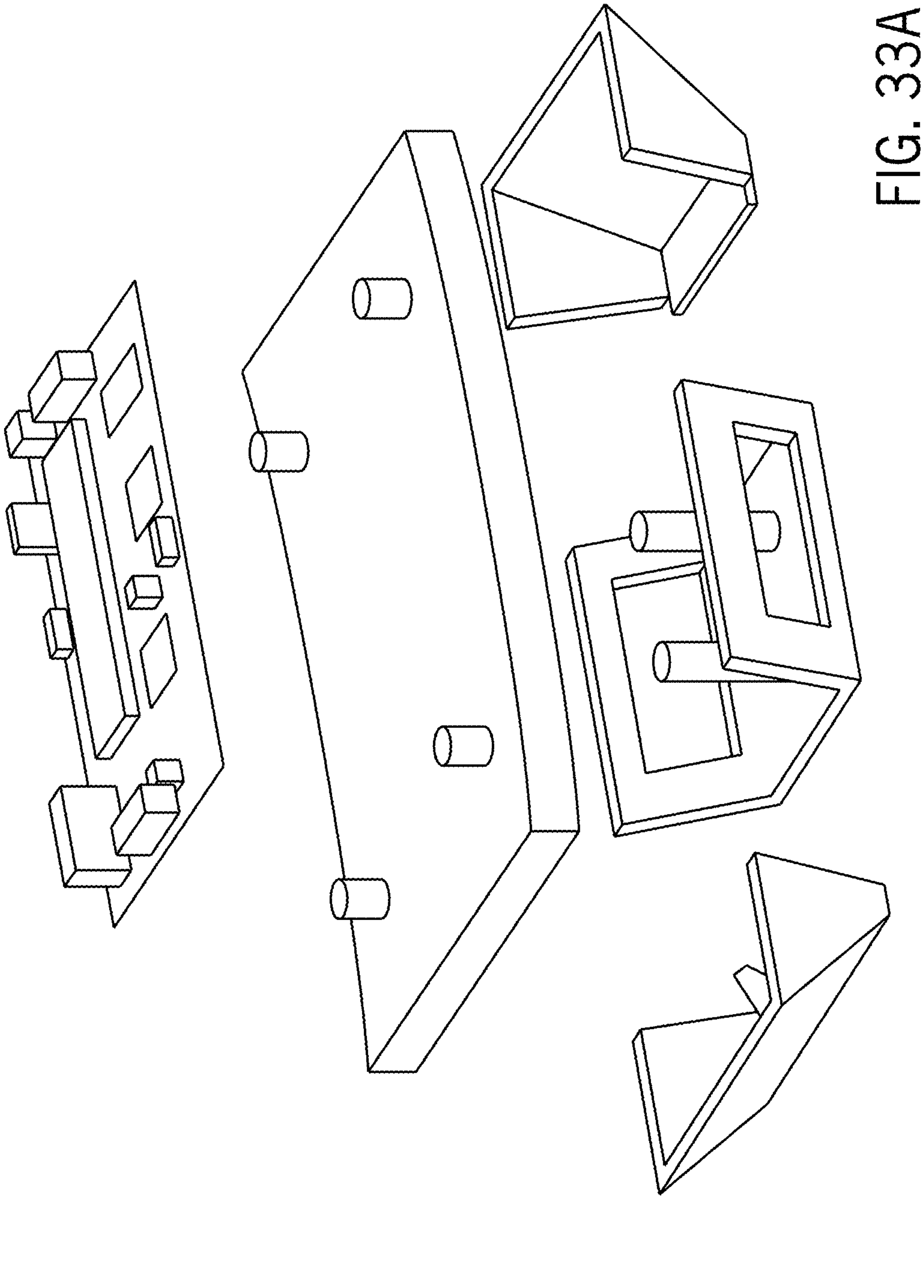
FIG. 33A shows an exploded view of portions of a housing to exemplary embodiments of the present disclosure.

FIG. 32 shows an exemplary housing lid 180 having a boss 124 (as previously shown and described with other embodiments), whereby housing lid 180 is configured to couple to a relative top of housing 122, and whereby boss 124 is configured to couple (such as rotatably due to threads of an exemplary boss 124) to a light fixture 200, for example, and to allow wires (such as power line(s) 22 and/or communication line(s) 32) to pass from light fixture 200 (or another element) through passage 126 of boss 124 into housing 122. A nut 125, such as shown in FIG. 32, can be positioned within the device that lid 180 is intended to be coupled to, such as within housing 10, fixture 13, or light fixture 200, and threaded onto boss 124 of lid 180 so to secure device lid 180, and therefore housing 122, to said device.

Figure 33:
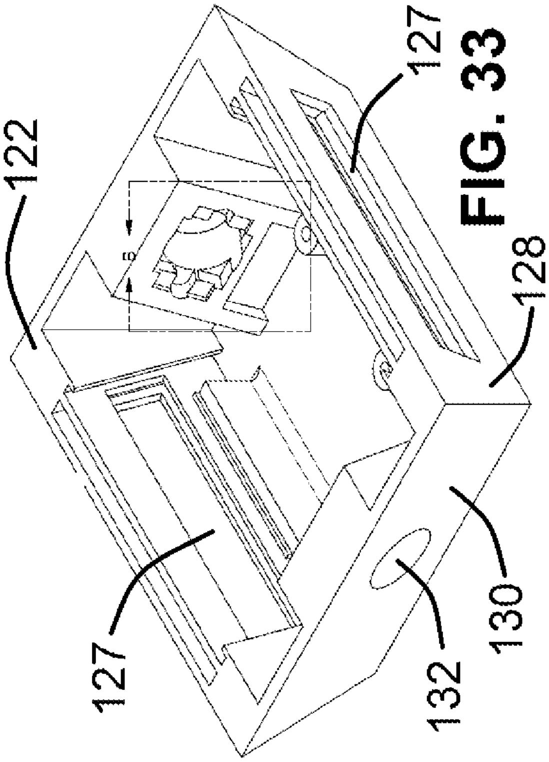
FIG. 33 shows a perspective view of at least part of a housing according to exemplary embodiments of the present disclosure.
Figure 34:
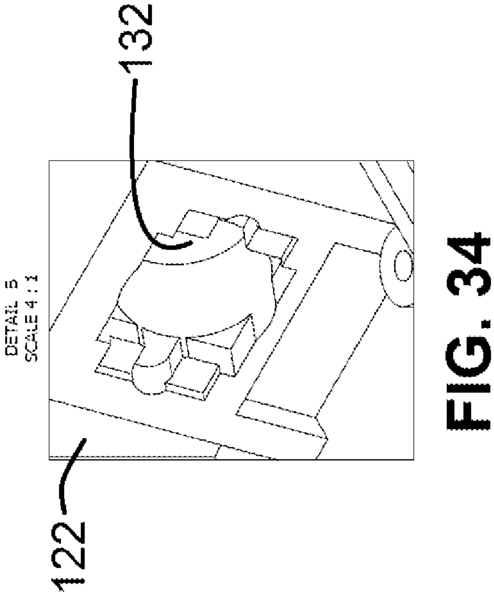
FIG. 34 shows a detailed view of a portion of the perspective view of the housing shown in FIG. 33, according to exemplary embodiments of the present disclosure.

FIG. 33 shows a perspective view of an exemplary sensor unit housing 122 of the present disclosure, showing sensor apertures 132 on opposite sides of sensor unit housing 122 and annunciator apertures 127 on the other opposite sides of sensor unit housing 122. In at least one embodiment of a sensor unit housing 122 of the present disclosure, and starting with one side, there is a first sensor aperture 132 on a first side (a first sensor face 130), then a first annunciator aperture 127 on a second side adjacent to the first side (a first annunciator face 128), then a second sensor aperture 132 on a third side (a second sensor face 130) adjacent to the second side, then a second annunciator aperture 127 on a fourth side adjacent to the third side (a second annunciator face 128), for example. FIG. 34 shows an expanded detail view of portion B of FIG. 33, so that sensor aperture 132 can be readily viewed.

Various elements referenced herein including, but not limited to, one or more annunciators 16, one or more sensors 18, one or more power controllers 20, one or more DAQ modules 28, one or more processors 30, one or more communication modules 34, one or more transceivers 36, one or more receivers 38, and/or one or more sensor units 120, and the like, as referenced herein, may be partially or fully enclosed within, or coupled to, exemplary sensor housings 122 of the present disclosure. Sensor housings 122 of the present disclosure, in various embodiments, are configured to be devices that add on to existing light fixtures 200 or other elements, such as housings 10 and/or fixtures 13, as may be desired, or as a stand-alone device independent of light fixture 200, fixture 13, or housing 10.

In addition to the foregoing, various data hubs 100 of the present disclosure can comprise a plug or port 55, such as shown in FIG. 1, configured to charge an electronic device or object, such as, for example, an electric vehicle. Plug or port 55 can be defined within or extend from various portions of data hubs 100 of the present disclosure, such as, for example, housing 10, cover 12, fixture 13, sensor unit housing 122, and the like. Power from power line 22 can be directly provided to plug or port 55, or indirectly provided to plug or port 55 by way of power controller 20 configured to provide and/or regulate power from power line 22 to plug or port 55.

Certain parking guidance systems used to identify and locate parked vehicles utilize License Plate Recognition (LPR) technology. This approach captures an image of the license plate/tag once the vehicle 144 is parked, and a space 142 location is then assigned. This space 142 location information can be used for vehicle 144 location/finding and tracking, billing, violation processing, Amber/Silver or other license plate/tag generated notifications, etc. LPR relies upon the license plate/tag to be easily seen, read, and processed by an LPR camera (an exemplary sensor 18). An obscured plate/tag, the vehicle 144 parked in manner where plate/tag cannot be seen (i.e. backed into parking space 142 and no front plate/tag), or other situations where the plate/tag is not recognizable causes this method to fail.

Exemplary systems 60 of the present disclosure can utilize Vehicle Tracking (VT), which is significantly different than traditional systems that only utilize LPR, which provide subsequent benefits with higher accuracy and reliability. Exemplary systems 60 of the present disclosure can be configured to make use of existing systems, such as those disclosed herein, along with a new gateway (such as provided by cloud connectors 104, as referenced herein), image capture (such as by sensors 18), and possibly LPR cameras (sensors 18) made specifically for parking garage applications, and/or a V2X designator. Such a process can comprise one or more of the following:

High-Definition Image Capture camera(s) (sensors 18) at the point ingress to the parking lot or structure 260 (the entrance), possibly in conjunction and interconnected with traditional LPR cameras (sensors 18), to capture multiple images of the newly entering subject vehicle 144. Such images could include front, back, side(s), top, bottom, license plate, etc.

Upon capturing the images and any other data of the entering vehicle 144, an event trigger could be sent to the VT gateway for processing. Each event could be placed into the VT location queue.

Each time a vacant parking space 142 has been determined as occupied, the FV system can capture a high-quality image of the newly occupying vehicle 144 and send the captured image to the VT Gateway for processing.

The VT gateway software can compare the images in the entry queue to the images from the recently parked vehicle 144 list to determine which vehicles 144 are parked in which locations throughout the facility (parking lot or structure 260).

Once the match(es) is/are completed, a parked vehicle 144 is assigned to that specific parking space 142, and any other applicable data, i.e. license plate/tag number, space 142 number, start/stop time of occupancy, notations or alerts associated with that plate/tag, etc., can be uploaded to that vehicle file in the system 60 Gateway and assigned to that vehicle's designator, i.e. parking ticket, electronic file, etc.

The vehicle 144 parking space 142 locations can be stored per license plate and space 142 number for potential integration with third-party user interface application requests, as may be desired.

Systems 60 of the present disclosure can also be capable of sharing the high-quality images captured by system 60, license plate/tag information, and/or parking space 142 information with the permitted third-party systems, as may be desired.

When the vehicle 144 operator choses to depart, they can enter their license plate/tag number, ticket number, RFID, RSA, V2X designation or other distinguishing vehicle 144 identifier into the vehicle 144 locator system (kiosk, touch-screen, smartphone app, etc.) and its parking space 142 location can be provided to the operator by system 60.

As the vehicle 144 vacates the parking space 142, this information can be processed by the system 60 gateway, and can also be provided to other system 60 for additional actions.

Upon departure of the vehicle 144 from the facility (parking lot or structure 260), the vehicle's 144 license plate/tag and/or other distinguishing factors can be recognized by LPR, V2X or other technology, and be processed for billing and other purposes.

The exemplary processes described above can therefore overcome the accuracy shortcomings of other vehicle locator systems, and ensure specific identification and location of each vehicle 144 utilizing the facility (parking lot or structure 260).

Traditional parking guidance systems, as well as some exemplary systems 60 of the present disclosure referenced herein, utilize a multitude of colors (such as colored LEDs (lighting devices 17 of exemplary annunciators 16 of the present disclosure) or other types of colored lights) to designate parking space 142 availability and utilization. Individuals who are color blind are often not able to distinguish between certain colors, and in view of the same, the present disclosure includes disclose of a novel approach to "flash" the indicator (lighting devices 17 of one or more annunciators 16) of one or more systems 60 of the present disclosure to draw attention to open parking spaces 142. Another approach of the present disclosure is to progressively increase the intensity of the indicator color to maximum, having it cycle back down to a minimum level and repeat, as another means to draw attention to vacant spaces. These indicator operations would ultimately benefit all users due to their attention-grabbing capabilities, but best served would be those with certain visual challenges.

Figure 38:
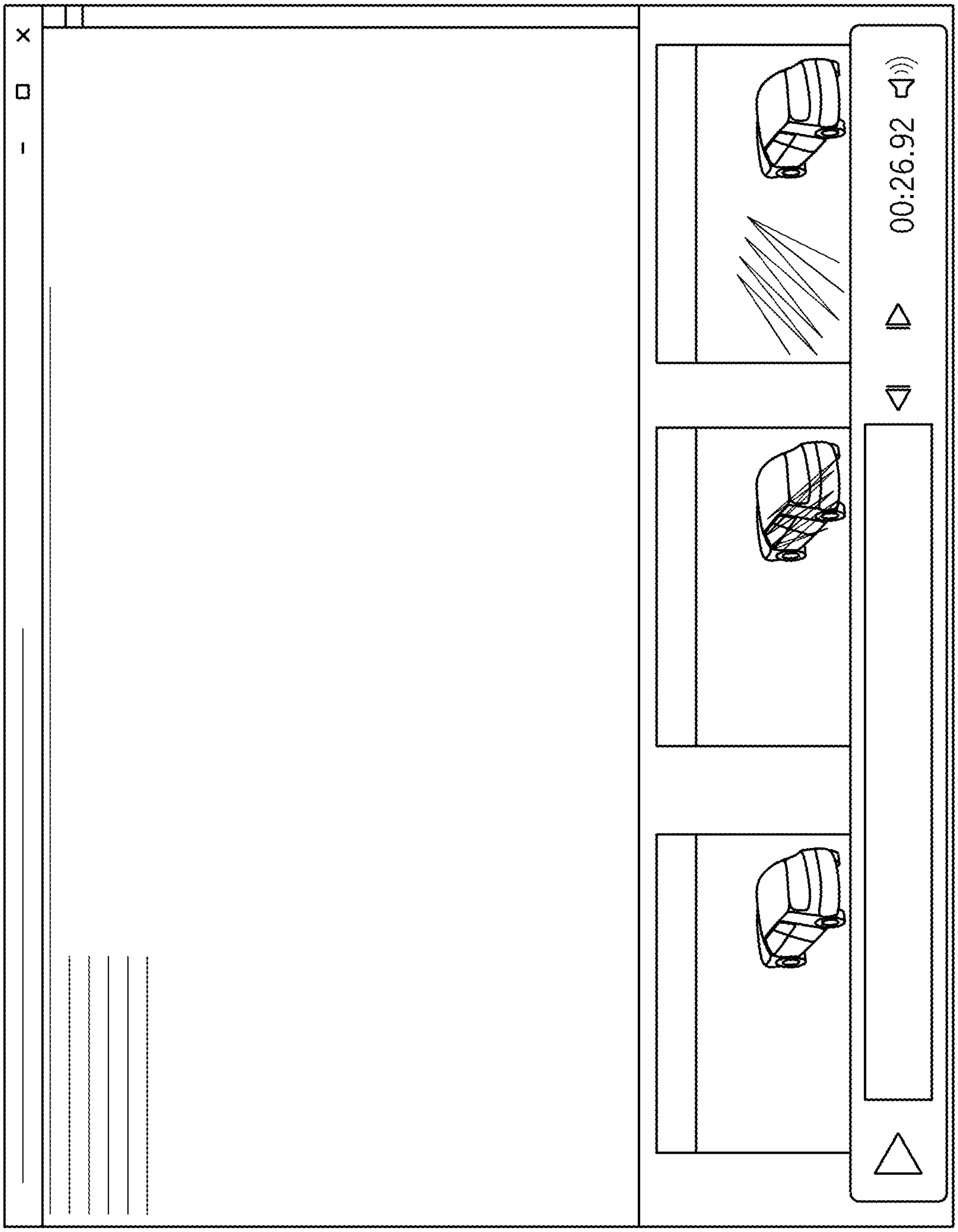
FIG. 38 shows images obtained using a sensor according to exemplary embodiments of the present disclosure.

Traditional parking lots, zones or structures 260 have a defined number of parking spaces 142. Traditional parking guidance systems actively monitor most or all facility parking spaces 142, however top deck and surface lot monitoring can be difficult due to a lack of structure on which to attach portions the guidance system (system 60). Another method for determining top deck (upper level), surface lot and zonal occupancy of the present disclosure involves data hub 100 and sensors 18 to capture images that, via deductive counting, can be used to determine their occupancy status. Using the cumulative number of parking spaces 142 in the entire parking lot, zone or structure 260, the number of vehicles 144 in the parking lot, zone, or structure 260, and the number of vacant parking spaces 142 reported by an exemplary system 60 of the present disclosure, we can calculate the number of vacant parking spaces 142 on the top deck, zone, or surface lot (of parking lot or structure 260). FIG. 38 shows that a data hub 100 and sensor 18 can be used to determine the direction of vehicle and pedestrian travel, their zonal transition, points of entry & exit, number counts of respective movements in each direction within and/or between zones, etc. This information communicated to the gateway 64A via network 102 can be further processed, analyzed and/or distributed to populate signage, website/webpage, APPs, third parties, and others for approved use. In that an exemplary sensor is vision-based, it can also be tasked with object counting in addition to object detection. As an example, the top deck of a parking garage or open surface lot does not easily lend itself to vision based parking guidance due to environmental and atmospheric conditions. The data hub sensor can however determine the direction of travel and count objects in/out of a designated area, thus obtain total occupancy of dedicated open parking areas.

In another embodiment parking lots or structures 260 are typically designated by the number of parking levels and/or zones. Exemplary systems 60 of the present disclosure, including the ability to designate different parking spaces 142 and/or zones for different uses changes how one can designate a parking area. Instead of stating Visitor Parking is on Level 1 & 2, Faculty Level 3, and Student Levels 4 & 5, for example, exemplary systems 60 of the present disclosure can mix/change parking zones and parking space 142 quantity based upon daily (or other temporal) utilization. This makes assigning of a specific level to a specific task unnecessary and allows a multitude of task parking to be allocated to multiple levels based upon need, which is referred to herein as "parking by attributes."

Given the various attributes, such as Visitor/Faculty/Student for example, and designating their parking zones by distinct and different colors in our illuminated FALCON on-board indicator (exemplary colored lights (lighting devices 17) of one or more annunciators 16 of systems 60), one can assign and change attributes, combining different types and quantities of parking spaces 142 on different levels with ease.

Parking by attribute also allows the facility operator to charge different parking fees for different spaces 142 and/or zones. The ability to change the number and location of spaces 142 within a defined or newly created attribute zone allows the greatest flexibility in revenue and operational management of a parking facility.

Figure 39:
FIG. 39 shows signage showing parking spaces available in connection with a parking lot or structure according to an exemplary embodiment of the present disclosure.

When using such a system 60, occupancy signage may no longer need to display parking available on a floor level basis, instead displaying the same by attribute. Therefore, a visitor driving into the parking lot or structure 260 may look for a particular color (i.e., purple (or other color) indicator of annunciator 16 or other portion of system 60, such as light source 14—possibly flashing or cycling through a changing intensity color gradient) in an annunciator 16 or light source 14 to find a parking space 142 allocated to "visitors," for example. Such a parking space 142 would be denoted by the proper colored indicator (of annunciators 16) which can be displayed on multiple levels of the parking lot or structure 260 dependent upon defined parking variables. The same can be true for those seeking parking spaces 142 who are of the other attributes—just look for the applicable color. Since such an exemplary system 60 can involve parking space 142 designation and as the related indicators (of annunciators 16, for example) are configurable, as their attributes are redefined they feed this real-time occupancy information to the digital display signage and update each attribute category, such as shown in FIG. 39.

Figure 40:
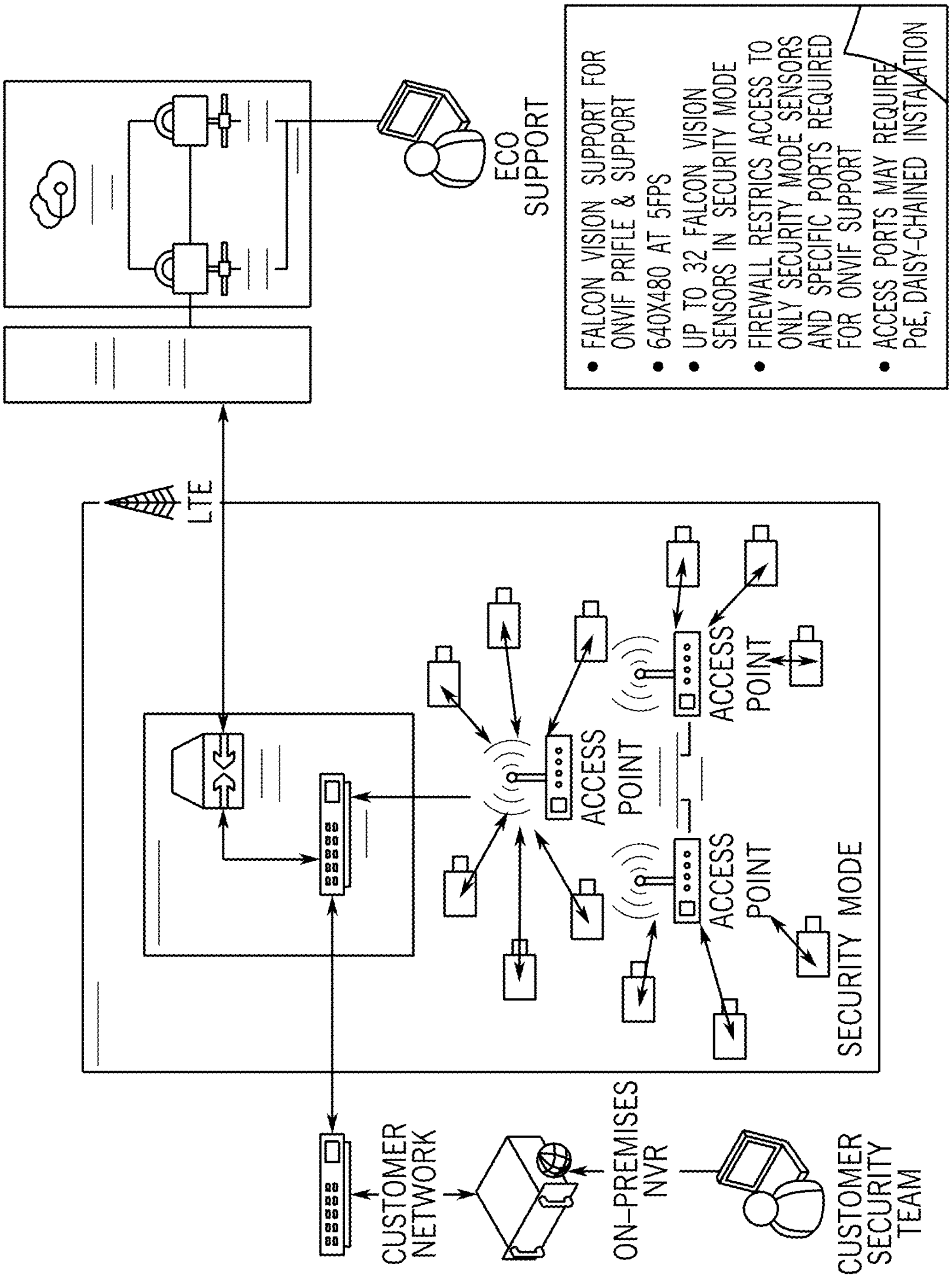
FIG. 40 shows a data hub network according to exemplary embodiments of the present disclosure.

Data hub 100 has the ability to stream live video from sensor 18 to the gateway 64A for viewing, analysis, storage, etc. In at least one embodiment, one, or a plurality of, selected data hubs 100 and sensors 18 can send their live streaming images to the gateway 64A, either via wired or wireless mesh Wi-Fi network, for example. Images and data received by the gateway 64A can be retained onboard, stored in a supplemental device, such as a Network Video Recorder (NVR) for example, transferred to the cloud for further use and storage, transferred via firewall 121 to a user interface for off-site viewing, use and/or storage i.e. NVR, etc. This streaming mode could be applied to one or a plurality of data hubs 100 and sensors 18, on a continuous basis or as requested, and the selection of participating units could be static or changed as the situation may warrant. While designated data hub 100 and sensor 18 are in streaming mode they will still function in their parking guidance role per this disclosure. Areas that may warrant streaming include facility drive lanes, entry and exits, stair tower in/egress, elevator lobbies, pedestrian crosswalks, pedestrian/vehicle conflict areas, exposed and top deck parapet walls/edges, street level opening, high incident zones, etc., such as referenced in FIG. 40.

Exemplary annunciators 16 of the present disclosure can have a single row of six (6) individual RGB LED diodes (lighting devices 17) to form the indicator section (such as visible from an annunciator face 128 of an annunciator 16). Based upon field experience and additional designed capabilities, an increase in the numbers of rows, and potentially the number of columns, of RGB LEDs (of lighting devices 17), such as shown in FIG. 11, could increase the visibility of the indicator (lighting devices 17 of annunciator 16) used for parking space 142 status and other annunciations, and could allow division of the indicator into designating right and left side, and/or top and bottom indications, as may be desired. Such a configuration could also improve scrolling, sequencing, flashing, directional symbolizing, and other graphic representations, as well as potentially providing supplemental light output, such as in an "emergency," mode for greater area illumination and notification potential.

In another embodiment, the annunciator 16 could consist of one or multiple RGB diodes, a chip on board (COB) light, etc., optically designed with lensing to direct the indication in a 360 degree dispersion or other specified or designed patterns.

In at least one embodiment, the annunciator face 128 of annunciator could be constructed of a dark material, such as black, dark blue, dark gray, etc., so to improve overall visibility of the RGB LEDs (lighting sources 17) from within the annunciator aperture 127 (such as shown in FIG. 33, for example), when illuminated.

In various embodiments of the present disclosure, a visual indication of the parking space 142 status can be projected onto the ground in addition to the indication on the device (annunciator 16 of data hub 100) itself. Such an embodiment would allow a driver to better see the space indication status from a distance (as the projected indication would be relatively large as compared to the indication on the annunciator 16), and allow the driver to best focus on driving in the garage (and not attempting to focus on visual indicators higher than the normal driver's line of sight).

Figure 41:
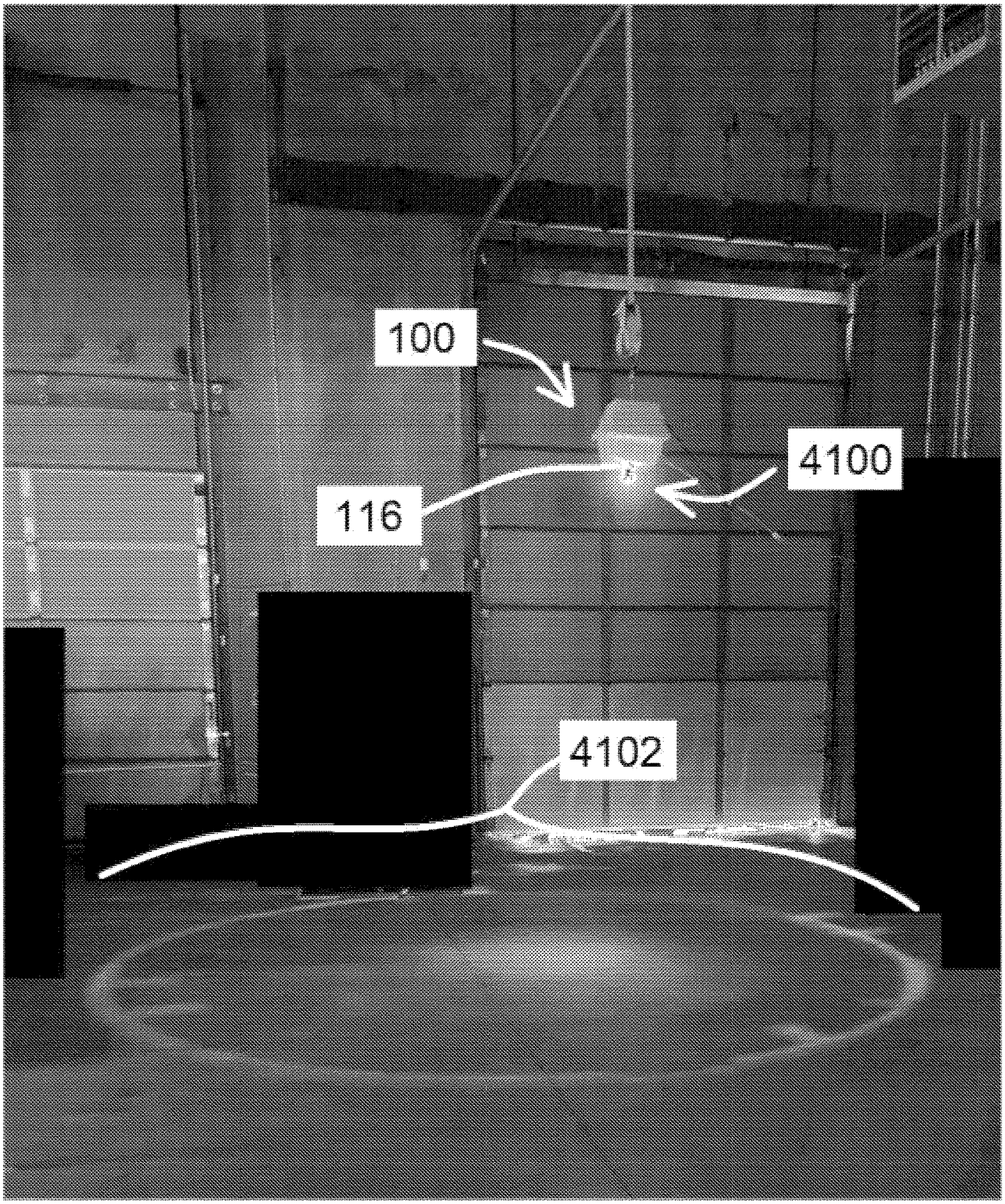
FIG. 41 includes a photograph of data hub of the present disclosure configured to project a visual indication according to an exemplary embodiment of the present disclosure.

FIG. 41 includes a photograph of data hub 100 of the present disclosure configured to project a visual indication. As is shown therein, annunciator 16 of data hub 100 produces a visual indication on the annunciator 16 itself (an upper indication 4100), and also projects a visual indication downward onto the ground (a lower indication 4102).

The ability to project an indication downward (a lower indication 4102) is of further benefit at locations where vehicles 144 and pedestrians 146 may converge, or where two vehicles 144 may converge, including, but not limited to, crosswalks in a parking garage, openings to elevators and stairs in parking garages at or near the vehicular driving lanes, common area discharge points adjacent to said driving lanes, and the like. For example, the ability of the annunciator 16 of the data hub 100 to project an indication onto the ground that can warn both a vehicle 144 and a pedestrian 146 regarding a potential convergence would be most beneficial, especially in instances where the driver may be distracted while seeking a parking space and/or in instances where a pedestrian 146 may be distracted while looking at his or her smartphone, etc., instead of being more alert and looking for traffic in the garage. Exemplary indications can include, but are not limited to, a strobing red line on the ground, at the drive lane boundary, and/or at any other location to get the attention of the driver and the pedestrian to avert a convergence.

Regarding parking spot availability, the same color emitted by annunciator 16 to indicate the status of the parking space 142 can also be projected downward to the ground, such as, for example, a green light to indicate the availability of a parking space 142.

FIGS. 42A-43C shows exemplary embodiments of data hubs 100 of the present disclosure. As shown therein, data hub 100 can include one or more sensors 18 (such as cameras) with adjustable placement and orientation, and an annunciator 16 located on the relative bottom of data hub 100 with up to 360 degree viewing and the capability, if desired, for ground indication illumination (a lower indication 4102) as referenced herein, as well as other provisions.

Figure 42A:
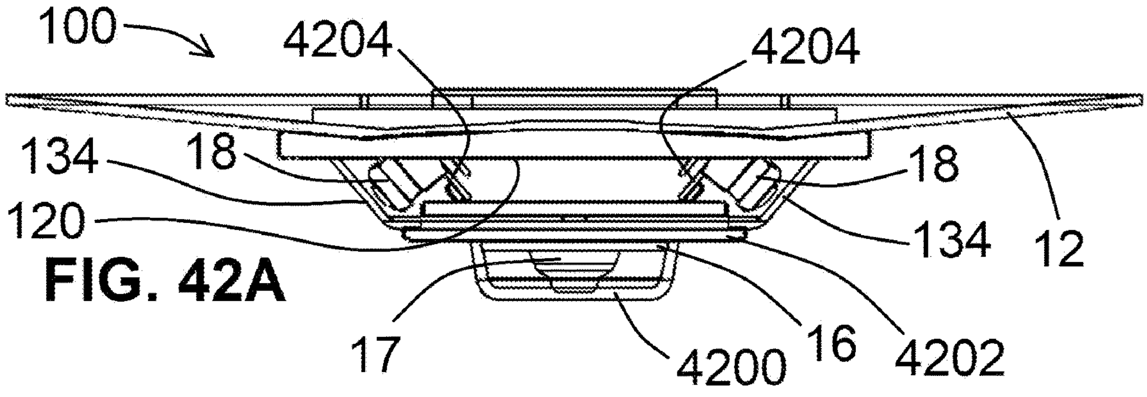
FIGS. 42A and 42B show side views of an exemplary data hub of the present disclosure, depicted as being rotated 90 degrees relative to one another, according to exemplary embodiments of the present disclosure.
Figure 42B:
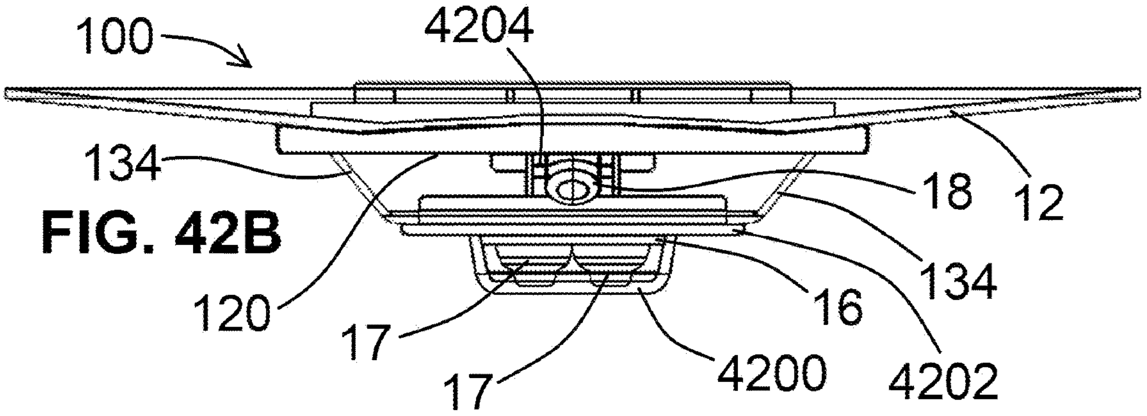
Figure 42C:
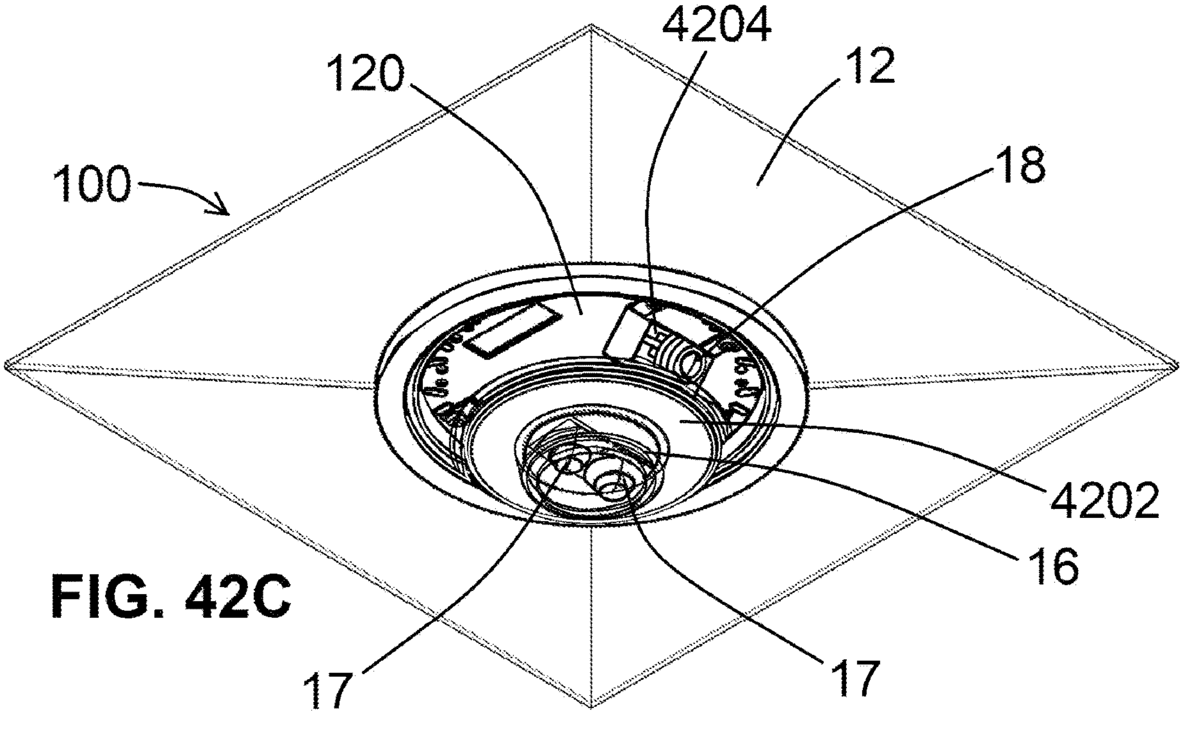
FIG. 42C shows a perspective view of the data hub shown in FIGS. 42A and 42B according to exemplary embodiments of the present disclosure.

FIGS. 42A and 42B show side views of an exemplary data hub 100 of the present disclosure, depicted as being rotated 90 degrees relative to one another, and FIG. 42C shows a perspective view of said data hub 100, each shown so that internal componentry is readily visible. As shown in FIGS. 42A, 42B, and 42C, a cover 12 (such as a four section cover 12 shown therein) is provided with exemplary data hub 100 embodiments, whereby said cover 12 can be configured to allow light (such as from a light source 14) to pass therethrough, and/or to provide general access to, or to generally cover, internal components of said data hubs 100. One or more lighting devices 17 of annunciator(s) 16 are provided at a relative lower portion of data hubs 100 shown therein, whereby said lighting devices 17 (such as an RGB indicator) are protected by one or more sensor lenses 134, with said annunicators 16 protected by way of a protective lens/cover 4200. One or more heat sinks 4202 can be positioned adjacent to lighting devices 17 so to dissipate heat from said lighting devices 17.

An exemplary sensor unit 120, such as one including one or more sensors 18 (which, as discussed herein, can be configured as cameras), is also shown therein. As shown when considering FIGS. 42A and 42B being rotated 90 degrees relative to one another, an exemplary data hub 100 of the present disclosure can comprise one, two (as shown therein), three, four, or more cameras (sensors 18), providing 180 degree or more (such as up to 360 degree) sensing capability. One or more sensor lenses 134 can be used to protect said sensors 18 and to allow sensors 18 to be able to operate as intended with sensor lens 134 present near said sensors 18. Sensors 18 can be adjusted to point in a desired direction by way of being mounted to an adjustable sensor mount 4204.

Figure 43A:
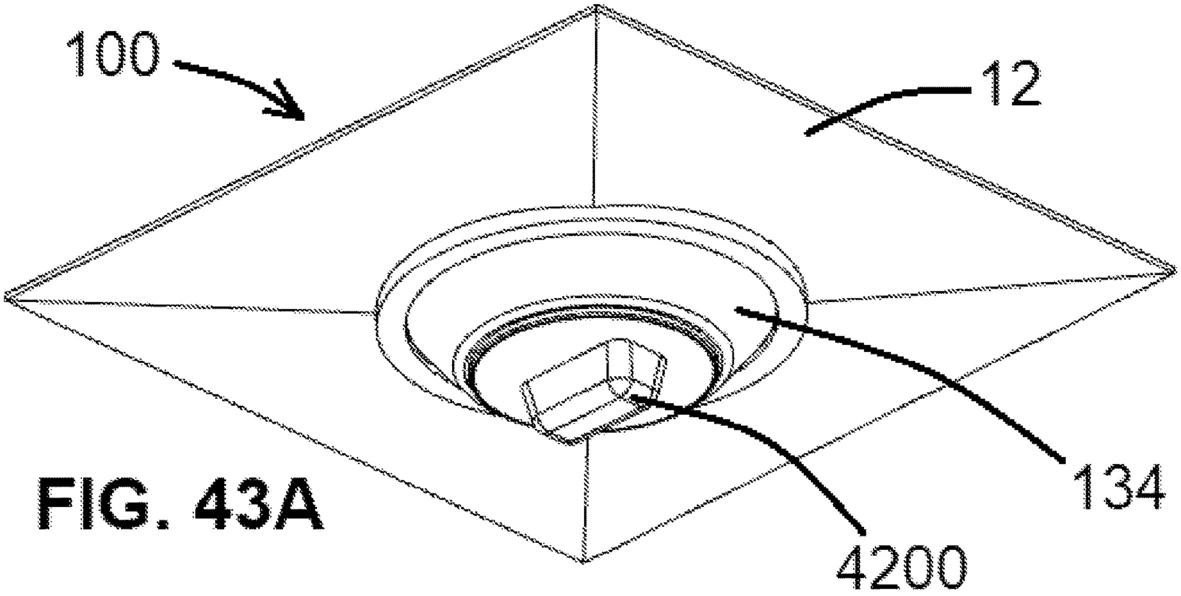
FIGS. 43A, 43B, and 43C show various views of an exemplary data hub according to exemplary embodiments of the present disclosure.
Figure 43B:
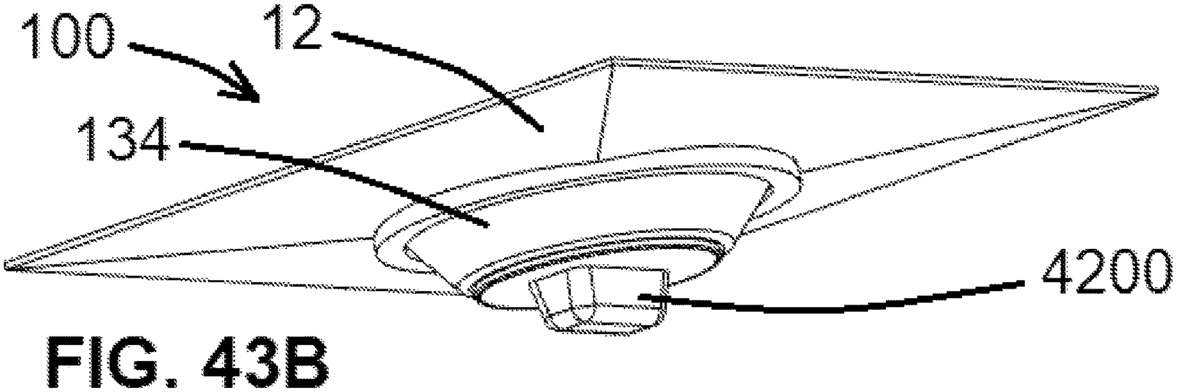
Figure 43C:
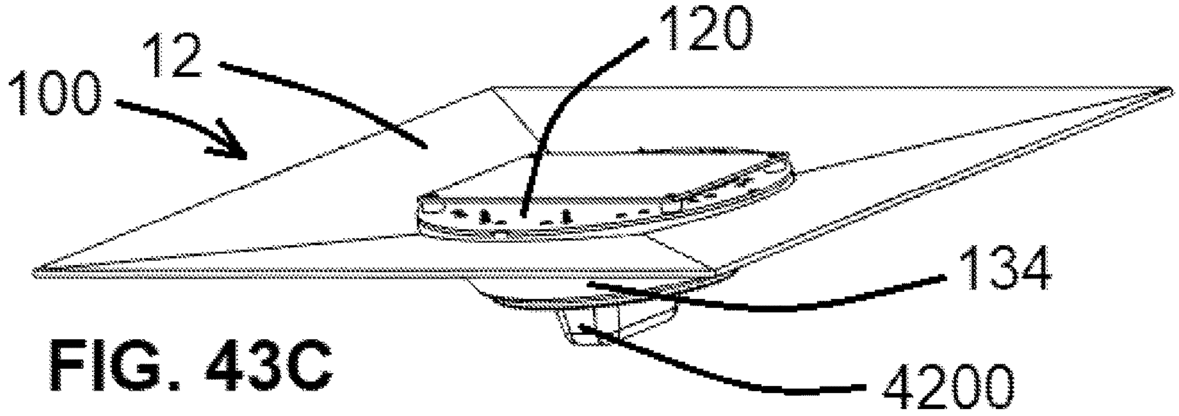

FIGS. 43A, 43B, and 43C show different views of an exemplary data hub 100 of the present disclosure, whereby the various covers and/or lenses are present so that the internal componentry is not readily visible from a relative bottom of said data hubs 100. As shown therein, cover 12, sensor lens 134, and protective lens/cover 4200 are readily visible and configured to shield componentry therein from the elements. Sensor unit 120 is shown in FIG. 43C, readily accessible from the top to facilitate mounting to a ceiling and/or another electronic component as may be desired.

Figure 44:
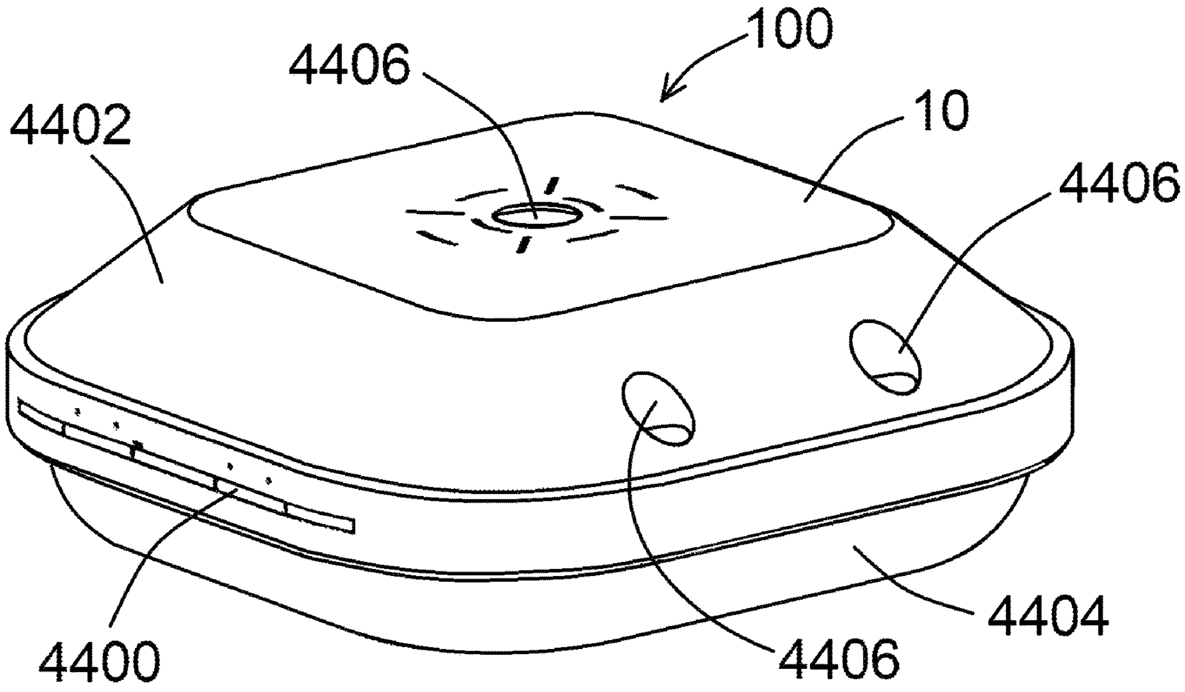
FIG. 44 shows a hinged housing of a data hub according to exemplary embodiments of the present disclosure.

FIG. 44 shows a perspective view of a hinged housing 10 of an exemplary data hub 100 of the present disclosure. As shown therein, data hub 100 has a hinged portion 4400 allowing a downward facing housing portion 4402 to open relative to a mounting housing portion 4404. Various apertures 4406 defined therein allow for a) one or more sensors 18 within housing 10 to detect the environment outside of housing 10, b) one or more light sources 14 to emit light therethrough, and/or c) one or more audio sources (such as speaker 19) to emit audio therethrough.

Figure 46:
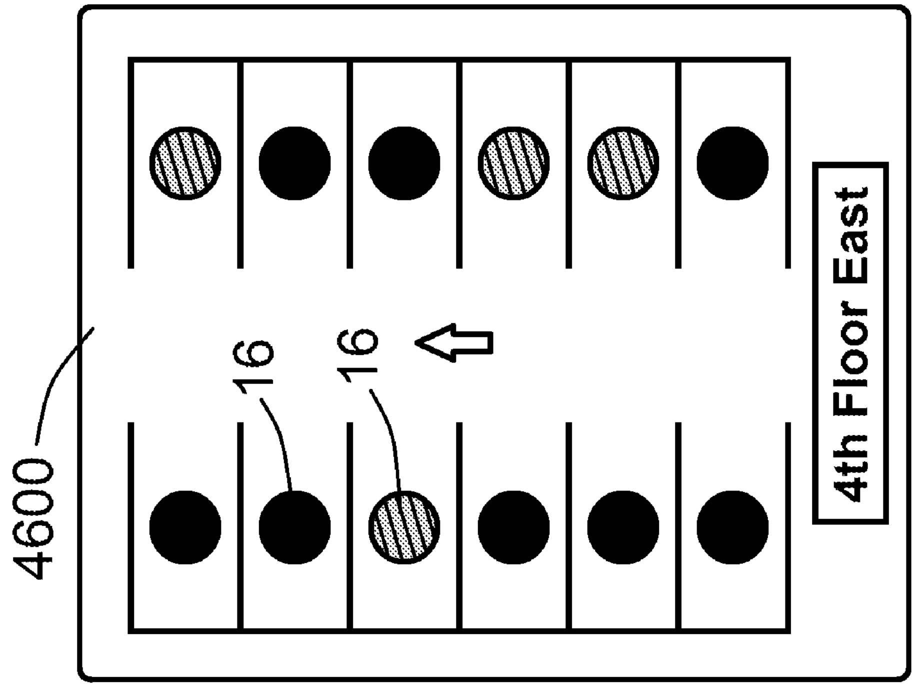
FIG. 46 shows a sign with annunciator indications corresponding to occupied and available parking spaces, such as those shown in FIG. 45, according to exemplary embodiments of the present disclosure.

In various embodiments of systems 60 of the present disclosure, said systems use one or more annunciators 16 as part of or coupled to one or more data hubs 100 of the present disclosure, as generally referenced herein. In various additional embodiments, systems 60 of the present disclosure use one or more annunciators 16 as part of or coupled to one or more data hubs 100 of the present disclosure, and also use one or more remote annunciators 16, such as those incorporated within or used in connection with one or more signs 4600, such as shown in FIG. 46. In such embodiments, signs 4600 can be located within and/or outside of a parking garage, for example, so that a person driving into and/or within said garage can identify potential available and occupied parking spaces without needing to see an annunciator 16 light from an annunciator 16 part of our coupled to a data hub 100, for example. In such an embodiment, a sensor 18 of a data hub 100 can be operatively connected to a DAQ module 28 such that a sensor signal 40 obtained by said sensor 18 is provided to the DAQ module 28, which is configured to interrogate the sensor signal 40 and communicate the interrogated signal 40 to the processor 30 for analysis, noting that signals 40 can also be directly transmitted from sensor 18 to processor 30. The processor 30 may analyze and operate upon the interrogated signal 40 to execute various functions. In at least one embodiment, the processor 30 may operate upon the interrogated signal 40 to determine parking space occupancy status, and direct the annunciator 16 of the data hub to emit one or more lights indicative of parking space availability and/or type. When using one or more remote annunciators 16, such as those incorporated into a sign 4600 or another device or object remote from a data hub 100, said remote annunciators 16 can also receive the instructions or directions from one or more processors 30 and/or one or more annunciators 16 so to indicate parking space availability and/or type.

Figure 45:
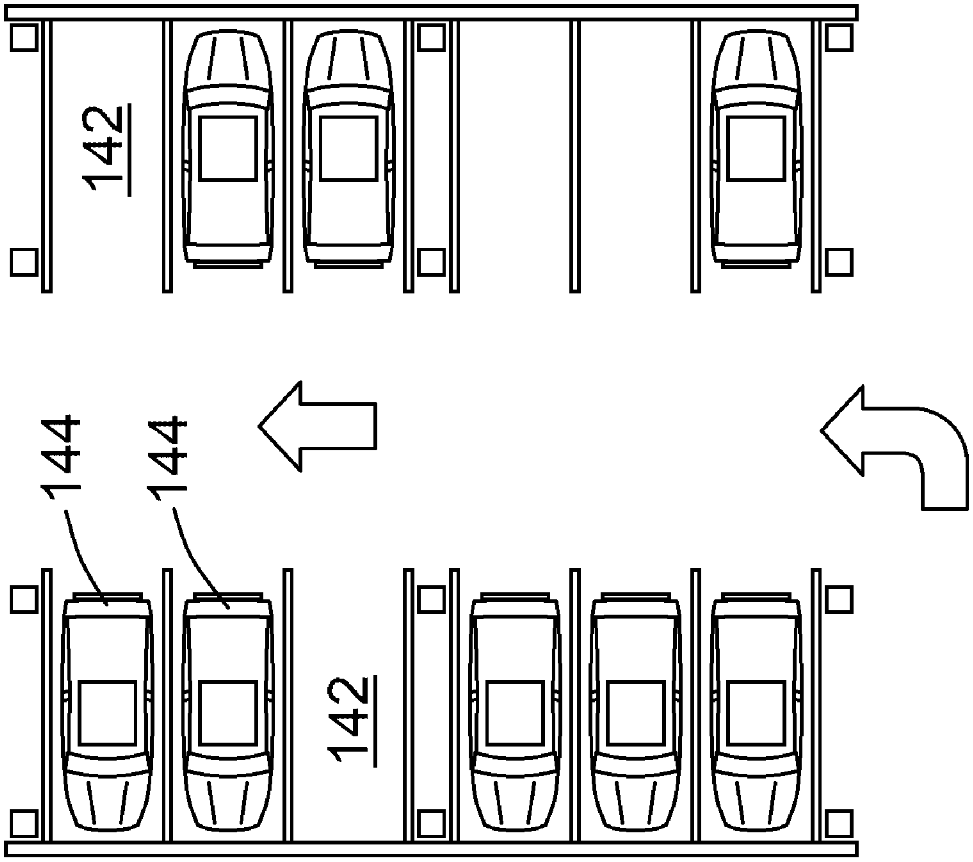
FIG. 45 shows a birds-eye view of a portion of a parking garage with occupied and available parking spaces, according to exemplary embodiments of the present disclosure.

By way of example, FIG. 45 shows a birds-eye view of a portion of a parking garage, with vehicles 144 occupying eight of the twelve parking sports such that four remain available (empty parking spaces 142). A sign 4600, such as shown in FIG. 46, includes corresponding indications, whereby one or more remote annunciators 16 can receive the corresponding annunciator 16 indications as would be received by annunciators 16 of data hubs 100 within the garage depiction in FIG. 45. Said remove annunciators 16 can receive the indication information from annunciators 16 and/or processors 30 of data hubs, for example. Different color lights from remote annunciators 16 can be used, such as red for occupied and green for available, etc., and can correspond to the same colors emitted by annunciator 16 within said garage. Said sign 4600 could be positioned within the garage at or near the corresponding portion of the garage that the vehicle is approaching, so that a person within the vehicle can identify available parking spots just by looking at sign 4600.

Figure 47:
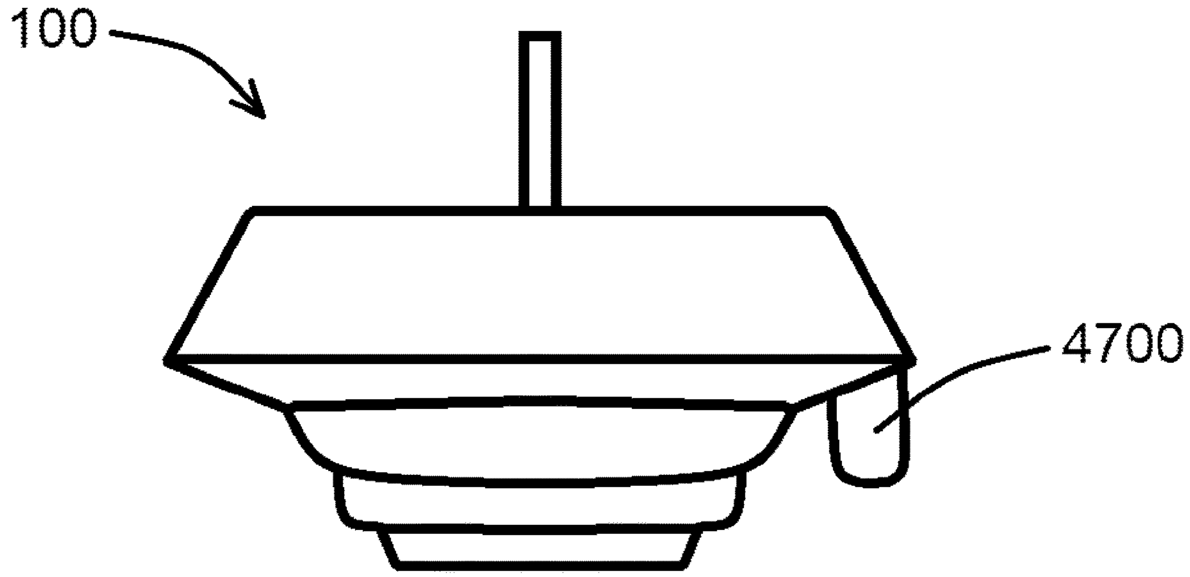
FIG. 47 shows a data hub of the present disclosure having an insect repeller according to exemplary embodiments of the present disclosure.

In various data hub 100 embodiments of the present disclosure, said data hubs 100 would incorporate and/or be positioned near one or more insect repellers 4700, such as shown in FIG. 47. Insect repellers 4700 of the present disclosure can be configured to emit one or more chemicals, lights, sounds, vibrations, and/or odors (collectively a "deterrent") so to deter and/or kill insects, including but not limited to spiders. For example, spiders and spider webs can block portions of sensors 18, causing data hubs 100 to not be able to operate as intended. Insect repellers 4700 could be configured to emit one or more of the aforementioned deterrents at scheduled intervals and/or upon sensing movement near one or more sensors 18, for example.

Data hubs 100 of the present disclosure can also be configured to detect certain sounds or ranges of sounds indicative of unwanted activity. For example, sensors 18 of the present disclosure could be configured to detect sounds or sound ranges indicative of and from saws cutting metal, such as a criminal using a reciprocating saw to cut exhaust pipe to remove and steal a catalytic converter from a vehicle parked in a garage using a data hub 100 of the present disclosure. In at least one embodiment, the sensors can detect a sound or sound range indicative of a blown whistle, such as a whistle carried by a person to deter a potential assault. Upon detection of such a sound, one or more indications can be triggered, including but not limited to a siren, a pre-recorded deterring voice memo, a notification being sent to an on-site and/or remote location, such as a garage operator, security office, and/or a police department, providing information as to what data hub(s) detected said sounds and when.

Furthermore, and in various system 60 embodiments of the present disclosure, sensors 18 configured to detect a pedestrian within a zone are also configured to be able to track movement of said pedestrian as well as the amount of time said pedestrian is identified within a parking garage. For example, a pedestrian may be identified for twelve seconds by one data hub 100, fifteen seconds by another adjacent data hub 100, and eighteen seconds by yet another data hub 100, for a total of forty-five seconds. Such a duration (or less or more) may be considered to be "extensive," which may be indicative of a pedestrian who is not looking for their vehicle, but instead of a pedestrian who is looking for unlocked cars, visible items within cars, etc. Upon detection of such a duration, for example, one or more indications can be triggered, including but not limited to a siren, a pre-recorded deterring voice memo, a notification being sent to an on-site and/or remote location, such as a garage operator, security office, and/or a police department, providing information as to what data hub(s) detected said pedestrian and when.

Figure 48:
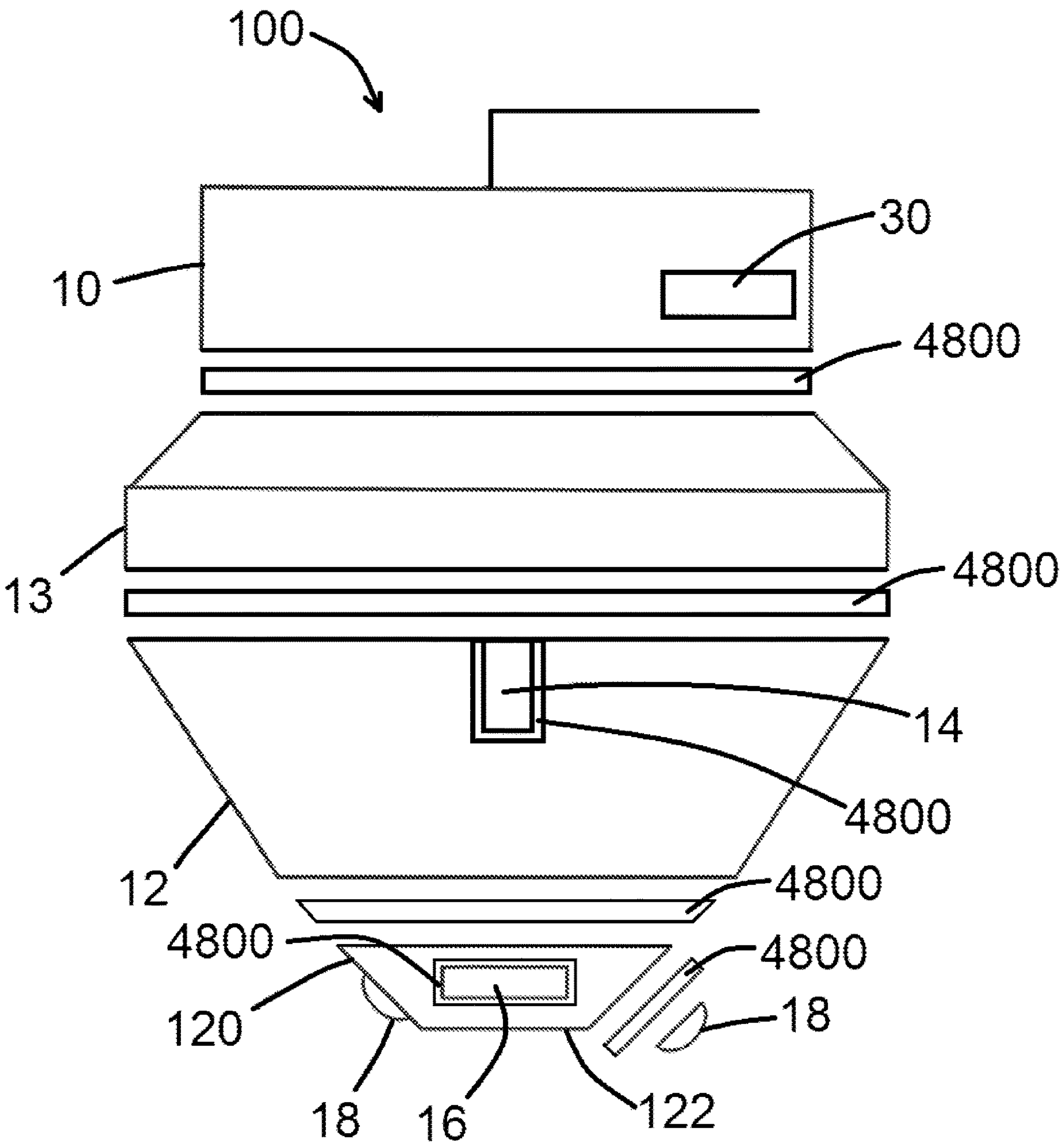
FIG. 48 shows an exploded view of a data hub having offset rings at various locations as may be desired, according to exemplary embodiments of the present disclosure.

When installed in a parking garage, for example, maintenance may be performed to clean said parking garage and installed data hubs 100 can get wet, with potential water intrusion causing portions of said data hubs to fail. Installation of data hubs 100 onto ceilings of parking garage levels would generally assure that they would not get wet, but pressure washing, rainwater seepage, etc., can cause data hubs 100 to get wet. As such, and in various embodiments, one or more offset rings 4800, such as shown in FIG. 48, could be positioned between two adjacent components of a data hub 100, so to provide a watertight seal between said components. Any of housing 10, cover 12, fixture 13, light 14, annunciator 16, and sensor 18, etc, can use an offset ring 4800 to connect to another component of an exemplary data hub 100.

In addition to parking space status information that can be visually provided to the user (vehicle driver) via an RGB LED indicator, for example, other color(s) can be used to indicate an available parking space that is reserved for an electric vehicle or a hybrid electric vehicle, including those electric vehicle spaces having a charging system associated therewith. As such, the use of colors, i.e. GREEN for unoccupied, RED for occupied, BLUE for ADA, etc., can be supplemented with another color for unoccupied parking spaces for electric vehicles, such as ORANGE or PURPLE or some other color. In addition to the multitude of colors that can be displayed on the indicator, the images can also be provided in either a steady state (constant color ON) or dynamic state (colors depicted in i.e. changing patterns, sequences, scrolls, flashes, strobes, etc.).

Furthermore, and in various embodiments, data hubs 100 can be configured so that any light emitted therefrom, such as by way of light source 14, can have an adjustable intensity, such as to dim said light source 14 relative to an existing light 200 within a parking environment, or to increase illumination intensity of the light source 14 relative to existing light 200. In such an embodiment, systems 60 using data hubs 100 of the present disclosure can be installed into parking garages with existing lights 200, not replacing said existing lights 200, and have intensities that can be controlled so to have light sources 14 emit a desired intensity of light relative to existing lights 200.

Smart sensors 18 of data hubs 100 can integrated into each light of a parking environment, such as an existing light 200 referenced in FIG. 28, or as part of a housing 10 and/or fixture 13 of the present disclosure having a light source 14, or as a stand-alone unit in an independent enclosure 100, and not in connection with a fixture or light source, such as shown in FIG. 29A. Said smart sensors 18 can work independently or collectively with other networked smart sensors 18 to assess their environment While various embodiments of a lighting fixture data hub have been described in considerable detail herein, the embodiments are merely offered by way of non-limiting examples of the disclosure described herein. For example, though various components of a lighting fixture data hub have been depicted to be generally angularly shaped in the plan view, these components could have other general shapes such as circular, hexagonal, or other suitable or desire shape. As another example, the light sources disclosed with respect to a lighting fixture data hub include/comprise induction fluorescent and LED lamps. Nonetheless, a lighting fixture data hub of the present disclosure may be configured to convert to any lighting system that uses a light source and associated power controller. It will therefore be understood that various changes and modifications may be made, and equivalents may be substituted for elements thereof, without departing from the scope of the disclosure and are intended to encompass any later appended claims.

Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. Such sequences may be varied and still remain within the scope of the present disclosure.

The invention claimed is:

1. A data hub, comprising:

an annunciator configured to generate a first indication and a second indication;

first and second camera sensors laterally displaced from one another, the first and second camera sensors being configured to capture images of at least one of a vehicle or a pedestrian within a zone in a vicinity of the data hub and to emit one or more signals corresponding to said detection; and an on-board processor in communication with a gateway and the annunciator, the on-board processor configured to wirelessly receive and analyze the one or more signals, communicate said one or more signals to the gateway so that the gateway can instruct the annunciator to generate the first indication or the second indication in response to the one or more signals.

2. The data hub of claim 1, further comprising:

a sensor unit housing having at least portions of the annunciator, the first and second camera sensors, and the on-board processor located therein, the sensor unit configured to attach to a device, housing, or freestanding element such that power supplied to the device is also used to supply power to the data hub.

3. The data hub of claim 1, wherein the first and second camera sensors are further configured to detect one or more activities within one or more other activity areas.

4. The data hub of claim 1, wherein the first and second camera sensors are further configured to determine whether or not the at least one of the vehicle or the pedestrian is present within the zone.

5. The data hub of claim 1, wherein the data hub further comprises a power controller configured to provide electrical power to the annunciator, the first and second camera sensors, and the processor.

6. The data hub of claim 1, further comprising or coupled to a light source.

7. The data hub of claim 6, wherein the gateway is configured to control lighting of the light source.

8. The data hub of claim 6, configured to control intensity of light emitted by the light source in consideration of existing light fixtures present at or near the zone.

9. The data hub of claim 1, further configured to communicate with one or more remote annunciators, whereby the gateway can direct the one or more remote annunciators to display the first indication or the second indication.

10. The data hub of claim 1, further comprising a sound sensor, wherein the sound sensor is configured to detect a sound or range of sounds.

11. The data hub of claim 1, wherein first and second camera sensors are configured to track movement of the at least one of the vehicle or the pedestrian within one or more zones and the duration of time the at least one of the vehicle or the pedestrian is tracked within the one or more zones.

12. The data hub of claim 1, further comprising:

one or more offset rings configured to generate a seal between components of the data hub so to eliminate water intrusion into the data hub.

13. The data hub of claim 1, wherein the annunciator is further configured to generate a third indication and a fourth indication, wherein the first indication is emitted light of a first color indicating an occupied parking space, wherein the second indication is emitted light of a second color indicating an available parking space, wherein the third indication is emitted light of a third color indicating a handicapped parking space, and wherein the fourth indication is emitted light of a fourth color indicating an available parking space with a charger configured to charge an electric vehicle or hybrid electric vehicle.

14. The data hub of claim 1, wherein the gateway is configured to count a number of the vehicles or the pedestrians based on the one or more signals from the first and second camera sensors.

15. The data hub of claim 14, wherein the gateway is configured to obtain a total occupancy of open parking spaces in a designated area based on the counting.

16. The data hub of claim 15, wherein the designated area is a top deck of a parking structure or a surface parking lot.

17. The data hub of claim 1, wherein the first camera and the second camera sensor are disposed on a same surface of a sensor housing of the data hub.

18. A data hub, comprising:

first and second camera sensors laterally displaced from one another, the first and second camera sensors being configured to capture images of at least one of a vehicle or a pedestrian within a zone in a vicinity of the data hub and to emit one or more detection signals corresponding to said detection; and an on-board processor in communication with a remote device, the on-board processor configured to receive and analyze the one or more detection signals, and to communicate one or more indication signals to the remote device so that the remote device can display at least one visual indication in response to the one or more indication signals.

* * * * *